US010231225B2

(12) United States Patent
Bharadwaj et al.

(10) Patent No.: US 10,231,225 B2
(45) Date of Patent: Mar. 12, 2019

(54) PREAMBLE DESIGN ASPECTS FOR HIGH EFFICIENCY WIRELESS LOCAL AREA NETWORKS

(71) Applicant: QUALCOMM Incorporated, San Diego, CA (US)

(72) Inventors: Arjun Bharadwaj, Poway, CA (US); Bin Tian, San Diego, CA (US); Lochan Verma, San Diego, CA (US); Sameer Vermani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 71 days.

(21) Appl. No.: 15/387,309

(22) Filed: Dec. 21, 2016

(65) Prior Publication Data

US 2017/0181136 A1    Jun. 22, 2017

Related U.S. Application Data

(60) Provisional application No. 62/270,562, filed on Dec. 21, 2015, provisional application No. 62/299,554, (Continued)

(51) Int. Cl.
*H04W 72/04* (2009.01)
*H04B 7/0452* (2017.01)
(Continued)

(52) U.S. Cl.
CPC ........ *H04W 72/042* (2013.01); *H04B 7/0452* (2013.01); *H04L 5/0053* (2013.01); (Continued)

(58) Field of Classification Search
CPC .. H04B 7/0452; H04W 84/12; H04W 72/042; H04W 74/002; H04W 72/0453; H04W 72/04; H04L 41/08; H04L 5/0053
(Continued)

(56) References Cited

U.S. PATENT DOCUMENTS

| 8,948,284 | B2 * | 2/2015 | Park | H04L 27/2613 |
| | | | | 375/259 |
| 9,647,816 | B2 * | 5/2017 | Yu | H04L 5/0048 |
| 9,742,433 | B2 * | 8/2017 | Lee | H03M 7/30 |
| 9,768,921 | B2 * | 9/2017 | Sun | H04L 27/2613 |
| 9,867,189 | B2 * | 1/2018 | Lee | H04W 72/0453 |
| 9,992,000 | B2 * | 6/2018 | Suh | H04L 5/005 |

(Continued)

OTHER PUBLICATIONS

Kim et al., "HE-SIG-B Structure," IEEE Draft, Jul. 11, 2015, 19 pgs., doc.: IEEE 802.11-15/0821r2, XP068098036, IEEE-SA Mentor, Piscataway, NJ USA. [retrieved on Jul. 15, 2015].

*Primary Examiner* — Man U Phan
(74) *Attorney, Agent, or Firm* — Holland & Hart LLP

(57) ABSTRACT

Methods, apparatuses, and computer readable media for resource allocation signaling in a high efficiency wireless local area network (WLAN) are disclosed. A transmitter may generate an indication that a first channel of a plurality of channels associated with a transmission frame has been punctured, the transmission frame including a WLAN signaling field. The transmitter may identify information associated with the WLAN signaling field corresponding to the punctured first channel. The transmitter may transmit the information associated with the WLAN signaling field in a second channel of the plurality of channels. The transmitter may transmit the indication that the first channel has been punctured in the second channel or in a second WLAN signaling field of the transmission frame.

29 Claims, 51 Drawing Sheets

Related U.S. Application Data filed on Feb. 24, 2016, provisional application No. 62/328,602, filed on Apr. 27, 2016, provisional application No. 62/344,374, filed on Jun. 1, 2016, provisional application No. 62/365,329, filed on Jul. 21, 2016.

(51) Int. Cl.
　　　*H04W 84/12*　　(2009.01)
　　　*H04L 12/24*　　(2006.01)
　　　*H04L 5/00*　　(2006.01)
　　　*H04W 72/12*　　(2009.01)
　　　*H04W 74/00*　　(2009.01)

(52) U.S. Cl.
　　　CPC ......... *H04L 41/08* (2013.01); *H04W 72/0453* (2013.01); *H04W 72/12* (2013.01); *H04W 84/12* (2013.01); *H04W 74/002* (2013.01)

(58) Field of Classification Search
　　　USPC ....................................................... 370/329
　　　See application file for complete search history.

(56) References Cited

U.S. PATENT DOCUMENTS

| | | | |
|---|---|---|---|
| 9,992,001 B2* | 6/2018 | Sun | H04L 5/0051 |
| 10,014,992 B2* | 7/2018 | Sun | H04L 27/2613 |
| 2015/0327276 A1 | 11/2015 | Rebeiz et al. | |
| 2016/0150514 A1* | 5/2016 | Kwon | H04W 74/0816 370/329 |
| 2016/0165589 A1 | 6/2016 | Chu et al. | |
| 2016/0330058 A1 | 11/2016 | Chen et al. | |
| 2016/0330300 A1* | 11/2016 | Josiam | H04L 69/22 |
| 2017/0006608 A1* | 1/2017 | Josiam | H04L 5/00 |
| 2017/0041171 A1* | 2/2017 | Li | H04L 5/0044 |
| 2017/0041929 A1 | 2/2017 | Noh et al. | |
| 2017/0070998 A1 | 3/2017 | Wu et al. | |
| 2017/0118676 A1 | 4/2017 | Li et al. | |
| 2017/0181129 A1 | 6/2017 | Bharadwaj et al. | |
| 2017/0181130 A1 | 6/2017 | Bharadwaj et al. | |
| 2017/0214561 A1* | 7/2017 | Lee | H04L 27/263 |
| 2017/0280462 A1* | 9/2017 | Chun | H04W 72/082 |
| 2017/0359159 A1* | 12/2017 | Kim | H04L 5/0055 |
| 2017/0366329 A1* | 12/2017 | Cao | H04L 5/0005 |
| 2018/0091347 A1* | 3/2018 | Lee | H04L 27/2613 |

* cited by examiner

| #1 | #2 | #3 | #4 | #5 | #6 | #7 | #8 | #9 | Num of entries |
|---|---|---|---|---|---|---|---|---|---|
| 26 | 26 | 26 | 26 | 26 | | | | | 8 |
| 26 | 26 | 26 | 26 | 26 | | | | | 8 |
| 52 | 52 | | | | | | | | 8 |
| 52 | | 52 | | | | | | | 8 |
| | 106 | | | 26 | 26 | | 106 | | 8 |
| | 106 | | | 26 | 26 | 26 | 106 | 26 | 8 |
| | 106 | 26 | | 26 | | 26 | 106 | 26 | 8 |
| | 106 | 26 | 52 | 26 | 52 | | | 52 | 8 |
| | 106 | | 52 | 26 | 52 | 52 | | 52 | 8 |
| | | | | 26 | | 26 | 106 | 26 | 64 |
| | | | | 242 | | | | | 8 |
| | | | | 484 | | | | | 8 + 1 ⎫ 605
| | | | | 996 | | | | | 8 + 1 ⎬ 610
| | | | | 2*996 | | | | | 8 |

| Nuser | B3 ... B0 | Nsts [1] | Nsts [2] | Nsts [3] | Nsts [4] | Nsts [5] | Nsts [6] | Nsts [7] | Nsts [8] | Number of Entries |
|---|---|---|---|---|---|---|---|---|---|---|
| 2 | 0000~0011 | 1~4 | 1 | | | | | | | 10 |
| | 0100~0110 | 2~4 | 2 | | | | | | | |
| | 0111~1000 | 3~4 | 3 | | | | | | | |
| | 1001 | 4 | 4 | | | | | | | |
| 3 | 0000~0011 | 1~4 | 1 | 1 | | | | | | 13 |
| | 0100~0110 | 2~4 | 2 | 1 | | | | | | |
| | 0111~1000 | 3~4 | 3 | 1 | 705 | | | | | |
| | 1001~1011 | 2~4 | 2 | 2 | | | | | | |
| | 1100 | 3 | 3 | 2 | | | | | | |
| 4 | 0000~0011 | 1~4 | 1 | 1 | 1 | | | | | 11 |
| | 0100~0110 | 2~4 | 2 | 1 | 1 | | | | | |
| | 0111 | 3 | 3 | 1 | 1 | | | | | |
| | 1000~1001 | 2~3 | 2 | 2 | 1 | | | | | |
| | 1010 | 2 | 2 | 2 | 2 | | | | | |
| 5 | 0000~0011 | 1~4 | 1 | 1 | 1 | 1 | | | | 6 |
| | 0100~0101 | 2~3 | 2 | 1 | 1 | 1 | | | | |
| 6 | 0000~0010 | 1~3 | 1 | 1 | 1 | 1 | 1 | | | 4 |
| | 0011 | 2 | 2 | 1 | 1 | 1 | 1 | | | |
| 7 | 0000~0001 | 1~2 | 1 | 1 | 1 | 1 | 1 | 1 | | 2 |
| 8 | 0000 | 1 | 1 | 1 | 1 | 1 | 1 | 1 | 1 | 1 |

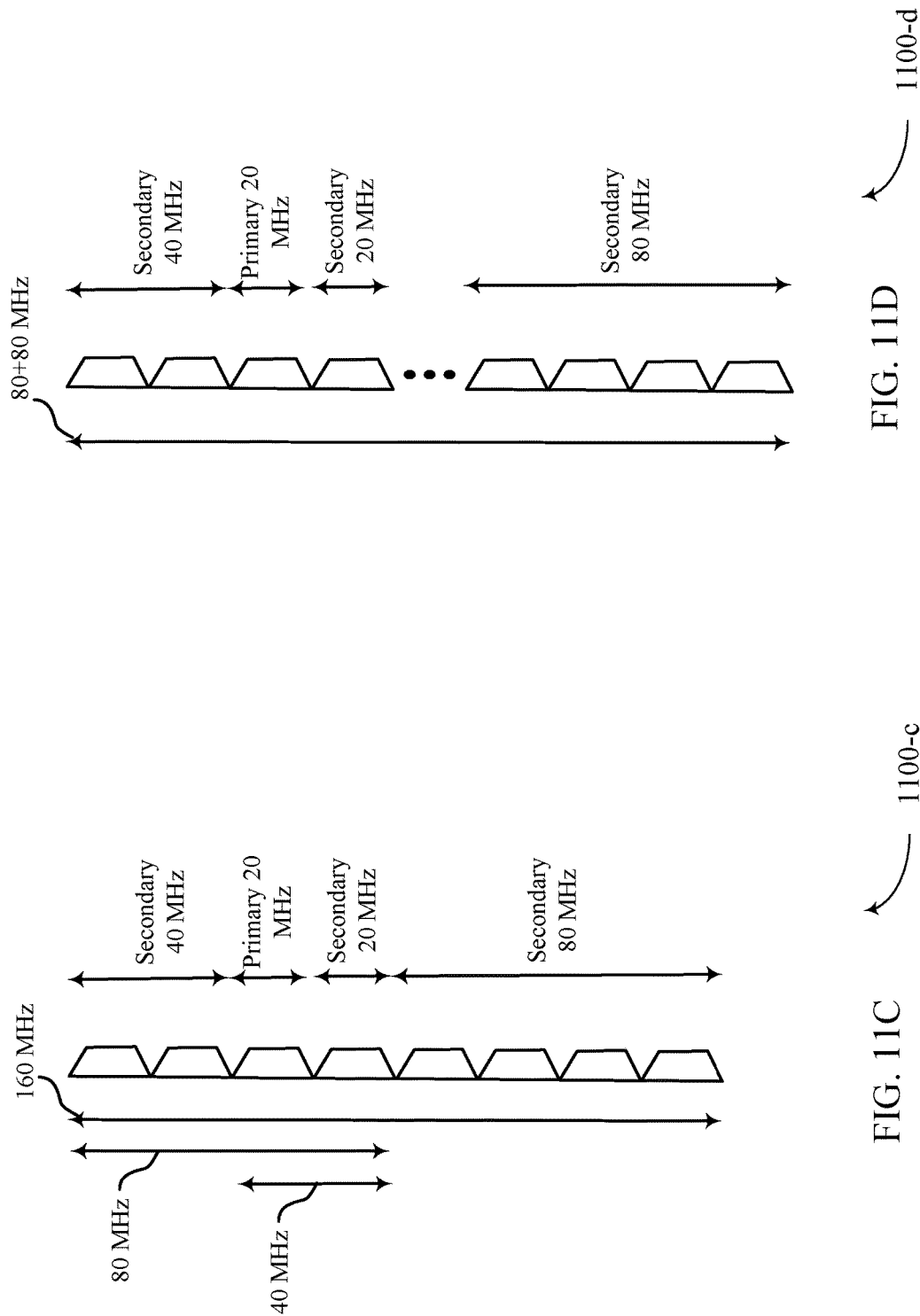

| Number of Entries | RU Size | User indication | Explanation |
|---|---|---|---|
| 8 | 484 | #users | |
| 1 | | 0 | Indicates user number (no load balancing) |
| 1 | | 1+1 | Indicates that no user blocks are transmitted |
| 1 | | 2+1 | Indicates the user split between two SIG-B content channels |
| 1 | | 2+2 | |
| 1 | | 3+2 | |
| 1 | | 3+3 | |
| 1 | | 4+3 | |
| 1 | | 4+4 | |

FIG. 12

| Fields in HE-SIG-A for an HE SU PPDU and HE Extended range SU PPDU ||||||
|---|---|---|---|---|
| Two parts of HE-SIG-A | Bits | Field | # of Bits | Description |
| HE-SIG-A1 | B0 | Reserved | 1 | Reserved and set to 1 |
| | B1 | Format | 1 | Differentiate between an HE SU PPDU and an HE trigger-based PPDU. Set to 0 for HE trigger-based PPDU Set to 1 for HE SU PPDU This field is reserved for an HE extended range SU PPDU |
| | B2 | UL/DL | 1 | Indicates whether the PPDU is sent UL or DL Set to 0 for DL Set to 1 for UL This field indicates DL for TDLS |
| | B3:B8 | BSS Color | 6 | The BSS Color field is an identifier of the BSS Set to all "1" in-lieu of all "0" for no BSS color |
| | B9:B12 | Spatial Reuse | 4 | |
| | B13:B19 | TXOP Duration | 7 | Indicates the remaining time in the current TXOP |
| | B20:B21 | Bandwidth | 2 | For HE SU PPDU Set to 0 for 20 MHz Set to 1 for 40 MHz Set to 2 for 80 MHz Set to 3 for 160/80+80 MHz For HE Extended Range PPDU Set to 0 for 20 MHz Set to 1 for first 106-tone RU in 20 MHz Set to 2 for second 106-tone RU in 20 MHz Value 3 is reserved NOTE- First and second 106-tone RU arranged in increasing order of absolute frequency |

FIG. 14A    1401

| Fields in HE-SIG-A for an HE SU PPDU and HE Extended range SU PPDU |||||
|---|---|---|---|---|
| Two parts of HE-SIG-A | Bits | Field | # of Bits | Description |
| HE-SIG-A1 | B22:B25 | MCS | 4 | For HE SU PPDU<br>Set to 0 for MCS0<br>Set to 1 for MCS1<br>Set to 2 for MCS2<br>Set to 3 for MCS3<br>Set to 4 for MCS4<br>Set to 5 for MCS5<br>Set to 6 for MCS6<br>Set to 7 for MCS7<br>Set to 8 for MCS8<br>Set to 9 for MCS9<br>Set to 10 for MCS10<br>Set to 11 for MCS11<br>Values 12 - 15 are reserved<br>For HE Extended Range PPDU<br>Set to 0 for MCS0<br>Set to 1 for MCS1<br>Set to 2 for MCS2<br>Values 3 - 15 are reserved |

FIG. 14B  1402

| Fields in HE-SIG-A for an HE SU PPDU and HE Extended range SU PPDU ||||| 
|---|---|---|---|---|
| Two parts of HE-SIG-A | Bits | Field | # of Bits | Description |
| HE-SIG-A2 | B0:B1 | CP and LTF Type | 2 | Set to 0 for 1x HE-LTF + 0.8 us<br>Set to 1 for 2x HE-LTF + 0.8 us<br>Set to 2 for 2x HE-LTF + 1.6 us<br>Set to 3 for 4x HE-LTF + 3.2 us |
| | B2 | Coding | 1 | Indicates whether BCC or LDPC is used.<br>Set to 0 for BCC<br>Set to 1 for LDPC |
| | B3 | LDPC Extra Symbol | 1 | Indicates presence of extra OFDM symbol for LDPC<br>Set to 0 for LDPC extra symbol not present<br>Set to 1 for LDPC extra symbol present.<br>NOTE- This field is reserved and set to 1 when Coding field is set to 0 |
| | B4:B6 | N_sts | 3 | Indicates the number of spatial streams.<br>For HE SU PPDU<br>Set to 0 for 1 space time stream<br>Set to 1 for 2 space time stream<br>Set to 2 for 3 space time stream<br>Set to 3 for 4 space time stream<br>Set to 4 for 5 space time stream<br>Set to 5 for 6 space time stream<br>Set to 6 for 7 space time stream<br>Set to 7 for 8 space time stream<br>For HE Extended Range PPDU<br>Set to 0 for 1 space time stream<br>Values 1 - 7 are reserved |
| | B7 | STBC | 1 | Set to 1 if STBC is used<br>Set to 0 otherwise |
| | B8 | TxBF | 1 | Set to 1 if a Beamforming steering matrix is applied to the waveform in an SU transmission<br>Set to 0 otherwise |
| | B9 | DCM | 1 | Set to 1 to indicate that the payload of the SU PPDU is modulated with dual sub-carrier modulation for the MCS.<br>Set to 0 indicates that the payload of the PPDU is not modulated with dual sub-carrier for the MCS. |

FIG. 14C        1403

| Fields in HE-SIG-A for an HE SU PPDU and HE Extended range SU PPDU | | | | |
|---|---|---|---|---|
| Two parts of HE-SIG-A | Bits | Field | # of Bits | Description |
| HE-SIG-A2 | B10:B12 | Packet Extension | 3 | The first two bits (B10, B11) indicate the "a-factor". The third bit (B12) indicates the "PE-Disambiguity" |
| | B13 | Beam Change | 1 | Set to 1 indicates that the pre-HE STF portion of the SU PPDU is spatially mapped differently from HE-LTF1. Set to 0 indicates that the pre-HE STF portion of SU PPDU is spatially mapped the same way as HE-LTF1 on each tone. |
| | B14 | Doppler | 1 | |
| | B15 | Reserved | 1 | Reserved and set to 1 |
| | B16:B19 | CRC | 4 | CRC of bits 0 - 41 in HE-SIG-A. See 22.3.9.7.1 (CRC calculation for HE-SIG-A). The first bit to be transmitted is bit C3 as explained in 20.3.9.7.1 (CRC calculation for HE-SIG). |
| | B20:B25 | Tail | 6 | Used to terminate the trellis of the convolution decoder. Set to 0. |

| Fields in HE-SIG-A for an HE MU PPDU ||||||
|---|---|---|---|---|
| Two parts of HE-SIG-A | Bits | Field | # of Bits | Description |
| HE-SIG-A1 | B0 | Reserved | 1 | Reserved and set to 1 |
| | B1 | UL/DL | 1 | Indicates whether the PPDU is sent UL or DL.<br>Set to 0 for DL<br>Set to 1 for UL.<br>This field indicates DL for TDLS.<br>NOTE- The TDLS peer can identify the TDLS frame by ToDS and FromDS fields in the MAC header of the MPDU |
| | B2:B7 | BSS Color | 6 | The BSS Color field is an identifier of the BSS<br>Set to all "1" in-lieu of all "0" for no BSS color |
| | B8:B11 | Spatial Reuse | 4 | |
| | B12:B18 | TXOP Duration | 7 | Indicates the remaining time in the current TXOP |
| | B19:B21 | Bandwidth | 3 | |
| | B22:B24 | SIGB MCS | 3 | Indicates MCS of HE-SIG-B<br>Set to 0 for MCS0<br>Set to 1 for MCS1<br>Set to 2 for MCS2<br>Set to 3 for MCS3<br>Set to 4 for MCS4<br>Set to 5 for MCS5<br>Values 6 - 7 are reserved |
| | B25 | SIGB DCM | 1 | Set to 1 indicates that the HE-SIG-B is modulated with dual sub-carrier modulation for the MCS.<br>Set to 0 indicates that the HE-SIB-B is not modulated with dual sub-carrier modulation for the MCS. |

FIG. 15A    1501

| Fields in HE-SIG-A for an HE MU PPDU |||||
|---|---|---|---|---|
| Two parts of HE-SIG-A | Bits | Field | # of Bits | Description |
| HE-SIG-A2 | B0:B3 | SIGB Number of Symbols/ Number of MU-MIMO users | 4 | When SIGB compression field=0, indicates the number of HE-SIG-B symbols.<br>Set to 0 for 1 HE-SIG-B symbol<br>Set to 1 for 2 HE-SIG-B symbol<br>Set to 2 for 3 HE-SIG-B symbol<br>Set to 3 for 4 HE-SIG-B symbol<br>Set to 4 for 5 HE-SIG-B symbol<br>Set to 5 for 6 HE-SIG-B symbol<br>Set to 6 for 7 HE-SIG-B symbol<br>Set to 7 for 8 HE-SIG-B symbol<br>Set to 8 for 9 HE-SIG-B symbol<br>Set to 9 for 10 HE-SIG-B symbol<br>Set to 10 for 11 HE-SIG-B symbol<br>Set to 11 for 12 HE-SIG-B symbol<br>Set to 12 for 13 HE-SIG-B symbol<br>Set to 13 for 14 HE-SIG-B symbol<br>Set to 14 for 15 HE-SIG-B symbol<br>Set to 15 for 16 HE-SIG-B symbol<br>When SIGB compression field=1, indicates the number of MU-MIMO users - 1. |
| | B4 | SIGB Compression field | 1 | Set to 1 for full BW MU-MIMO.<br>Set to 0 otherwise. |
| | B5:B7 | Number of HE-LTF symbols | 3 | Indicates the number of HE-LTF symbols.<br>Set to 0 for 1 HE-LTF symbol<br>Set to 1 for 2 HE-LTF symbols<br>Set to 2 for 3 HE-LTF symbols<br>Set to 3 for 4 HE-LTF symbols<br>Set to 4 for 5 HE-LTF symbols<br>Set to 5 for 6 HE-LTF symbols<br>Set to 6 for 7 HE-LTF symbols<br>Set to 7 for 8 HE-LTF symbols |

| Fields in HE-SIG-A for an HE MU PPDU |||||
|---|---|---|---|---|
| Two parts of HE-SIG-A | Bits | Field | # of Bits | Description |
| HE-SIG-A2 | B8:B9 | CP+LTF Size | 2 | Set to 0 for 1x HE-LTF + 0.8 us<br>Set to 1 for 2x HE-LTF + 0.8 us<br>Set to 2 for 2x HE-LTF + 1.6 us<br>Set to 3 for 4x HE-LTF + 3.2 us<br>NOTE - 1x + 0.8 us CP+LTF Type only applicable for full BW MU-MIMO or MU PPDU targeted to single user. |
| | B10 | LDPC Extra Symbol | 1 | Indicates presence of extra OFDM symbol for LDPC<br>Set to 0 for LDPC extra symbol not present<br>Set to 1 for LDPC extra symbol present. |
| | B11:B13 | Packet Extension | 3 | The first two bits (B11, B12) indicate the "a-factor".<br>The third bit (B13) indicates the "PE-Disambiguity" |
| | B14 | STBC | 1 | Set to 1 indicates STBC for all users in the payload and does not apply to SIGB.<br>Set to 0 indicates no STBC for all users in the payload and does not apply to SIGB |
| | B15 | Doppler | 1 | |
| | B16:B19 | CRC | 4 | CRC of bits 0 - 41 in HE-SIG-A. See 22.3.9.7.1 (CRC calculation for HE-SIG-A). The first bit to be transmitted is bit C3 as explained in 20.3.9.7.1 (CRC calculation for HE-SIG). |
| | B20:B25 | Tail | 6 | Used to terminate the trellis of the convolution decoder.<br>Set to 0. |

FIG. 15C    1503

| Fields in HE-SIG-A for an HE trigger-based PPDU ||||
| Two parts of HE-SIG-A | Bits | Field | # of Bits | Description |
|---|---|---|---|---|
| HE-SIG-A1 | B0 | Reserved | 1 | Reserved and set to 1 |
| | B1 | Format | 1 | Differentiate between an HE SU PPDU and an HE trigger-based PPDU.<br>Set to 0 for HE trigger-based PPDU<br>Set to 1 for HE SU PPDU<br>This field is reserved for an HE extended range SU PPDU |
| | B2:B7 | BSS Color | 6 | The BSS Color field is an identifier of the BSS<br>Set to all "1"' in-lieu of all"0" for no BSS color |
| | B8:B23 | Spatial Reuse | 16 | For 20 MHz bandwidth SR bits B0:B3 corresponding to entire 20 MHz. Each of the SR bits B4:B7, B8:11, and B12:B15 have identical values as B0:B3.<br>For 40 MHz bandwidth SR bits B0:B3 corresponding to first 20 MHz and SR bits B4:B7 corresponding to second 20 MHz. SR Bits B8:B11 and B12:B15 have identical values as B0:B3 and B4:B7, respectively.<br>For 80 MHz bandwidth SR bits B0:B3, B4:B7, B8:B11, and B12:B15 corresponding to first, second, third, and fourth 20 MHz, respectively.<br>For 160 MHz bandwidth SR bits B0:B3, B4:B7, B8:B11, and B12:B15 corresponding to first, second, third, and fourth 40 MHz, respectively.<br>NOTE- First, second, third, and fourth channel arranged in increasing order of absolute frequency |
| | B24:B25 | Bandwidth | 2 | Set to 0 for 20 MHz<br>Set to 1 for 40 MHz<br>Set to 2 for 80 MHz<br>Set to 3 for 160/80+80 MHz |

FIG. 16A 1601

| Fields in HE-SIG-A for an HE trigger-based PPDU ||||| 
|---|---|---|---|---|
| Two parts of HE-SIG-A | Bits | Field | # of Bits | Description |
| HE-SIG-A2 | B0:B6 | TXOP Duration | 7 | Indicates the remaining time in the current TXOP |
| | B7:B15 | Reserved | 9 | Reserved and set to 1 |
| | B16:B19 | CRC | 4 | CRC of bits 0 - 41 in HE-SIG-A. See 22.3.9.7.1 (CRC calculation for HE-SIG-A). The first bit to be transmitted is bit C3 as explained in 20.3.9.7.1 (CRC calculation for HE-SIG). |
| | B20:B25 | Tail | 6 | Used to terminate the trellis of the convolution decoder. Set to 0. |

FIG. 16B         1602

| Fields in HE-SIG-A for an HE SU PPDU and HE Extended range SU PPDU ||||||
| Two parts of HE-SIG-A | Bits | Field | # of Bits | Description |
| --- | --- | --- | --- | --- |
| HE-SIG-A1 | B0 | Format | 1 | Differentiate between an HE SU PPDU and an HE trigger-based PPDU. Set to 0 for HE trigger-based PPDU Set to 1 for HE SU PPDU This field is reserved for an HE extended range SU PPDU |
| | B1 | UL/DL | 1 | Indicates whether the PPDU is sent UL or DL. Set to 0 for DL Set to 1 for UL. This field indicates DL for TDLS. |
| | B2:B7 | BSS Color | 6 | The BSS Color field is an identifier of the BSS Set to all "1" in-lieu of all"0" for no BSS color |
| | B8:B11 | Spatial Reuse | 4 | |
| | B12:B18 | TXOP Duration | 7 | Indicates the remaining time in the current TXOP |
| | B19:B20 | Bandwidth | 2 | For HE SU PPDU Set to 0 for 20 MHz Set to 1 for 40 MHz Set to 2 for 80 MHz Set to 3 for 160/80+80 MHz For HE Extended Range PPDU Set to 0 for 20 MHz Set to 1 for first 106-tone RU in 20 MHz Set to 2 for second 106-tone RU in 20 MHz Value 3 is reserved NOTE- First and second 106-tone RU arranged in increasing order of absolute frequency. |

FIG. 17A    1701

| Fields in HE-SIG-A for an HE SU PPDU and HE Extended range SU PPDU ||||||
|---|---|---|---|---|
| Two parts of HE-SIG-A | Bits | Field | # of Bits | Description |
| HE-SIG-A1 | B21:B24 | MCS | 4 | For HE SU PPDU<br>Set to 0 for MCS0<br>Set to 1 for MCS1<br>Set to 2 for MCS2<br>Set to 3 for MCS3<br>Set to 4 for MCS4<br>Set to 5 for MCS5<br>Set to 6 for MCS6<br>Set to 7 for MCS7<br>Set to 8 for MCS8<br>Set to 9 for MCS9<br>Set to 10 for MCS10<br>Set to 11 for MCS11<br>Values 12 - 15 are reserved<br>For HE Extended Range PPDU<br>Set to 0 for MCS0<br>Set to 1 for MCS1<br>Set to 2 for MCS2<br>Values 3 - 15 are reserved |
| | B25 | Reserved | 1 | Reserved and set to 1 |

| Fields in HE-SIG-A for an HE SU PPDU and HE Extended range SU PPDU ||||| 
|---|---|---|---|---|
| Two parts of HE-SIG-A | Bits | Field | # of Bits | Description |
| HE-SIG-A2 | B0:B1 | CP and LTF Type | 2 | Set to 0 for 1x HE-LTF + 0.8 us<br>Set to 1 for 2x HE-LTF + 0.8 us<br>Set to 2 for 2x HE-LTF + 1.6 us<br>Set to 3 for 4x HE-LTF + 3.2 us |
| | B2 | Coding | 1 | Indicates whether BCC or LDPC is used.<br>Set to 0 for BCC<br>Set to 1 for LDPC |
| | B3 | LDPC Extra Symbol | 1 | Indicates presence of extra OFDM symbol for LDPC<br>Set to 0 for LDPC extra symbol not present<br>Set to 1 for LDPC extra symbol present.<br>NOTE- This field is reserved and set to 1 when Coding field is set to 0 |
| | B4:B6 | N_sts | 3 | Indicates the number of spatial streams.<br>For HE SU PPDU<br>Set to 0 for 1 space time stream<br>Set to 1 for 2 space time stream<br>Set to 2 for 3 space time stream<br>Set to 3 for 4 space time stream<br>Set to 4 for 5 space time stream<br>Set to 5 for 6 space time stream<br>Set to 6 for 7 space time stream<br>Set to 7 for 8 space time stream<br>For HE Extended Range PPDU<br>Set to 0 for 1 space time stream<br>Values 1 - 7 are reserved |
| | B7 | STBC | 1 | Set to 1 if STBC is used<br>Set to 0 otherwise |
| | B8 | TxBF | 1 | Set to 1 if a Beamforming steering matrix is applied to the waveform in an SU transmission<br>Set to 0 otherwise |
| | B9 | DCM | 1 | Set to 1 to indicate that the payload of the SU PPDU is modulated with dual sub-carrier modulation for the MCS.<br>Set to 0 indicates that the payload of the PPDU is not modulated with dual sub-carrier for the MCS. |

FIG. 17C

| Fields in HE-SIG-A for an HE SU PPDU and HE Extended range SU PPDU ||||| 
|---|---|---|---|---|
| Two parts of HE-SIG-A | Bits | Field | # of Bits | Description |
| HE-SIG-A2 | B10:B12 | Packet Extension | 3 | The first two bits (B10, B11) indicate the "a-factor". The third bit (B12) indicates the "PE-Disambiguity" |
| | B13 | Beam Change | 1 | Set to 1 indicates that the pre-HE STF portion of the SU PPDU is spatially mapped differently from HE-LTF1. Set to 0 indicates that the pre-HE STF portion of SU PPDU is spatially mapped the same way as HE-LTF1 on each tone. |
| | B14 | Doppler | 1 | |
| | B15 | Reserved | 1 | Reserved and set to 1 |
| | B16:B19 | CRC | 4 | CRC of bits 0 - 41 in HE-SIG-A. See 22.3.9.7.1 (CRC calculation for HE-SIG-A). The first bit to be transmitted is bit C3 as explained in 20.3.9.7.1 (CRC calculation for HE-SIG). |
| | B20:B25 | Tail | 6 | Used to terminate the trellis of the convolution decoder. Set to 0. |

FIG. 17D          1704

| Fields in HE-SIG-A for an HE MU PPDU ||||||
|---|---|---|---|---|
| Two parts of HE-SIG-A | Bits | Field | # of Bits | Description |
| HE-SIG-A1 | B0 | UL/DL | 1 | Indicates whether the PPDU is sent UL or DL.<br>Set to 0 for DL<br>Set to 1 for UL.<br>This field indicates DL for TDLS.<br>NOTE- The TDLS peer can identify the TDLS frame by ToDS and FromDS fields in the MAC header of the MPDU |
| | B1:B6 | BSS Color | 6 | The BSS Color field is an identifier of the BSS<br>Set to all "1" in-lieu of all "0" for no BSS color |
| | B7:B10 | Spatial Reuse | 4 | |
| | B11:B17 | TXOP Duration | 7 | Indicates the remaining time in the current TXOP |
| | B18:B20 | Bandwidth | 3 | |
| | B21:B23 | SIGB MCS | 3 | Indicates MCS of HE-SIG-B<br>Set to 0 for MCS0<br>Set to 1 for MCS1<br>Set to 2 for MCS2<br>Set to 3 for MCS3<br>Set to 4 for MCS4<br>Set to 5 for MCS5<br>Values 6 - 7 are reserved |
| | B24 | SIGB DCM | 1 | Set to 1 indicates that the HE-SIG-B is modulated with dual sub-carrier modulation for the MCS.<br>Set to 0 indicates that the HE-SIB-B is not modulated with dual sub-carrier modulation for the MCS. |
| | B25 | Reserved | 1 | Reserved and set to 1 |

FIG. 18A                1801

| Fields in HE-SIG-A for an HE MU PPDU ||||| 
|---|---|---|---|---|
| Two parts of HE-SIG-A | Bits | Field | # of Bits | Description |
| HE-SIG-A2 | B0:B3 | SIGB Number of Symbols/ Number of MU-MIMO users | 4 | When SIGB compression field=0, indicates the number of HE-SIG-B symbols.<br>Set to 0 for 1 HE-SIG-B symbol<br>Set to 1 for 2 HE-SIG-B symbol<br>Set to 2 for 3 HE-SIG-B symbol<br>Set to 3 for 4 HE-SIG-B symbol<br>Set to 4 for 5 HE-SIG-B symbol<br>Set to 5 for 6 HE-SIG-B symbol<br>Set to 6 for 7 HE-SIG-B symbol<br>Set to 7 for 8 HE-SIG-B symbol<br>Set to 8 for 9 HE-SIG-B symbol<br>Set to 9 for 10 HE-SIG-B symbol<br>Set to 10 for 11 HE-SIG-B symbol<br>Set to 11 for 12 HE-SIG-B symbol<br>Set to 12 for 13 HE-SIG-B symbol<br>Set to 13 for 14 HE-SIG-B symbol<br>Set to 14 for 15 HE-SIG-B symbol<br>Set to 15 for 16 HE-SIG-B symbol<br>When SIGB compression field=1, indicates the number of MU-MIMO users - 1. |
| | B4 | SIGB Compression field | 1 | Set to 1 for full BW MU-MIMO.<br>Set to 0 otherwise. |
| | B5:B7 | Number of HE-LTF symbols | 3 | Indicates the number of HE-LTF symbols.<br>Set to 0 for 1 HE-LTF symbol<br>Set to 1 for 2 HE-LTF symbols<br>Set to 2 for 3 HE-LTF symbols<br>Set to 3 for 4 HE-LTF symbols<br>Set to 4 for 5 HE-LTF symbols<br>Set to 5 for 6 HE-LTF symbols<br>Set to 6 for 7 HE-LTF symbols<br>Set to 7 for 8 HE-LTF symbols |
| | B8:B9 | CP+LTF Size | 2 | Set to 0 for 1x HE-LTF + 0.8 us<br>Set to 1 for 2x HE-LTF + 0.8 us<br>Set to 2 for 2x HE-LTF + 1.6 us<br>Set to 3 for 4x HE-LTF + 3.2 us<br>NOTE - 1x + 0.8 us CP+LTF Type only applicable for full BW MU-MIMO or MU PPDU targeted to single user. |

FIG. 18B      1802

| Fields in HE-SIG-A for an HE MU PPDU ||||| 
|---|---|---|---|---|
| Two parts of HE-SIG-A | Bits | Field | # of Bits | Description |
| HE-SIG-A2 | B10 | LDPC Extra Symbol | 1 | Indicates presence of extra OFDM symbol for LDPC<br>Set to 0 for LDPC extra symbol not present<br>Set to 1 for LDPC extra symbol present. |
| | B11:B13 | Packet Extension | 3 | The first two bits (B11, B12) indicate the "a-factor".<br>The third bit (B13) indicates the "PE-Disambiguity" |
| | B14 | STBC | 1 | Set to 1 indicates STBC for all users in the payload and does not apply to SIGB.<br>Set to 0 indicates no STBC for all users in the payload and does not apply to SIGB |
| | B15 | Doppler | 1 | |
| | B16:B19 | CRC | 4 | CRC of bits 0 - 41 in HE-SIG-A. See 22.3.9.7.1 (CRC calculation for HE-SIG-A). The first bit to be transmitted is bit C3 as explained in 20.3.9.7.1 (CRC calculation for HE-SIG). |
| | B20:B25 | Tail | 6 | Used to terminate the trellis of the convolution decoder.<br>Set to 0. |

FIG. 18C    1803

| Fields in HE-SIG-A for an HE trigger-based PPDU ||||| 
|---|---|---|---|---|
| Two parts of HE-SIG-A | Bits | Field | # of Bits | Description |
| HE-SIG-A1 | B0 | Format | 1 | Differentiate between an HE SU PPDU and an HE trigger-based PPDU. Set to 0 for HE trigger-based PPDU Set to 1 for HE SU PPDU This field is reserved for an HE extended range SU PPDU |
| | B1:B6 | BSS Color | 6 | The BSS Color field is an identifier of the BSS Set to all "1" in-lieu of all "0" for no BSS color |
| | B7:B22 | Spatial Reuse | 16 | For 20 MHz bandwidth SR bits B0:B3 corresponding to entire 20 MHz. Each of the SR bits B4:B7, B8:11, and B12:B15 have identical values as B0:B3. For 40 MHz bandwidth SR bits B0:B3 corresponding to first 20 MHz and SR bits B4:B7 corresponding to second 20 MHz. SR Bits B8:B11 and B12:B15 have identical values as B0:B3 and B4:B7, respectively. For 80 MHz bandwidth SR bits B0:B3, B4:B7, B8:B11, and B12:B15 corresponding to first, second, third, and fourth 20 MHz, respectively. For 160 MHz bandwidth SR bits B0:B3, B4:B7, B8:B11, and B12:B15 corresponding to first, second, third, and fourth 40 MHz, respectively. NOTE- First, second, third, and fourth channel arranged in increasing order of absolute frequency |
| | B23:B24 | Bandwidth | 2 | Set to 0 for 20 MHz Set to 1 for 40 MHz Set to 2 for 80 MHz Set to 3 for 160/80+80 MHz |
| | B25 | Reserved | 1 | Reserved and set to 1 |

FIG. 19A        1901

| Fields in HE-SIG-A for an HE trigger-based PPDU |||||
|---|---|---|---|---|
| Two parts of HE-SIG-A | Bits | Field | # of Bits | Description |
| HE-SIG-A2 | B0:B6 | TXOP Duration | 7 | Indicates the remaining time in the current TXOP |
| | B7:B15 | Reserved | 9 | Reserved and set to 1 |
| | B16:B19 | CRC | 4 | CRC of bits 0 - 41 in HE-SIG-A. See 22.3.9.7.1 (CRC calculation for HE-SIG-A). The first bit to be transmitted is bit C3 as explained in 20.3.9.7.1 (CRC calculation for HE-SIG). |
| | B20:B25 | Tail | 6 | Used to terminate the trellis of the convolution decoder. Set to 0. |

FIG. 19B     1902

| Two parts of HE-SIG-A | Bits | Field | # of bits | Description |
|---|---|---|---|---|
| HE-SIG-A1 | B0 | Format | 1 | Differentiate between an HE SU PPDU and HE trigger-based PPDU. Set to 0 for HE trigger-based PPDU  Set to 1 for HE SU PPDU. This field is reserved for an HE Extended range SU PPDU. |
| | B1 | Beam Change | 1 | Set to 1 to indicate that the pre-HE STF portion of the SU PPDU is spatially mapped differently from HE-LTF1. Set to 0 to indicate that the pre-HE STF portion of SU PPDU is spatially mapped the same way as HE-LTF1 on each tone. |
| | B2 | UL/DL | 1 | Indicates whether the PPDU is sent UL or DL. Set to 0 for DL  Set to 1 for UL. This field indicates DL for TDLS. |
| | B3:B6 | MCS | 4 | For HE SU PPDU Set to n for MCSn, where n = 0, 1, 2, ..., 11.  Values 12 - 15 are reserved For HE Extended Range PPDU Set to n for MCSn where n = 0, 1, 2.  Values 3 - 15 are reserved |
| | B7 | DCM | 1 | Set to 1 to indicate that the payload of the SU PPDU is modulated with dual sub-carrier modulation for the MCS. Set to 0 indicates that the payload of the PPDU is not modulated with dual sub-carrier for the MCS.  DCM is only applicable to 1 and 2 spatial streams.  DCM is only applicable to MCS0, MCS1, MCS3, and MCS4.   DCM is not applicable to STBC. |
| | B8:B13 | BSS Color | 6 | Set to 1 to 62 to indicate BSS Color of the HE BSS. Set to 0 to indicate BSS Color for public action frames. Set to 63 for MBSS, IBSS, and TDLS, when AP does not provide a BSS Color. |
| | B14 | Reserved | 1 | Reserved and set to 1 |
| | B15:B18 | Spatial Reuse | 4 | |

| Two parts of HE-SIG-A | Bits | Field | # of bits | Description |
|---|---|---|---|---|
| HE-SIG-A1 | B19: B20 | Bandwidth | 2 | For HE SU PPDU<br>Set to 0 for 20 MHz  Set to 1 for 40 MHz  Set to 2 for 80 MHz  Set to 3 for 160/80+80 MHz |
| | B21: B22 | LTF + CP | 2 | Set to 0 for 1x HE-LTF + 0.8 us  Set to 1 for 2x HE-LTF + 0.8 us<br>Set to 2 for 2x HE-LTF + 1.6 us  Set to 3 for 4x HE-LTF + 3.2 us |
| | B23: B25 | Nsts | 3 | Indicates the number of spatial streams.<br>For HE SU PPDU<br>Set to n for n+1 space time stream, where n = 0, 1, 2,......,7.<br>For HE Extended Range PPDU<br>Set to 0 for 1 space time stream    Value of 1 is TBD    Values 2 - 7 are reserved |

FIG. 20B    2002

| Two parts of HE-SIG-A | Bits | Field | # of bits | Description |
|---|---|---|---|---|
| HE-SIG-A2 | B0:B6 | TXOP Duration | 7 | Set to 0 to 126 to indicate Txop duration. Set to 127 to indicate that Txop Duration is not set. |
| | B7 | Coding | 1 | Indicates whether BCC or LDPC is used. Set to 0 for BCC    Set to 1 for LDPC |
| | B8 | LDPC Extra Symbol Segment | 1 | Indicates presence of extra OFDM symbol segment for LDPC Set to 0 for LDPC extra symbol not present    Set to 1 for LDPC extra symbol present. NOTE- This field is reserved and set to 1 when Coding field is set to 0 |
| | B9 | STBC | 1 | Set to 1 if STBC is used |
| | B10 | Tx BF | 1 | Set to 1 if a Beamforming steering matrix is applied to the waveform in an SU transmission Set to 0 otherwise |
| | B11:B13 | Packet Extension | 3 | The first two bits (B11, B12) indicate the "a-factor".    The third bit (B13) indicates the "PE-Disambiguity" |
| | B14 | Reserved | 1 | Reserved and set to 1 |
| | B15 | Doppler | 1 | Set to 1 to indicate Doppler procedure is used    Set to 0 otherwise |
| | B16:B19 | CRC | 4 | CRC of bits 0 - 41 in HE-SIG-A. See 22.3.9.7.1 (CRC calculation for HE-SIG-A). The first bit to be transmitted is bit C3 as explained in 20.3.9.7.1 (CRC calculation for HE-SIG). |
| | B20:B25 | Tail | 6 | Used to terminate the trellis of the convolution decoder.    Set to 0. |

FIG. 20C

| Two parts of HE-SIG-A | Bits | Field | # of bits | Description |
|---|---|---|---|---|
| HE-SIG-A1 | B0 | UL/DL | 1 | Indicates whether the PPDU is sent UL or DL.<br>Set to 0 for DL                                  Set to 1 for UL.<br>This field indicates DL for TDLS. |
| | B1:B3 | MCS | 3 | Indicates MCS of HE-SIG-B<br>Set to n for MCSn, where n = 0, 1, 2,.....5      Values 6 - 7 are reserved |
| | B4 | DCM | 1 | Set to 1 indicates that the HE-SIG-B is modulated with dual sub-carrier modulation for the MCS.<br>Set to 0 indicates that the HE-SIB-B is not modulated with dual sub-carrier modulation for the MCS.<br>DCM is only applicable to MCS0, MCS1, MCS3, and MCS4. |
| | B5:B10 | BSS Color | 6 | Set to 1 to 62 to indicate BSS Color of the HE BSS.<br>Set to 0 to indicate BSS Color for public action frames.<br>Set to 63 for MBSS, IBSS, and TDLS, when AP does not provide a BSS Color. |
| | B11:B14 | Spatial Reuse | 4 | |
| | B15:B17 | Bandwidth | 3 | |
| | B18:B21 | SIGB Number of Symbols/ Number of MU-MIMO Users | 4 | When SIGB compression field=0, indicates the number of HE-SIG-B symbols.<br>Set to n for n+1 HE-SIG-B symbol, where n = 0, 1, 2,.....15<br>When SIGB compression field=1, indicates the number of MU-MIMO users minus1. |

FIG. 21A    2101

| Two parts of HE-SIG-A | Bits | Field | # of bits | Description |
|---|---|---|---|---|
| HE-SIG-A1 | B22 | SIGB Compression | 1 | Set to 1 for full BW MU-MIMO. Set to 0 otherwise. |
| | B23: B24 | LTF and CP | 2 | Set to 0 for 1x HE-LTF + 0.8 us<br>Set to 2 for 2x HE-LTF + 1.6 us<br>Set to 1 for 2x HE-LTF + 0.8 us<br>Set to 3 for 4x HE-LTF + 3.2 us<br>NOTE - 1x + 0.8 us CP+LTF Type only applicable for full BW MU-MIMO or MU PPDU targeted to single user. |
| | B25 | Doppler | 1 | Set to 1 to indicate Doppler procedure is used. Set to 0 otherwise |

FIG. 21B  2102

| Two parts of HE-SIG-A | Bits | Field | # of bits | Description |
|---|---|---|---|---|
| HE-SIG-A2 | B0:B6 | Txop Duration | 7 | Set to 0 to 126 to indicate Txop duration. Set to 127 to indicate that Txop Duration is not set. |
| | B7 | Reserved | 1 | Reserved and set to 1 |
| | B8:B10 | Number of HE-LTF symbols | 3 | Indicates the number of HE-LTF symbols. Set to n for n+1 HE-LTF symbol, where n = 0, 1, 2,......7 |
| | B11 | LDPC Extra Symbol Segment | 1 | Indicates presence of extra OFDM symbol segment for LDPC Set to 0 for LDPC extra symbol not present  Set to 1 for LDPC extra symbol present. |
| | B12 | STBC | 1 | Set to 1 if STBC is used    Set to 0 otherwise |
| | B13:B15 | Packet Extension | 3 | The first two bits (B12, B13) indicate the "a-factor".  The third bit (B14) indicates the "PE-Disambiguity" |
| | B16:B19 | CRC | 4 | CRC of bits 0 - 41 in HE-SIG-A. See 22.3.9.7.1 (CRC calculation for HE-SIG-A). The first bit to be transmitted is bit C3 as explained in 20.3.9.7.1 (CRC calculation for HE-SIG). |
| | B20:B25 | Tail | 6 | Used to terminate the trellis of the convolution decoder.    Set to 0. |

FIG. 21C      2103

| Two parts of HE-SIG-A | Bits | Field | # of bits | Description |
|---|---|---|---|---|
| HE-SIG-A1 | B0 | Format | 1 | Differentiate between an HE SU PPDU and an HE trigger-based PPDU.<br>Set to 0 for HE trigger-based PPDU<br>Set to 1 for HE SU PPDU<br>This field is reserved for an HE extended range SU PPDU |
| | B1:B6 | BSS Color | 6 | Set to 1 to 62 to indicate BSS Color of the HE BSS.<br>Set to 0 to indicate BSS Color of public action frames.<br>Set to 63 for MBSS, IBSS, and TDLS, when AP does not provide a BSS Color. |
| | B7:B22 | Spatial Reuse | 16 | For 20 MHz bandwidth SR bits B8:B11 corresponding to entire 20 MHz. Each of the SR bits B12:B15, B16:B19, and B20:B23 have identical values as B8:B11.<br><br>For 40 MHz bandwidth SR bits B8:B11 corresponding to first 20 MHz and SR bits B12:B15 corresponding to second 20 MHz. SR Bits B16:B19 and B20:B23 have identical values as B8:B11 and B12:B15, respectively.<br><br>For 80 MHz bandwidth SR bits B8:B11, B12:B15, B16:B19, and B20:B23 corresponding to first, second, third, and fourth 20 MHz, respectively.<br><br>For 160 MHz bandwidth SR bits B8:B11, B12:B15, B16:B19, and B20:B23 corresponding to first, second, third, and fourth 40 MHz, respectively.<br>NOTE- First, second, third, and fourth channel arranged in increasing order of absolute frequency |
| | B23 | Reserved | 1 | Reserved and set to value indicated in the Trigger frame |
| | B24:B25 | Bandwidth | 2 | Set to 0 for 20 MHz<br>Set to 2 for 80 MHz<br>Set to 1 for 40 MHz<br>Set to 3 for 160/80+80 MHz |

FIG. 22A      2201

| Two parts of HE-SIG-A | Bits | Field | # of bits | Description |
|---|---|---|---|---|
| HE-SIG-A2 | B0:B6 | Txop Duration | 7 | Set to 0 to 126 to indicate Txop duration. Set to 127 to indicate that Txop Duration is not set. |
| | B7:B15 | Reserved | 9 | Reserved and set to value indicated in the Trigger frame |
| | B16:B19 | CRC | 4 | CRC of bits 0 - 41 in HE-SIG-A. See 22.3.9.7.1 (CRC calculation for HE-SIG-A). The first bit to be transmitted is bit C3 as explained in 20.3.9.7.1 (CRC calculation for HE-SIG). |
| | B20:B25 | Tail | 6 | Used to terminate the trellis of the convolution decoder. Set to 0. |

PREAMBLE DESIGN ASPECTS FOR HIGH EFFICIENCY WIRELESS LOCAL AREA NETWORKS

CROSS REFERENCES

The present application for patent claims priority to U.S. Provisional Patent Application No. 62/270,562 by Bharadwaj, et al., entitled "Preamble Design Aspects For High Efficiency Wireless Local Area Networks," filed Dec. 21, 2015 and to U.S. Provisional Patent Application No. 62/299,554 by Bharadwaj, et al., entitled "Preamble Design Aspects For High Efficiency Wireless Local Area Networks," filed Feb. 24, 2016 and to U.S. Provisional Patent Application No. 62/328,602 by Bharadwaj, et al., entitled "Preamble Design Aspects For High Efficiency Wireless Local Area Networks," filed Apr. 27, 2016, and to U.S. Provisional Patent Application No. 62/344,374 by Bharadwaj, et al., entitled "Preamble Design Aspects For High Efficiency Wireless Local Area Networks, filed Jun. 1, 2016 and to U.S. Provisional Patent Application No. 62/365,329 by Bharadwaj, et al., entitled "Preamble Design Aspects For High Efficiency Wireless Local Area Networks filed Jul. 21, 2016 and assigned to the assignee hereof.

BACKGROUND

Field of the Disclosure

The present disclosure, for example, relates to wireless communication systems, and more particularly to design aspects of high efficiency wireless local area networks (WLANs).

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a Wireless Local Area Network (WLAN), such as a Wi-Fi network (IEEE 802.11) may include an access point (AP) that may communicate with one or more stations (STAs) or mobile devices. The AP may be coupled to a network, such as the Internet, and enable a mobile device to communicate via the network (and/or communicate with other devices coupled to the access point).

A first signaling field and/or a second signaling field of a preamble used for transmitting frames in high efficiency (HE) wireless local area networks (WLANs) can be modified to improve performance and efficiency of HE WLANs.

SUMMARY

Methods, apparatuses, and computer readable media for supporting preamble design aspects of high efficiency WLANs are disclosed.

A method of wireless communication is described. The method may include generating an indication that a first channel of a plurality of channels associated with a transmission frame has been punctured, the transmission frame including a WLAN signaling field, identifying information associated with the WLAN signaling field corresponding to the punctured first channel, and transmitting the indication that the first channel has been punctured and the information associated with the WLAN signaling field in a second channel of the plurality of channels.

An apparatus for wireless communication is described. The apparatus may include means for generating an indication that a first channel of a plurality of channels associated with a transmission frame has been punctured, the transmission frame including a WLAN signaling field, means for identifying information associated with the WLAN signaling field corresponding to the punctured first channel, and means for transmitting the indication that the first channel has been punctured and the information associated with the WLAN signaling field in a second channel of the plurality of channels.

Another apparatus for wireless communication is described. The apparatus may include a processor, memory in electronic communication with the processor, and instructions stored in the memory. The instructions may be operable to cause the processor to generate an indication that a first channel of a plurality of channels associated with a transmission frame has been punctured, the transmission frame including a WLAN signaling field, identify information associated with the WLAN signaling field corresponding to the punctured first channel, and transmit the indication that the first channel has been punctured and the information associated with the WLAN signaling field in a second channel of the plurality of channels.

A non-transitory computer readable medium for wireless communication is described. The non-transitory computer-readable medium may include instructions operable to cause a processor to generate an indication that a first channel of a plurality of channels associated with a transmission frame has been punctured, the transmission frame including a WLAN signaling field, identify information associated with the WLAN signaling field corresponding to the punctured first channel, and transmit the indication that the first channel has been punctured and the information associated with the WLAN signaling field in a second channel of the plurality of channels.

Some examples of the method, apparatus, and non-transitory computer-readable medium described above may further include processes, features, means, or instructions for selecting, based at least in part on the punctured first channel, a resource unit (RU) allocation bit sequence for the transmission frame. Some examples of the method, apparatus, and non-transitory computer-readable medium described above may further include processes, features, means, or instructions for transmitting the RU allocation sequence to convey the information associated with the WLAN signaling field corresponding to the punctured first channel.

In some examples of the method, apparatus, and non-transitory computer-readable medium described above, the RU allocation sequence may be transmitted in a high efficiency (HE) signaling B (HE-SIG-B) field of the transmission frame.

In some examples of the method, apparatus, and non-transitory computer-readable medium described above, the first channel comprises a secondary 20 MHz channel of the transmission frame, the transmission frame having an 80 MHz bandwidth.

In some examples of the method, apparatus, and non-transitory computer-readable medium described above, the indication comprises a bandwidth subfield set to 4.

In some examples of the method, apparatus, and non-transitory computer-readable medium described above, the first channel comprises a 20 MHz sub-channel of a 40 MHz secondary channel of the transmission frame, the transmission frame having an 80 MHz bandwidth.

In some examples of the method, apparatus, and non-transitory computer-readable medium described above, the indication comprises a bandwidth subfield set to 5.

In some examples of the method, apparatus, and non-transitory computer-readable medium described above, the first channel comprises a 20 MHz sub-channel of an 80 MHz primary channel of the transmission frame, the transmission frame having a cumulative bandwidth of 160 MHz.

In some examples of the method, apparatus, and non-transitory computer-readable medium described above, the indication comprises a bandwidth subfield set to 6.

In some examples of the method, apparatus, and non-transitory computer-readable medium described above, the WLAN signaling field comprises a high efficiency (HE) signaling A (HE-SIG-A) field.

In some examples of the method, apparatus, and non-transitory computer-readable medium described above, the indication may be associated with a bandwidth subfield of the HE-SIG-A field.

In some examples of the method, apparatus, and non-transitory computer-readable medium described above, the WLAN signaling field may be associated with a high efficiency multi-user (MU) physical layer convergence protocol data unit (PPDU).

A method of wireless communication is described. The method may include generating an indication that a first channel of a plurality of channels associated with a transmission frame has been punctured, the transmission frame including a first WLAN signaling field, identifying information associated with the first WLAN signaling field corresponding to the punctured first channel, transmitting the indication that the first channel has been punctured in a second WLAN signaling field of the transmission frame, and transmitting the information associated with the first WLAN signaling field in a second channel of the plurality of channels.

An apparatus for wireless communication is described. The apparatus may include means for generating an indication that a first channel of a plurality of channels associated with a transmission frame has been punctured, the transmission frame including a first WLAN signaling field, means for identifying information associated with the first WLAN signaling field corresponding to the punctured first channel, means for transmitting the indication that the first channel has been punctured in a second WLAN signaling field of the transmission frame, and means for transmitting the information associated with the first WLAN signaling field in a second channel of the plurality of channels.

Another apparatus for wireless communication is described. The apparatus may include a processor, memory in electronic communication with the processor, and instructions stored in the memory. The instructions may be operable to cause the processor to generate an indication that a first channel of a plurality of channels associated with a transmission frame has been punctured, the transmission frame including a first WLAN signaling field, identify information associated with the first WLAN signaling field corresponding to the punctured first channel, transmit the indication that the first channel has been punctured in a second WLAN signaling field of the transmission frame, and transmit the information associated with the first WLAN signaling field in a second channel of the plurality of channels.

A non-transitory computer readable medium for wireless communication is described. The non-transitory computer-readable medium may include instructions operable to cause a processor to generate an indication that a first channel of a plurality of channels associated with a transmission frame has been punctured, the transmission frame including a first WLAN signaling field, identify information associated with the first WLAN signaling field corresponding to the punctured first channel, transmit the indication that the first channel has been punctured in a second WLAN signaling field of the transmission frame, and transmit the information associated with the first WLAN signaling field in a second channel of the plurality of channels.

In some examples of the method, apparatus, and non-transitory computer-readable medium described above, the second WLAN signaling field of the transmission frame comprises a bandwidth field indicating both a bandwidth associated with the transmission frame and a location of the second channel within the plurality of channels.

Some examples of the method, apparatus, and non-transitory computer-readable medium described above may further include processes, features, means, or instructions for selecting, based at least in part on the punctured first channel, a resource unit (RU) allocation bit sequence for the transmission frame. Some examples of the method, apparatus, and non-transitory computer-readable medium described above may further include processes, features, means, or instructions for transmitting the RU allocation sequence to convey the information associated with the first WLAN signaling field corresponding to the punctured first channel.

In some examples of the method, apparatus, and non-transitory computer-readable medium described above, the RU allocation sequence may be transmitted in a HE-SIG-B field of the transmission frame.

In some examples of the method, apparatus, and non-transitory computer-readable medium described above, the first channel comprises a secondary 20 MHz channel of the transmission frame, the transmission frame having an 80 MHz bandwidth.

In some examples of the method, apparatus, and non-transitory computer-readable medium described above, the indication comprises a bandwidth subfield set to 4.

In some examples of the method, apparatus, and non-transitory computer-readable medium described above, the first channel comprises a 20 MHz sub-channel of a 40 MHz secondary channel of the transmission frame, the transmission frame having an 80 MHz bandwidth.

In some examples of the method, apparatus, and non-transitory computer-readable medium described above, the indication comprises a bandwidth subfield set to 5.

In some examples of the method, apparatus, and non-transitory computer-readable medium described above, the first channel comprises a 20 MHz sub-channel of an 80 MHz primary channel of the transmission frame, the transmission frame having a cumulative bandwidth of 160 MHz.

In some examples of the method, apparatus, and non-transitory computer-readable medium described above, the indication comprises a bandwidth subfield set to 6.

In some examples of the method, apparatus, and non-transitory computer-readable medium described above, the second WLAN signaling field comprises a HE-SIG-A field.

In some examples of the method, apparatus, and non-transitory computer-readable medium described above, the indication may be associated with a bandwidth subfield of the HE-SIG-A field.

In some examples of the method, apparatus, and non-transitory computer-readable medium described above, the WLAN signaling field may be associated with a high efficiency MU PPDU.

A method of wireless communication is described. The method may include identifying a bandwidth associated with a transmission frame, identifying a location for one or more content channels within the bandwidth, and transmitting the transmission frame including a WLAN signaling field indicating both the bandwidth and the location for the one or more content channels within the bandwidth of the transmission frame.

An apparatus for wireless communication is described. The apparatus may include means for identifying a bandwidth associated with a transmission frame, means for identifying a location for one or more content channels within the bandwidth, and means for transmitting the transmission frame including a WLAN signaling field indicating both the bandwidth and the location for the one or more content channels within the bandwidth of the transmission frame.

Another apparatus for wireless communication is described. The apparatus may include a processor, memory in electronic communication with the processor, and instructions stored in the memory. The instructions may be operable to cause the processor to identify a bandwidth associated with a transmission frame, identify a location for one or more content channels within the bandwidth, and transmit the transmission frame including a WLAN signaling field indicating both the bandwidth and the location for the one or more content channels within the bandwidth of the transmission frame.

A non-transitory computer readable medium for wireless communication is described. The non-transitory computer-readable medium may include instructions operable to cause a processor to identify a bandwidth associated with a transmission frame, identify a location for one or more content channels within the bandwidth, and transmit the transmission frame including a WLAN signaling field indicating both the bandwidth and the location for the one or more content channels within the bandwidth of the transmission frame.

In some examples of the method, apparatus, and non-transitory computer-readable medium described above, the WLAN signaling field comprises a HE-SIG-A field.

In some examples of the method, apparatus, and non-transitory computer-readable medium described above, the indication may be associated with a bandwidth subfield of the HE-SIG-A field.

In some examples of the method, apparatus, and non-transitory computer-readable medium described above, the WLAN signaling field may be associated with a high efficiency MU PPDU.

A method of wireless communication is described. The method may include generating an indication that a first channel of a plurality of channels associated with a transmission frame has been punctured, the transmission frame including a WLAN signaling field, identifying information associated with the WLAN signaling field corresponding to the punctured first channel, transmitting the information associated with the WLAN signaling field in a second channel of the plurality of channels, and transmitting the indication that the first channel has been punctured in the second channel or in a second WLAN signaling field of the transmission frame.

An apparatus for wireless communication is described. The apparatus may include means for generating an indication that a first channel of a plurality of channels associated with a transmission frame has been punctured, the transmission frame including a WLAN signaling field, means for identifying information associated with the WLAN signaling field corresponding to the punctured first channel, means for transmitting the information associated with the WLAN signaling field in a second channel of the plurality of channels, and means for transmitting the indication that the first channel has been punctured in the second channel or in a second WLAN signaling field of the transmission frame.

Another apparatus for wireless communication is described. The apparatus may include a processor, memory in electronic communication with the processor, and instructions stored in the memory. The instructions may be operable to cause the processor to generate an indication that a first channel of a plurality of channels associated with a transmission frame has been punctured, the transmission frame including a WLAN signaling field, identify information associated with the WLAN signaling field corresponding to the punctured first channel, transmit the information associated with the WLAN signaling field in a second channel of the plurality of channels, and transmit the indication that the first channel has been punctured in the second channel or in a second WLAN signaling field of the transmission frame.

A non-transitory computer readable medium for wireless communication is described. The non-transitory computer-readable medium may include instructions operable to cause a processor to generate an indication that a first channel of a plurality of channels associated with a transmission frame has been punctured, the transmission frame including a WLAN signaling field, identify information associated with the WLAN signaling field corresponding to the punctured first channel, transmit the information associated with the WLAN signaling field in a second channel of the plurality of channels, and transmit the indication that the first channel has been punctured in the second channel or in a second WLAN signaling field of the transmission frame.

In some examples of the method, apparatus, and non-transitory computer-readable medium described above, the second WLAN signaling field of the transmission frame comprises a bandwidth field indicating both a bandwidth associated with the transmission frame and a location of the second channel within the plurality of channels.

In some examples of the method, apparatus, and non-transitory computer-readable medium described above, the WLAN signaling field comprises a high efficiency signaling A (HE-SIG-A) field of the first channel or the second channel and the second WLAN signaling field comprises a HE-SIG-B field of the second channel.

Some examples of the method, apparatus, and non-transitory computer-readable medium described above may further include processes, features, means, or instructions for selecting, based at least in part on the punctured first channel, a resource unit (RU) allocation bit sequence for the transmission frame. Some examples of the method, apparatus, and non-transitory computer-readable medium described above may further include processes, features, means, or instructions for transmitting the RU allocation sequence to convey the information associated with the WLAN signaling field corresponding to the punctured first channel.

In some examples of the method, apparatus, and non-transitory computer-readable medium described above, the RU allocation sequence may be transmitted in a HE-SIG-B field of the transmission frame.

In some examples of the method, apparatus, and non-transitory computer-readable medium described above, the first channel comprises a secondary 20 MHz channel of the transmission frame, the transmission frame having an 80 MHz bandwidth. In some examples of the method, apparatus, and non-transitory computer-readable medium described above, the indication comprises a bandwidth subfield set to 4.

In some examples of the method, apparatus, and non-transitory computer-readable medium described above, the first channel comprises a 20 MHz sub-channel of a 40 MHz secondary channel of the transmission frame, the transmission frame having an 80 MHz bandwidth. In some examples of the method, apparatus, and non-transitory computer-readable medium described above, the indication comprises a bandwidth subfield set to 5.

In some examples of the method, apparatus, and non-transitory computer-readable medium described above, the first channel comprises a 20 MHz sub-channel of an 80 MHz primary channel of the transmission frame, the transmission frame having a cumulative bandwidth of 160 MHz. In some examples of the method, apparatus, and non-transitory computer-readable medium described above, the indication comprises a bandwidth subfield set to 6.

In some examples of the method, apparatus, and non-transitory computer-readable medium described above, the WLAN signaling field comprises a HE-SIG-A field.

In some examples of the method, apparatus, and non-transitory computer-readable medium described above, the indication may be associated with a bandwidth subfield of the HE-SIG-A field.

In some examples of the method, apparatus, and non-transitory computer-readable medium described above, the WLAN signaling field may be associated with a high efficiency MU PPDU.

Some examples of the method, apparatus, and non-transitory computer-readable medium described above may further include processes, features, means, or instructions for identifying a bandwidth associated with the transmission frame. Some examples of the method, apparatus, and non-transitory computer-readable medium described above may further include processes, features, means, or instructions for identifying a location for one or more content channels within the bandwidth. Some examples of the method, apparatus, and non-transitory computer-readable medium described above may further include processes, features, means, or instructions for transmitting the transmission frame including a WLAN signaling field indicating both the bandwidth and the location for the one or more content channels within the bandwidth of the transmission frame.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 6 illustrates an example of aspects of a portion of a lookup table for supporting preamble design aspects for HE WLANs in accordance with various aspects of the present disclosure;

FIG. 7 illustrates an example of aspects of a spatial configuration lookup table for supporting preamble design aspects for HE WLANs in accordance with various aspects of the present disclosure;

FIGS. 11C and 11D illustrates examples of channels for contiguous and non-contiguous channel bonding modes, in accordance with various aspects of the present disclosure;

FIG. 12 illustrates RU allocation table entries for supporting preamble design aspects for HE WLANs in accordance with various aspects of the present disclosure;

FIGS. 14A through 14D show a first HE-SIG-A field contents for a HE SU PPDU and HE extended range SU PPDU for supporting preamble design aspects for HE WLANs in accordance with various aspects of the present disclosure;

FIGS. 15A through 15C show a first HE-SIG-A field contents for a HE MU PPDU for supporting preamble design aspects for HE WLANs in accordance with various aspects of the present disclosure;

FIGS. 16A through 16B show a first HE-SIG-A field contents for a HE trigger-based PPDU for supporting preamble design aspects for HE WLANs in accordance with various aspects of the present disclosure;

FIGS. 17A through 17D show a second HE-SIG-A field contents for a HE SU PPDU and HE extended range SU PPDU for supporting preamble design aspects for HE WLANs in accordance with various aspects of the present disclosure;

FIGS. 18A through 18C show a second HE-SIG-A field contents for a HE MU PPDU for supporting preamble design aspects for HE WLANs in accordance with various aspects of the present disclosure;

FIGS. 19A through 19B show a second HE-SIG-A field contents for a HE trigger-based PPDU for supporting preamble design aspects for HE WLANs in accordance with various aspects of the present disclosure;

FIGS. 20A through 20C show a HE-SIG-A field contents for a HE SU PPDU and HE Extended Range SU PPDU for supporting preamble design aspects for HE WLANs in accordance with various aspects of the present disclosure;

FIGS. 21A through 21C show a HE-SIG-A field contents for a HE MU PPDU for supporting preamble design aspects for HE WLANs in accordance with various aspects of the present disclosure;

FIGS. 22A through 22B show a HE-SIG-A field contents for a HE Trigger-based PPDU for supporting preamble design aspects for HE WLANs in accordance with various aspects of the present disclosure.

DETAILED DESCRIPTION

Figure 1:
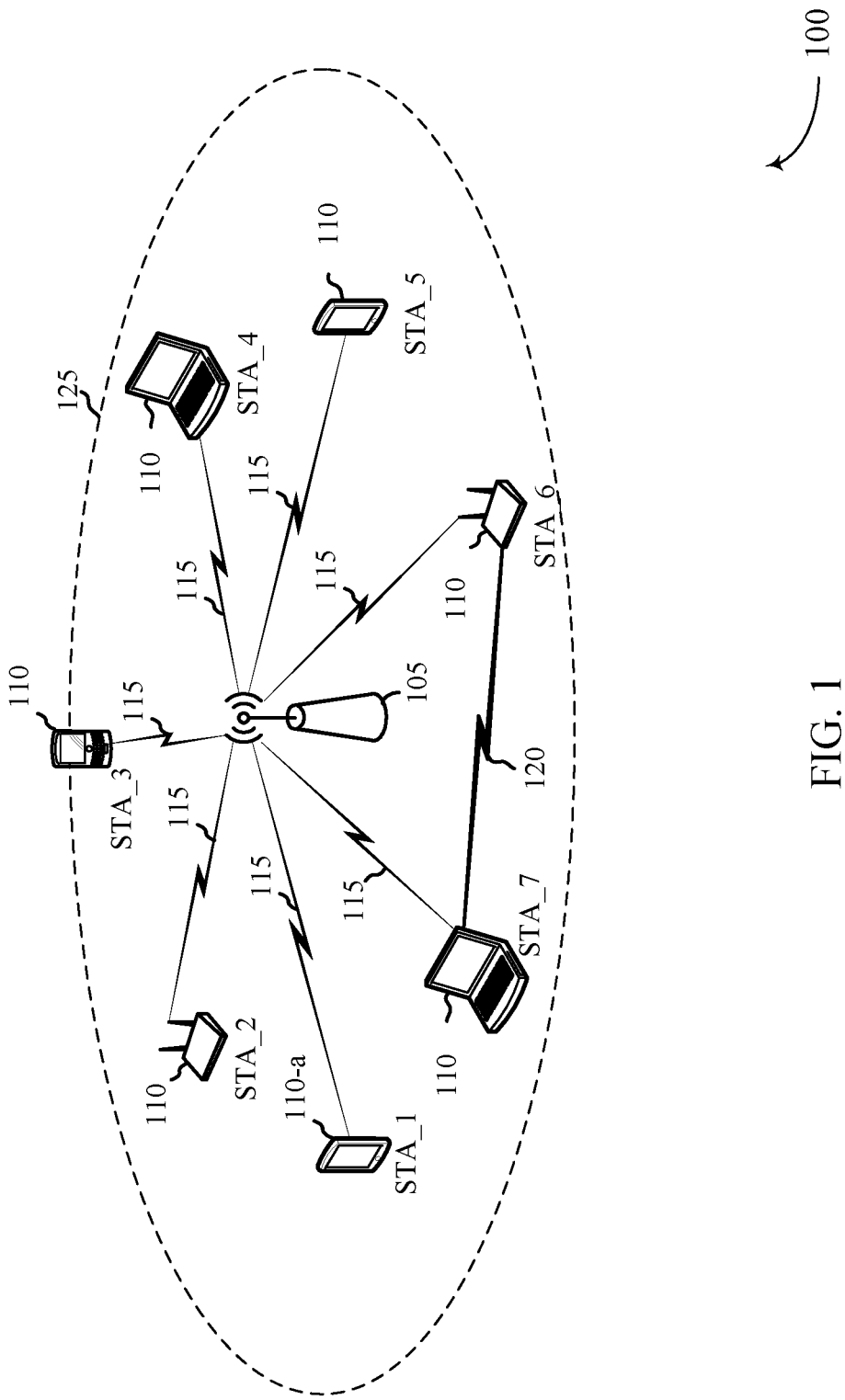
FIG. 1 illustrates an example of a wireless communications system that supports preamble design aspects for HE WLANs in accordance with various aspects of the present disclosure.

In accordance with various aspects of the present disclosure, a transmitter, for example an AP or station, identifies a resource unit (RU) configuration for a wireless local area network (WLAN) data field of a single user (SU) transmission frame that has a fixed bandwidth. The transmitter generates a RU indicator in a WLAN signaling field of a preamble of the SU transmission frame, the RU indicator identifying a RU size and a RU location within the WLAN data field. The transmitter then transmits the SU transmission frame.

In accordance with various aspects of the present disclosure, an AP identifies a first indicator identifying a number of multi-user multiple input multiple output (MU-MIMO) stations associated with a first RU in a first content channel of a transmission frame. The AP also generates a first common portion of a WLAN signaling field in the first content channel of the transmission frame, wherein the first common portion includes the first indicator. The AP identifies a second indicator identifying an absence of MU-MIMO stations associated with a second RU in a second content channel of the transmission frame. The AP generates a second common portion of the WLAN signaling field in the second content channel of the transmission frame, wherein the second common portion includes the second indicator. The AP then transmits the transmission frame that includes the WLAN signaling field.

In accordance with various aspects of the present disclosure, a first station receives a transmission frame that includes a WLAN signaling field decodable by a plurality of stations. The first station identifies, in a station-specific portion of the WLAN signaling field, an order for a plurality of station-specific information blocks associated with the plurality of stations. The station then determines a number of spatial streams allocated to the first station based at least in part on the identified order for the plurality of station-specific information blocks.

In accordance with various aspects of the present disclosure, a transmitter, for example an AP or station, receives a transmission frame associated with a plurality of channels, the transmission frame including a WLAN signaling field. The transmitter identifies a first number of stations associated with the WLAN signaling field for a first channel of the plurality of channels. The transmitter identifies a second number of stations associated with the WLAN signaling field for a second channel of the plurality of channels. The transmitter then determines whether a data portion of the transmission frame contains MU-MIMO content based at least in part on the identified first number of stations and the identified second number of stations.

In accordance with various aspects of the present disclosure, a transmitter, for example an AP or station, generates an indication that a first channel of a plurality of channels associated with a transmission frame has been punctured, the transmission frame including a WLAN signaling field. The transmitter identifies information associated with the WLAN signaling field corresponding to the punctured first channel. The transmitter then transmits the indication that the first channel has been punctured and the information associated with the WLAN signaling field in a second channel of the plurality of channels.

These and other aspects of the disclosure are further illustrated by and described with reference to apparatus diagrams, system diagrams, and flowcharts.

FIG. 1 illustrates an example of a wireless communications system 100 that supports preamble design aspects for HE WLANs in accordance with various aspects of the present disclosure. For simplicity, the wireless communications system 100 is referred to as WLAN 100 in the following discussion.

The WLAN 100 includes an AP 105 and wireless stations (STAs) 110 labeled as STA_1 through STA_7. The STAs 110 can be mobile handsets, tablet computers, personal digital assistants (PDAs), other handheld devices, netbooks, notebook computers, tablet computers, laptops, desktop computers, display devices (e.g., TVs, computer monitors, etc.), printers, etc. While only one AP 105 is illustrated, the WLAN 100 can have multiple APs 105. STAs 110, can also be referred to as a mobile stations (MS), mobile devices, access terminals (ATs), user equipment (UEs), subscriber stations (SSs), or subscriber units. The STAs 110 associate and communicate with the AP 105 via a communication link 115. Each AP 105 has a coverage area 125 such that STAs 110 within that area are within range of the AP 105. The STAs 110 are dispersed throughout the coverage area 125. Each STA 110 is stationary, mobile, or a combination thereof.

Although not shown in FIG. 1, a STA 110 can be covered by more than one AP 105 and can therefore associate with multiple APs 105 at different times. A single AP 105 and an associated set of STAs 110 is referred to as a basic service set (BSS). An extended service set (ESS) is a set of connected BSSs. A distribution system (DS) (not shown) is used to connect APs 105 in an extended service set. A coverage area 125 for an AP 105 can be divided into sectors making up only a portion of the coverage area (not shown). The WLAN 100 includes APs 105 of different types (e.g., metropolitan area, home network, etc.), with varying sizes of coverage areas and overlapping coverage areas for different technologies. Although not shown, other devices can communicate with the AP 105.

While the STAs 110 are capable of communicating with each other through the AP 105 using communication links 115, STAs 110 can also communicate directly with each other via direct wireless communication links 120. Direct wireless communication links can occur between STAs 110 regardless of whether any of the STAs is connected to an AP 105. Examples of direct wireless communication links 120 include Wi-Fi Direct connections, connections established by using a Wi-Fi Tunneled Direct Link Setup (TDLS) link, and other peer-to-peer (P2P) group connections.

The STAs 110 and APs 105 shown in FIG. 1 communicate according to the WLAN radio and baseband protocol including physical (PHY) and medium access control (MAC) layers from IEEE 802.11, and its various versions including, but not limited to, 802.11b, 802.11g, 802.11a, 802.11n, 802.11ac, 802.11ad, 802.11ah, 802.11z, 802.11ax, etc.

Transmissions to/from STAs 110 and APs 105 oftentimes include control information within a header that is transmitted prior to data transmissions. The information provided in a header is used by a device to decode the subsequent data. High efficiency (HE) WLAN preambles can be used to schedule multiple devices, such as STAs 110, for single-user simultaneous transmission (e.g., single-user orthogonal frequency division multiple access (SU-OFDMA)) and/or MU-MIMO transmissions (e.g., multiple-input/multiple-output MU-MIMO). In one example a HE WLAN signaling field is used to signal a resource allocation pattern to multiple receiving STAs 110. The HE WLAN signaling field includes a common user field that is decodable by multiple STAs 110, the common user field including a resource allocation field. The resource allocation field indicates resource unit distributions to the multiple STAs 110 and indicates which resource units in a resource unit distribution correspond to MU-MIMO transmissions and which resource units correspond to OFDMA single-user transmissions. The HE WLAN signaling field also includes, subsequent to the common user field, dedicated user fields that are assigned to certain STAs 110. The order in which the dedicated user fields are generated corresponds to the allocated resource units (e.g., the first dedicated user field corresponds to the first allocated resource unit). The HE WLAN signaling field is transmitted with a WLAN preamble to the multiple STAs 110.

Figure 2:
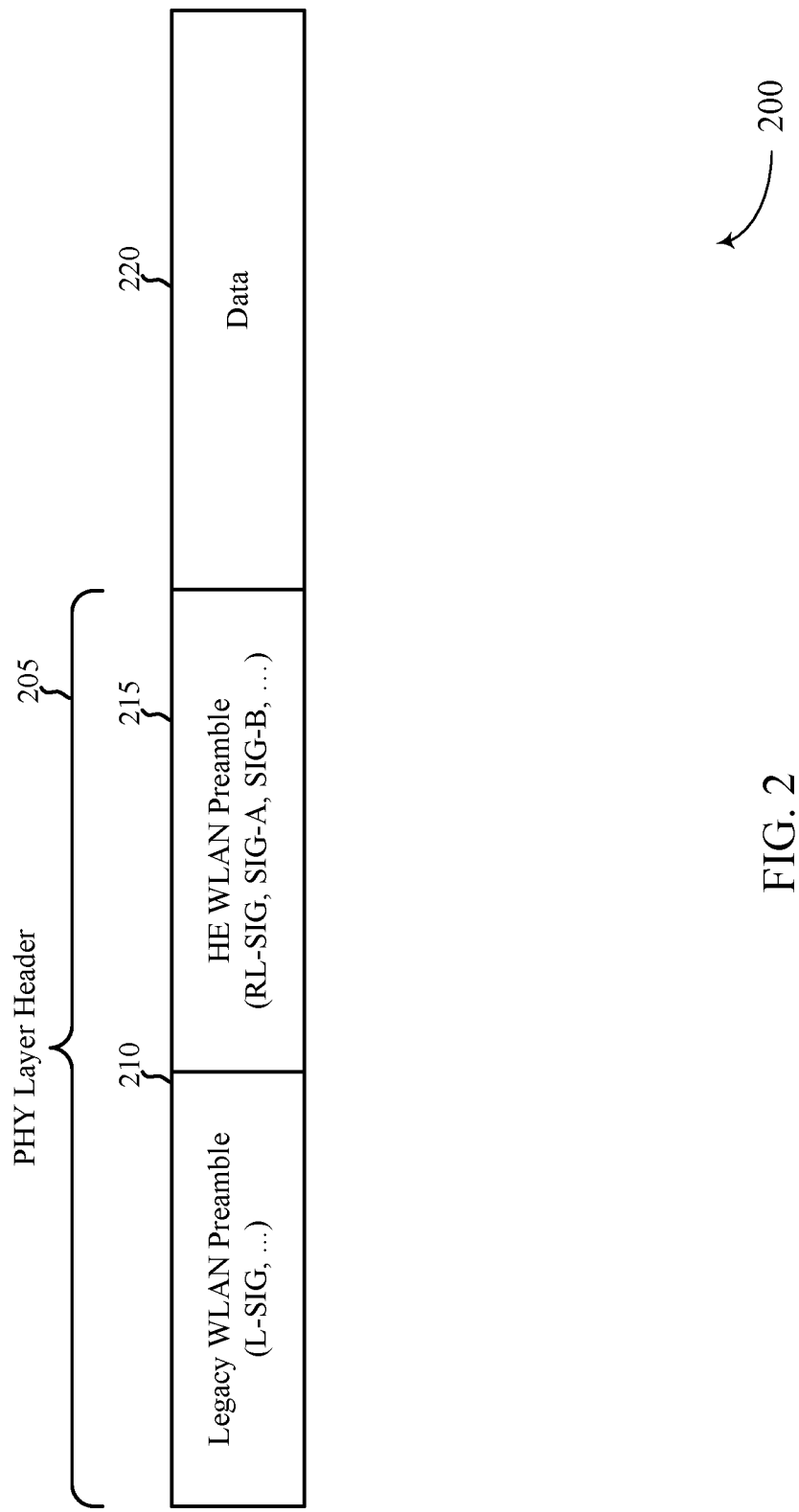
FIG. 2 shows an example of a WLAN protocol data unit (PDU) (e.g., a physical layer convergence PDU (PPDU)) preamble design aspects for HE WLANs in accordance with various aspects of the present disclosure.

FIG. 2 shows an example of a WLAN protocol data unit (PDU) 200 (e.g., a physical layer convergence PDU (PPDU)) preamble design aspects for HE WLANs in accordance with various aspects of the present disclosure. WLAN PDU 200 illustrates aspects of a transmission between a STA 110 and an AP 105, as described above with reference to FIG. 1.

In this example, the WLAN PDU 200 includes a physical (PHY) layer header 205 and a data field 220 (e.g., a MAC PDU (MPDU) or physical layer service data unit (PSDU)). The PHY layer header 205 includes a legacy WLAN preamble 210 and a high efficiency WLAN preamble 215. The preambles and data field are transmitted in the following order: legacy WLAN preamble 210, high efficiency WLAN preamble 215, data field 220.

The WLAN PDU 200 is transmitted over a radio frequency spectrum band, which in some examples may include a plurality of sub-bands. In some examples, the radio frequency spectrum band may have a bandwidth of 80 MHz, and each of the sub-bands may have a bandwidth of 20 MHz. The legacy WLAN preamble 210 includes legacy short training field (STF) (L-STF) information, legacy long training field (LTF) (L-LTF) information, and legacy signaling (L-SIG) information. When the radio frequency spectrum band includes multiple sub-bands, the L-STF, L-LTF, and L-SIG information is duplicated and transmitted in each of the plurality of sub-bands. The legacy preamble is used for packet detection, automatic gain control, channel estimation, etc. The legacy preamble is also used to maintain compatibility with legacy devices.

The high efficiency WLAN preamble 215 includes any of: a repeated legacy WLAN field (e.g., an RL-SIG field), a first WLAN signaling field (e.g., a first HE WLAN signaling field such as HE-SIG-A), a second WLAN signaling field (e.g., a second HE WLAN signaling field such as HE-SIG-B), a WLAN STF (e.g., a HE WLAN STF), and at least one WLAN LTF (e.g., at least one HE WLAN LTF). The HE WLAN preamble 215 enables an AP to simultaneously transmit to multiple stations (e.g., MU-MIMO) and also enables an AP to allocate resources to multiple stations for uplink/downlink transmissions (e.g., SU-OFDMA). The HE WLAN preamble 215 uses a common signaling field and one or more dedicated (e.g., station-specific) signaling fields to schedule resources and to indicate the scheduling to other WLAN devices. A device uses the scheduling to determine which resource units associated with the frequency spectrum utilized by data field 220 have been allocated to the device for forthcoming communications.

Figure 3:
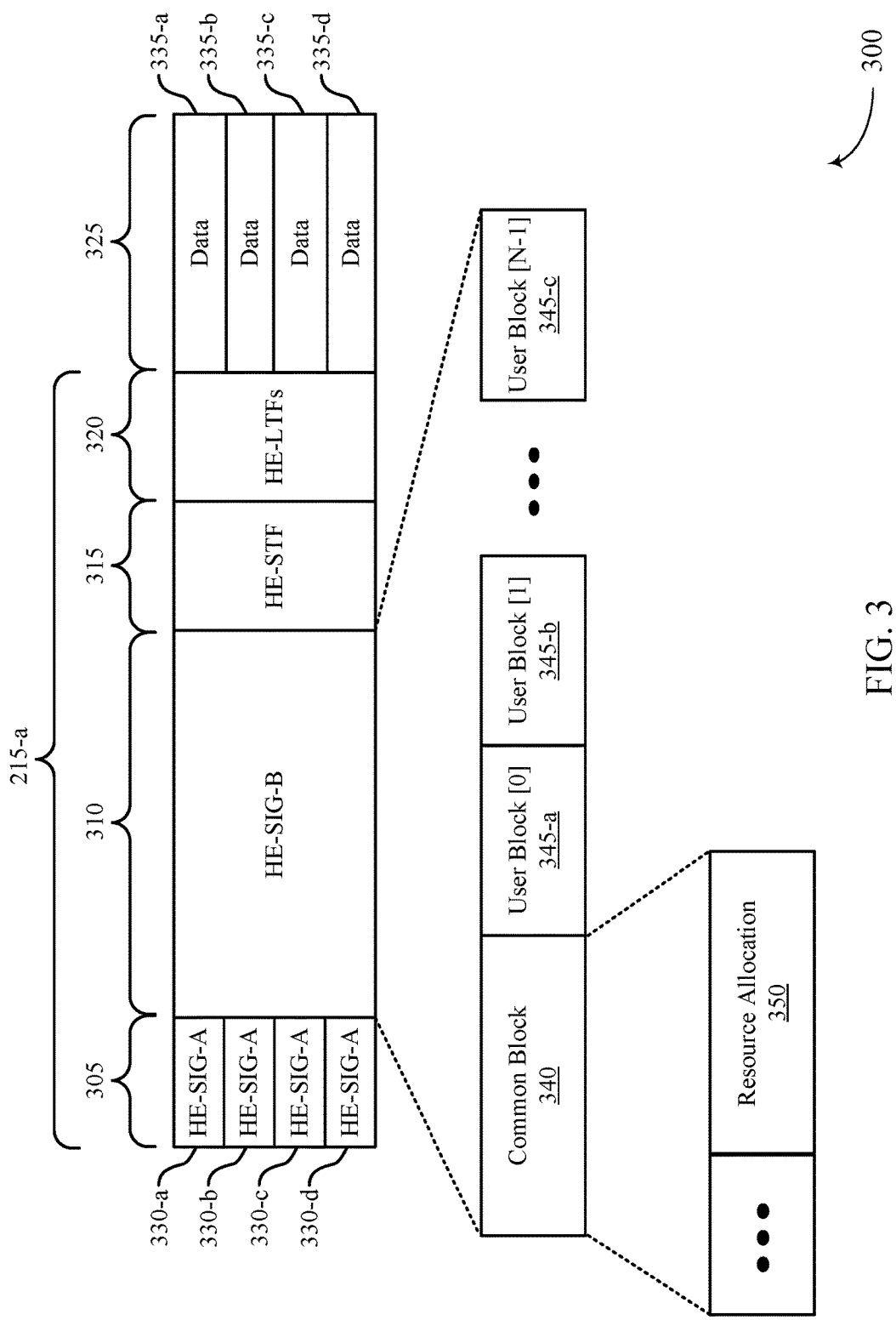
FIG. 3 illustrates an example of aspects of a WLAN protocol data unit for preamble design aspects for HE WLANs in accordance with various aspects of the present disclosure.

FIG. 3 illustrates an example of aspects of a WLAN PDU 300 for preamble design aspects for HE WLANs in accordance with various aspects of the present disclosure. WLAN PDU 300 illustrates aspects of a transmission between a STA 110 and an AP 105, as described above with reference to FIGS. 1-2. WLAN PDU 300 includes a first WLAN signaling field 305, a second WLAN signaling field 310, a high efficiency STF 315, a high efficiency LTF 320, and a data field 325. The first WLAN signaling field 305 includes an HE-SIG-A 330 that is repeated across multiple subbands. The data field 325 includes data portions 335 that have been allocated to different devices. For instance, data portion 335-a is allocated to a first device, data portion 335-b to a second device, data portion 335-c to a first group of devices, and data portion 335-d to a second group of devices.

The first WLAN signaling field 305 includes high efficiency WLAN signaling information usable by APs and stations other than a number of APs or stations identified to receive or transmit communications in the WLAN PDU 300. The first WLAN signaling field 305 also includes information usable by the identified number of APs or stations to decode the second WLAN signaling field 310. When the radio frequency spectrum band includes a plurality of sub-bands, the information (e.g., HE-SIG-A 330-a) included in the first WLAN signaling field 305 is duplicated and transmitted in each sub-band of the first WLAN signaling field 305, (e.g., HE-SIG-A 330-b to 330-d).

The second WLAN signaling field 310 includes high efficiency WLAN signaling information usable by a number of APs or stations identified to transmit or receive communications in the WLAN PDU 300. More specifically, the second WLAN signaling field 310 includes information usable by the number of APs or stations to transmit/encode or receive/decode data in the data field 220. The second WLAN signaling field 310 can be encoded separately from the first WLAN signaling field 305. The second WLAN signaling field 310 includes a common block field 340 that signals information to a group of devices, such as high efficiency STAs within range of an AP, and user blocks 345-a to 345-c that signal information specific to specific high efficiency STAs. The common block includes a resource allocation field 350 that signals to the high efficiency device how the data field 325 is partitioned amongst devices (e.g., partitions the data field into resource units), which of the resource units are associated with SU-OFDMA and which are associated with MU-MIMO. Furthermore, the order of the user blocks 345 provides a link between the device associated with the user block 345 and the resource unit that has been allocated to the device. As an example, the resource allocation field 350 partitions the data field into nine regions (e.g., 20 MHz data region is partitioned into nine sub-regions that each span 26 tones). The STA addressed in the first user block corresponds to the first 26 tones, the second STA addressed in the second user block corresponds to the next 26 tones, etc. The common block may also include other fields, such as a LTF.

Figure 4A:
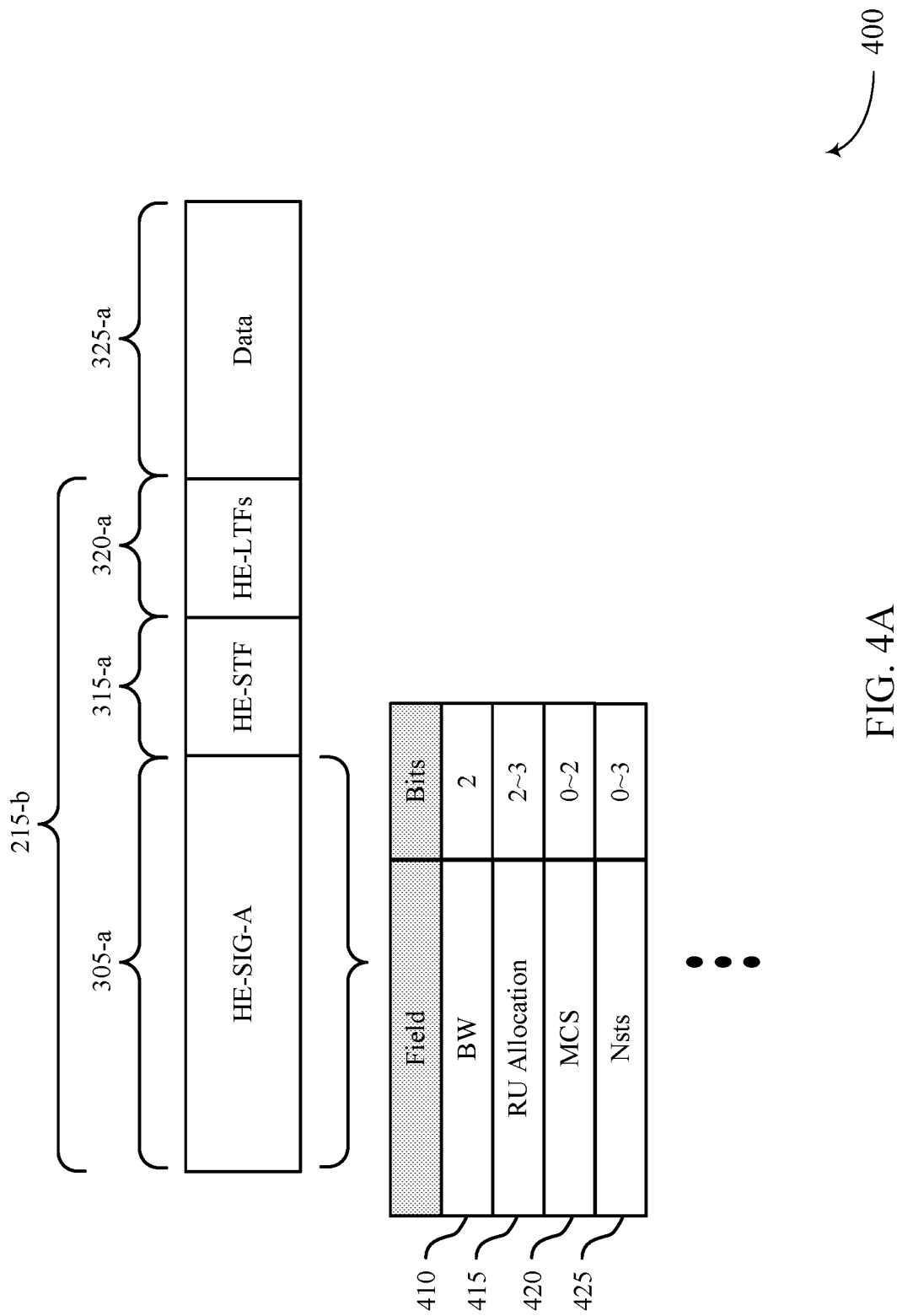
FIGS. 4A, 4B, and 4C illustrate examples of aspects of a WLAN protocol data unit for preamble design aspects for HE WLANs in accordance with various aspects of the present disclosure.

FIG. 4A illustrates an example of aspects of a WLAN PDU 400 for preamble design aspects for HE WLANs in accordance with various aspects of the present disclosure. WLAN PDU 400 illustrates aspects of a transmission between a STA 110 and an AP 105, as described above with reference to FIGS. 1-2. WLAN PDU 400 includes a first WLAN signaling field 305-*a*, a high efficiency STF 315-*a*, a high efficiency LTF 320-*a*, and a data field 325-*a*. The first WLAN signaling field 305-*a* includes an HE-SIG-A 330 that is repeated across multiple subbands. The data field 325 may include data portions that have been allocated to different devices.

A transmission sent in the HE extended range PPDU format may be sent in environments where using a longer range transmission is desirable, e.g. this format may be used for communication with internet of thing (IoT) devices, sensors, etc. A HE extended range PPDU may also have a simpler structure and be more robust as compared to one or more other HE PPDU formats that may be used for SU transmissions. For example, a HE extended range PPDU format may use a repeated HE-SIG-A field in its preamble to provide for more robust reception. A HE extended range PPDU may also be configured to allow for the signaling of smaller resource units.

In contrast to a generic SU HE PPDU that may select among several different bandwidths or have a varying bandwidth (as signaled in the HE preamble), a HE extended range PPDU for SU transmissions may use a fixed bandwidth, e.g. 20 MHz, that may be smaller than the bandwidth available for the generic SU HE PPDU, e.g. where the SU HE PPDU bandwidth is 40 MHz, 80 MHz, or 160 MHz. Using a smaller, fixed bandwidth may allow for transmissions to be sent with a higher power than if the same amount of power were spread across a larger bandwidth, e.g. 40 MHz, 80 MHz, or 160 MHz, increasing range and robustness for the transmissions. For example, the power for the preamble of the HE extended range PPDU may be increased or boosted 3 dB above the transmission power of a generic SU HE PPDU. In some case, just the power of the preamble may be boosted by the transmitter to increase the likelihood of successful reception and decoding. In other examples, the entire PPDU may be boosted, e.g. by 3 dB. In other examples, the HE extended range PPDU may also boost the power of the transmitted preamble when using a larger bandwidth, such as a 40 MHz, 80 MHz, or 160 MHz bandwidth.

Figure 4B:
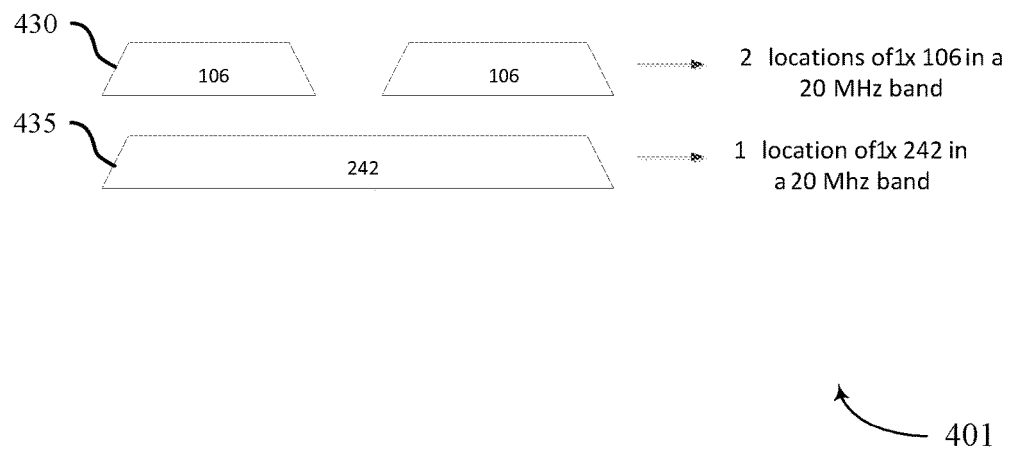

FIG. 4B illustrates an example 401 of aspects of a WLAN PDU for preamble design aspects for HE WLANs in accordance with various aspects of the present disclosure. In the SU HE extended range PPDU in a 20 MHz band illustrated in FIG. 4B, transmissions to individual users may be allocated to one or more RUs within a tone unit of a PPDU. A size of a RU may be constrained to be one of 106 or 242 tones. In one example of a PPDU, all 242 tones may be allocated to a user for a SU transmission as a single 242-tone RU 435. In another PPDU, 106 tones may be allocated as a first 106-tone RU 430 to a first user for SU transmission, which may be located in one of two positions. 106 tones may also be allocated as a second 106-tone RU 430 in this example. Thus, 3 different RU positions may be available for RU allocation, which may be indicated by a minimum of 2 bits of an RU allocation field 415.

Figure 4C:
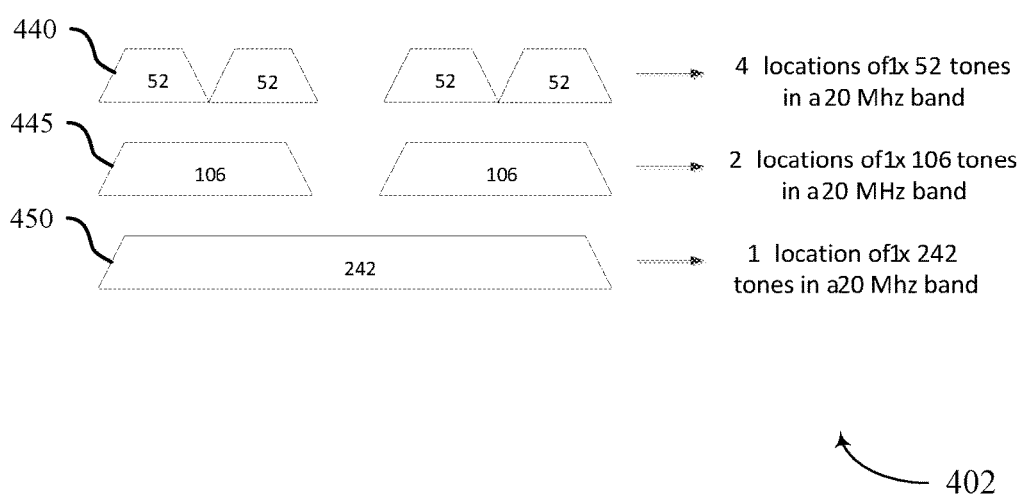

FIG. 4C illustrates an example 402 of aspects of a WLAN PDU for preamble design aspects for HE WLANs in accordance with various aspects of the present disclosure. In the SU HE extended range PPDU in a 20 MHz band illustrated in FIG. 4C, transmissions to individual users may be allocated to one or more RUs within a tone unit of a PPDU. A size of a RU may be constrained to be one of 52, 106, or 242 tones. In one example of a PPDU, all 242 tones may be allocated to a user for a SU transmission as a single 242-tone RU 450. In another PPDU, 106 tones may be allocated as a first 106-tone RU 445 to a first user for SU transmission, which may be located in one of two positions. 106 tones may also be allocated as a second 106-tone RU 445 in this example. In yet another PPDU, 52 tones may be allocated as a first 52-tone RU 440 to a first user for SU transmission, which may be located in one of four positions. 52 tones may also be allocated as a second 52-tone RU 440, as a third 52-tone RU 440, and as a fourth 52-tone RU 440 in this example, for up to 4 different users. Thus, 7 different RU positions may be available for RU allocation, which may be indicated by a minimum of 3 bits of an RU allocation field 415.

Thus, to maintain simplicity and reduce overhead, the number of combinations of RU sizes and locations may be limited to a maximum of 4 possibilities (for a 2 bit allocation as described above in reference to FIG. 4B) or a maximum of 8 possibilities (for a 3 bit allocation as described above in reference to FIG. 4C) for the HE extended range PPDU, meaning that 2 or 3 bits in the SIG-A field of the PPDU preamble may be used to identify, for a given RU, which of 3 or 7, respectively, possible RU sizes and locations are allocated. Where the bandwidth is fixed, for example to 20 MHz, additional bits are not needed in the SIG-A field of the PPDU preamble to identify the bandwidth used, simplifying the preamble.

In some examples, the RU allocation field 415 may only be used in an example where the bandwidth of PPDU is indicated by the BW field 410 to be 20 MHz. The 2 bits of the BW field 410 may be used to indicate that the PPDU uses one of four different bandwidths. Where the BW field 410 indicates a bandwidth of 20 MHz (or another predetermined bandwidth according to other examples), the recipient of the PPDU may assume that the HE-SIG-A field 305-*a* contains the RU allocation field 415 following the BW field 410, and the RU allocation field 415 may be followed by an MCS field 420 and a Nsts field 425, as illustrated in FIG. 4A. Where the BW field 410 indicates a bandwidth other than 20 MHz (or the other predetermined bandwidth), for example 40 MHz, 80 MHz, or 160 MHz, then the recipient of the PPDU may assume that the HE-SIG-A field 305-*a* contains MCS field 420 following the BW field 410, and that the RU allocation field 415 has been omitted. Although the BW field 410, RU allocation field 415, MCS field 420, and Nsts field 425 are illustrated as falling one immediately after the other, intermediate fields may exist, or the fields may be rearranged to occur at differing positions.

In some instances, the HE-SIG-A field 305-*a* where the BW field 410 indicates a higher bandwidth, e.g. 40 MHz, 80 MHz, or 160 MHz, the HE-SIG-A field for the SU HE extended range PPDU may have the same format as for a non-extended range format PPDU, e.g. the HE-SIG-A field for the SU HE PPDU. Maintaining a similar format for the HE-SIG-A field for certain bandwidths of the SU extended range HE PPDU as the SU HE PPDU may increase simplicity of implementation.

Where an RU allocation field 415 in the HE-SIG-A field 305-*a* (e.g. in the case where BW field 410 indicates a 20 MHz bandwidth), then additional bits in the HE-SIG-A field may be needed. For example, the size of the HE-SIG-A field 305-*a* may be constrained, such that introducing bits in an RU allocation field 415 may push the size of the field over that constraint. As described above, the size of the RU allocation field 415 may be 2 bits in some examples. In such case, the size of the MCS field may be limited to 2 bits, for example where the size of the MCS field 420 in the absence of an RU allocation field 415 would otherwise be 4 bits. Thus, the MCS values indicated by the MCS field 420 may be MCS0, MCS1, MCS2, and MCS3. In an example the four MCSs may correspond to a BPSK 1/2 MCS, a QPSK 1/2 MCS, a QPSK 3/4 MCS, and a 16-QAM 1/2 MCS, respectively.

As also described above, the size of the RU allocation field 415 may be 3 bits in some examples. In such case, the size of the MCS field may be limited to 1 bit. Thus, in one example, the MCS values indicated by the MCS field 420 may be MCS0 and MCS1. In an example the two MCSs may correspond to a BPSK 1/2 MCS and a QPSK 1/2 MCS, respectively. Thus, 1 bit may be used in the SIG-A field of the preamble to identify whether a first MCS or a second MCS is used to modulate and code the PPDU data; and 2 bits may be used in the SIG-A field of the preamble to identify whether a first, a second, a third, or a fourth MCS is used to modulate and code the PPDU data. In other examples, the MCS field may be omitted, such that MCS0 is used where the BW is indicated to be 20 MHz.

In other example, the number of spatial streams (Nsts) may also be limited so that the RU allocation field 415 may be used, or to provide further reserved bits to be used for other purposes. Thus, Nsts may be limited to two options, e.g. Nsts=0 or Nsts=1, and the SIG-A field may have a Nsts field 425 that may contain a single bit to indicate the number of spatial streams, Nsts. In other examples the Nsts field 425 may have 2 bits to indicate up to 4 spatial streams, or 3 bits to indicate up to 8 spatial streams. In other examples, the Nsts field 425 may be omitted, such that a single stream is used where the BW is indicated to be 20 MHz.

As described above, limiting the number of bits used for MCS field 420 and Nsts field 425 may also decrease the complexity that a receiver needs to handle and decoding, thus decreasing the power consumption at the receiver and decreasing the amount of testing that may need to be performed, even if the extra reserved bits created by limiting the size of such fields are not used for implementing other features.

Figure 5:
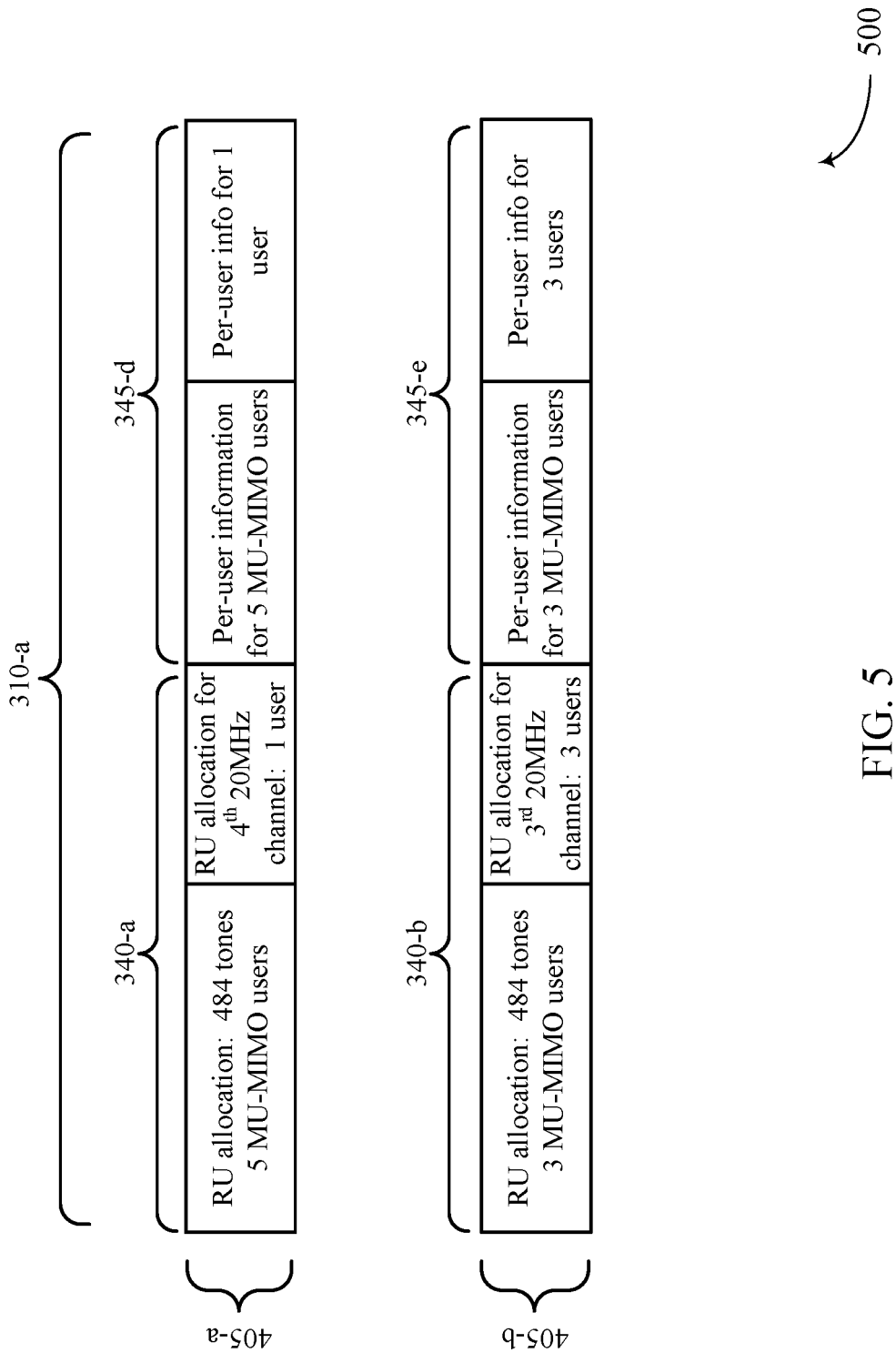
FIG. 5 illustrates an example of aspects of a WLAN protocol data unit for supporting preamble design aspects for HE WLANs in accordance with various aspects of the present disclosure.

FIG. 5 illustrates an example of aspects of a WLAN PDU 500 for supporting preamble design aspects for HE WLANs in accordance with various aspects of the present disclosure. WLAN PDU 500 illustrates aspects of a transmission between a STA 110 and an AP 105, as described above with reference to FIGS. 1-2. WLAN PDU 500 includes an HE-SIG-B field 310-*a*, which is an example of a second WLAN signaling field 310. HE-SIG-B field 310-*a* includes two content channels 405-*a* and 405-*b* including control information. In one example, a device decodes both channels to acquire all of the content signaled in the HE-SIG-B field 310-*a*. Furthermore, a device that receives a user block within a frequency band associated with a stream 405 also received data within the same frequency band. The common portion (e.g. the information in common block fields 340-*a* and 340-*b*) and dedicated portion (e.g., user blocks 345-*d* and 345-*e*) for every other 20 MHz channel are signaled together. User blocks 345-*d* and 345-*e* each include per user information for MU-MIMO users in user blocks and per-user information for SU users in user blocks. The dedicated portion, which includes per user information, including user blocks 345-*d* and 345-*e*, may be dynamically allocated between channels during load balancing.

For example, 8 MU-MIMO users may be allocated RUs in channel 405-*a* and channel 405-*b*. RUs may be allocated by the common portion 340-*a* of the HE-SIG-B field 310-*a* to 5 MU-MIMO users of the 8 MU-MIMO users. The dedicated portion 345-*d* of the HE-SIG-B field 310-*a* may then provide information, once decoded by a station that is one of the 5 MU-MIMO users, that identifies where data for that station is found in the data portion associated with the channel 405-*a* of the transmission frame. Similarly, RUs may be allocated by the common portion 340-*b* of the HE-SIG-B field 310-*a* to 5 MU-MIMO users of the 8 MU-MIMO users. The dedicated portion 345-*e* of the HE-SIG-B field 310-*a* may then provide information, once decoded by a station that is one of the 3 MU-MIMO users, that identifies where data for that station is found in the data portion associated with the channel 405-*b* of the transmission frame (e.g. PPDU).

To perform load balancing, a transmitter, e.g. an AP or station, may split up a number of MU-MIMO users in different ways. For WLAN PDU 500, 8 MU-MIMO users are split with 5 MU-MIMO users, which are allocated RUs of 484 tones associated with the first channel 405-*a*, and 3 MU-MIMO, which are allocated RUs of 484 tones associated with the second channel 405-*b*. In other examples, a user may be allocated RUs that are larger than the maximum RU size for a single channel. For example where the maximum RU size for a channel is 242 tones, an allocated RU for 1 or more MU-MIMO users may be 484 tones spanning two channels (e.g., two 20 MHz channels making a 40 MHz allocation). For these larger allocations, e.g. where the RU size is 484 tones or larger, a number of MU-MIMO users may be split between a first channel and a second channel, for example from 1 to 8 MU-MIMO users. However, for purposes of load balancing, where it may be desirable to balance RU allocations between a first channel and a second channel, it may assist load balancing to provide the ability to allocate zero or no MU-MIMO users to a channel. For example, where a first channel already has a number of blocks allocated to SU transmissions for a number of users, and a second channel has no such blocks allocated to SU transmissions, for purposes of load balancing, the transmitter may then allocate zero or no MU-MIMO blocks to the first channel, and each of the remaining MU-MIMO blocks for MU-MIMO users to the second channel.

FIG. 12 illustrates RU allocation table entries 1200 for supporting preamble design aspects for HE WLANs in accordance with various aspects of the present disclosure. In some examples for load balancing, a receiving station receive a downlink transmission including multiple channels, according to preamble design aspects for HE WLANs in accordance with various aspects of the present disclosure. The downlink transmission may include WLAN signaling field 310. The signaling field may include a common portion in a first channel, e.g. channel 405-*a* for a first number of users, and a common portion in a second channel, e.g. channel 405-*b* for a second number of user. In some examples, the receiving station may need to successfully decode the common portions of both SIG-B content channels to determine the total number of users so that a total number of user blocks may be determined. So that a station may decode one of the channels, but not necessarily the second channel, a total number of users may be indicated in RU allocation table 1200.

RU allocation table 1200 includes a number of entries 1205, an RU size 1210, and a user indication 1215. A brief explanation 1220 is also included in RU allocation table 1200. In this example, the RU size 1210 is 484 tones, but additional RU sizes may also be accommodated, for example 996 tones. In addition, the RU allocation table may have additional entries that are not shown in the RU allocation table portion shown in FIG. 12.

In the example illustrated in FIG. 12, 8 entries 1225 may be provided to indicate the number of users where load balancing is not being performed. Additional entries 1230 may be added to indicate the distribution of users between channels for load balancing. For example a first entry 1230 may indicate that there are no user blocks transmitted. A second entry 1225 indicates a user indication of "1+1" where the primary channel contains a first user block and the secondary channel contains a second user block. A third entry 1230 indicates "2+1" where that the primary channel contains two user blocks and the secondary channel contains one user block. And so on to the user indication of "4+4" indicating that the primary channel contains four user blocks and the secondary channel contains four user blocks.

In other examples, additional combinations may be added to the RU allocation table to provide further load balancing capabilities, e.g. entries 1230 for a "7+1" combination for the primary and secondary channels, or "2+4" for the primary and secondary channels, and so on. In other examples, each combination may be included in the RU allocation table. In addition, the RU allocation table may be needed for larger RU sizes, e.g. 996 tones, 996*2 tones, and so on.

FIG. 6 illustrates an example of aspects of a portion of a lookup table 600 for supporting preamble design aspects for HE WLANs in accordance with various aspects of the present disclosure. Lookup table 600 is a portion of a lookup table, specifically rows that contain RU allocations of at least 102 tones, that may be used to signal RU allocation signaling in a common block field of a HE-SIG-B field of a HE PPDU as described above. Lookup table 600 may indicate the location of the SIG-B dedicated content for large SU allocations, and allows for load balancing in the case of large RU sizes, e.g. 484 tones or larger. To provide the ability to transmit no or zero MU-MIMO blocks for a RU size of 484 tones or larger, a lookup table that indicates a number of MU-MIMO users associated with a RU may be modified by adding rows to the table. In particular a row 605 may be added so that, in addition to signaling that there are 1 through 8 MU-MIMO user blocks transmitted in a particular SIG-B content channel associated with the 484 tone RU allocation, that an indication of an absence of a MU-MIMO user block transmitted in the said SIG-B content channel with the 484 tone allocation, i.e. there is no MU-MIMO user block transmitted with the 484 tone allocation for that channel. Similarly, a row 610 may be added so that, in addition to signaling that there are 1 through 8 MU-MIMO user blocks transmitted with a SIG-B content channel with the 996 tone RU allocation, that an indication of an absence of a MU-MIMO user block in the said SIG-B content channel associated with the 996 tone allocation, i.e. there is no MU-MIMO user block transmitted with the 996 tone allocation for that channel. In other examples, the RU size may vary, such that the additional rows may be used where a RU allocation span multiple channels and an indication of zero or an absence of MU-MIMO user blocks may be indicated for a large RU allocation. It should be noted that where the allocation size is less than 484 tones, according to this example, additional rows may not be needed in the lookup table 600 because only a single channel will be used, and load balancing between 2 or more channels will not take place.

FIG. 7 illustrates an example of aspects of a spatial configuration lookup table 700 for supporting preamble design aspects for HE WLANs in accordance with various aspects of the present disclosure. A user field for an MU-MIMO allocation, e.g. in a HE-SIG-B field, may include a spatial configuration subfield of 4 bits indicating the number of spatial streams for each multiplexed STA, the index of the spatial stream, and the total number of spatial streams. Column Nuser indicates the number of users; Nuser may be indicated in the common portion (e.g. common block 340) of a HE-SIG-B field. Given Nuser, index of the spatial stream, the total number of spatial stream allocated, and an index of the user/station as determined by an order that the user/station appears in a dedicated portion of a second WLAN signaling field 310 (e.g. a HE-SIG-B field), the number of spatial stream associated with the particular user/station may be determined. The index of the spatial stream and total number of spatial streams allocated may be communicated explicitly. However, the index of the user/station needs to be determined based on the order in which it appears in the dedicated portion, as explained further below. Thus, the index may be implicitly determined based on the order, reducing overhead for explicit communication of the index.

In a transmission frame, e.g. a HE MU PPDU transmission frame using MU-MIMO RU allocations, the order of the dedicated portions 345 of a second WLAN signaling field 310 may be used to determine a number of spatial streams (Nsts) allocated to a particular user/station that has received the transmission frame. A station may receive a transmission frame that includes a second WLAN signaling field 310. The station may then decode the dedicated portions 345 of the second WLAN signaling field 310 and determine an order for the various stations or users in the MU-MIMO allocation along with the station that has received the transmission frame. The order may be predetermined for the station. For example, the station (when an AP is the transmitter) may determine that the order is based on the identity of the station according to the order that it appears in the dedicated portion 345 based on frequency, e.g. proceeding from the lowest subcarrier frequency to the highest subcarrier frequency (or vice-versa). In one example, the station may determine the order of stations appearing in the dedicated portion 345 without regard to whether a particular channel is dedicated as a primary channel (e.g. the primary 20 MHz channel) or a secondary channel (e.g. the secondary 20 MHz channel). In another example, the station may determine the order based on frequency, but first for the primary channel, followed by the secondary channel. For example, the station may proceed from the lowest subcarrier frequency to the highest subcarrier frequency (or vice-versa) for the primary channel, followed by the lowest subcarrier frequency to the highest subcarrier frequency (or vice-versa) for the secondary channel. Thus, the station may determine the order of stations having data communicated in the dedicated portion 345.

Having determined the order for each station in the dedicated portion, a user/station may determine its own index based on where the station appears in the order. That index may then be used in conjunction with spatial configuration lookup table 700 to determine the number of spatial streams for that station. For example, if Nuser=3, there are a total number of spatial streams equal to 8, and the station has determined that its index is equal to 2, then the number of spatial streams associated with the user/station is 3, corresponding to entry 705.

In some examples for supporting preamble design aspects for HE WLANs in accordance with various aspects of the present disclosure, a station may differentiate between SU and MU-MIMO allocations. Decoding and combining both SIG-B content channels may be used to distinguish between SU and MU-MIMO allocations. Due to load balancing as described above with reference to FIG. 5, Nuser may be one as indicated by a common portion 340 in a HE-SIG-B field for a large MU-MIMO allocation. Because the content of the SU and MU dedicated portions of a HE-SIG-B field may be different, Nuser indications in a first SIG-B content channel need to be combined with the content in a second SIG-B content channel. Through combining, if Nuser for the first content channel plus Nuser for the second content channel is greater than 1 (for the same RU), then the content is MU-MIMO dedicated content. If Nuser for the first content channel plus Nuser for the second content channel is not greater than 1 (for the same RU), the content is SU dedicated content.

Figure 8:
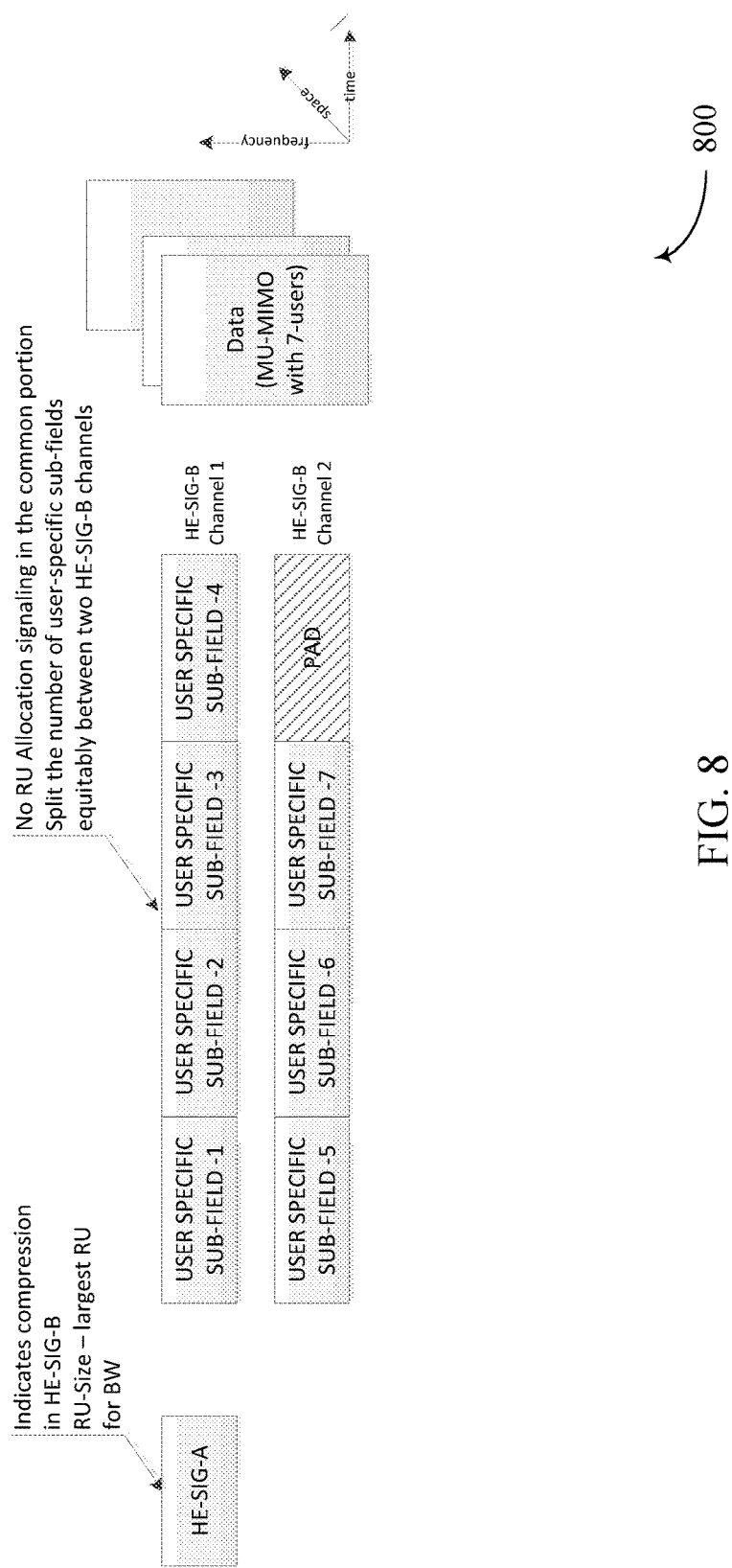
FIG. 8 illustrates an example of user specific sub-fields split between two HE-SIG-B content channels, in accordance with various aspects of the present disclosure.

In other examples for supporting preamble design aspects for HE WLANs in accordance with various aspects of the present disclosure, HE-SIG-B compressed mode 800 may be used. The compressed mode may be used for MU-MIMO utilizing a full bandwidth. In such case, no RU signal information is transmitted in a RE SIG-B filed. Instead, user specific sub-fields are split between the two HE-SIG-B content channels, as illustrated in FIG. 8. In the compressed mode, a number of MU-MIMO users need to be indicated. To accomplish this, a field in the SIG-A field corresponding to the number of SIG-B symbols may be re-interpreted or repurposed, and the number of SIG-B symbols derived from the number of MU-MIMO users. The number of MU-MIMO users may be computer from the number of SIG-B symbols, which could lead to ambiguity in the case where a high MCS is used. Thus, the number of MU-MIMO users may instead be indicated in a common portion of a HE-SIG-B field. This increases overhead because CRC and tail bits are also added to the common portion of the HE-SIG-B field.

In other examples for supporting preamble design aspects for HE WLANs in accordance with various aspects of the present disclosure, an HE-SIG-B design may use channel bonding. According to an example, SIG-B may not be transmitted in a channel that has been punctured, for example a 20 MHz channel. This may be regardless of whether the preamble in the transmission frame prior to the SIG-B field has been transmitted or not. The SIG-B transmission format may be determined for secondary 20 MHz channels that are not transmitted, or other such channels that are not transmitted. When a second 20 MHz channel is not transmitted, there may be multiple options to transmit such information.

Figure 11A:
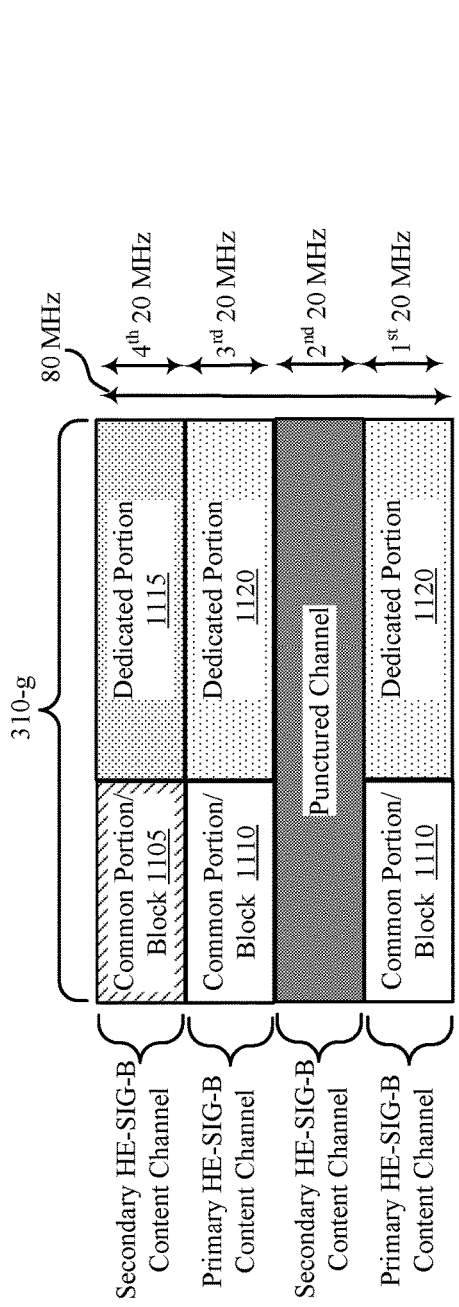
FIGS. 11A and 11B illustrate HE-SIG-B transmission formats that support preamble design aspects for HE WLANs in accordance with various aspects of the present disclosure.
Figure 11B:
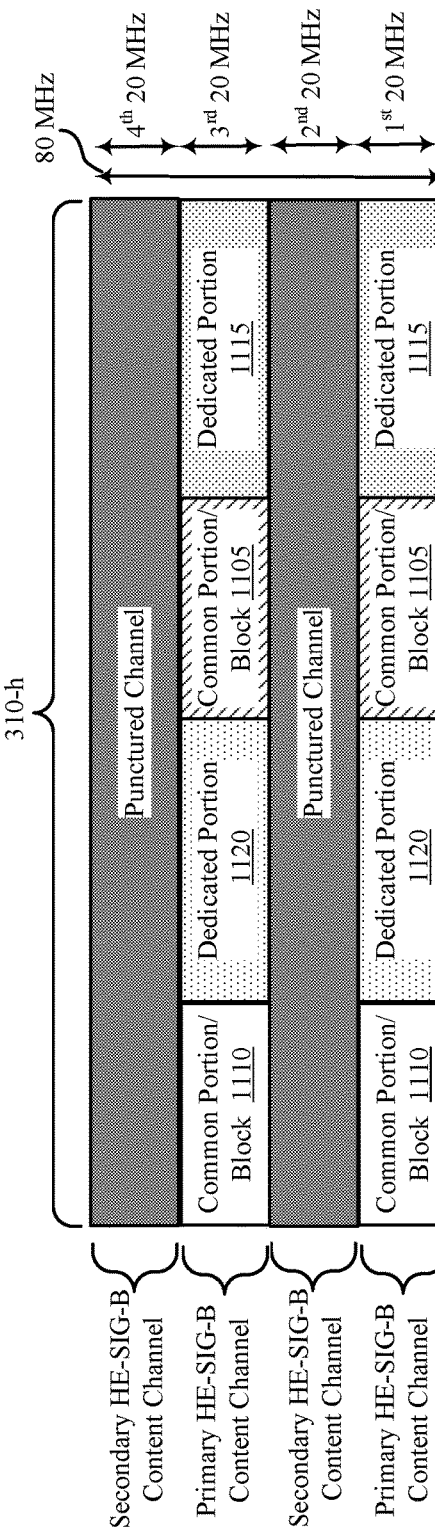

FIGS. 11A and 11B illustrate HE-SIG-B transmission formats 1100 that support preamble design aspects for HE WLANs in accordance with various aspects of the present disclosure. In these examples, the 2nd 20 MHz channel of an 80 MHz bandwidth has been punctured, either in whole or in part. For example, there may be excessive interference that causes the channel not to be received a station. In some examples, the SIG-B field may have been punctured, but the SIG-A field or other portions of the preamble for the channel has not been punctured. A common portion 1105 for a primary HE-SIG-B content channel is transmitted in the 1st 20 MHz channel and the 3rd 20 MHz channel in duplicate. A dedicated portion 1115 for the primary HE-SIG-B content channel is also transmitted in the 1st 20 MHz channel and the 3rd 20 MHz channel in duplicate. A common portion 1110 for a secondary HE-SIG-B content channel would otherwise be transmitted in the 2nd 20 MHz channel and the 4th 20 MHz channel in duplicate, but as shown, the 2nd 20 MHz channel has been punctured. Likewise, a dedicated portion 1120 for a secondary HE-SIG-B content channel would otherwise be transmitted in the 2nd 20 MHz channel and the 4th 20 MHz channel in duplicate, but the 2nd 20 MHz channel has been punctured. When the secondary 20 MHz channel is punctured, for example the 2nd 20 MHz channel, the information that would otherwise be contained in the SIG-B field 310-g may be determined from other channels or other mechanisms.

In a first example, illustrated in FIG. 11B, information/contents of the SIG-B that was found in the secondary 20 MHz channel may be transmitted on the primary 20 MHz channel. In such case an indication of the puncturing of the 20 MHz channel may be signaled in the SIG-A field, for example by including an indicator, which in some examples may be a 1 bit indicator. This increases overhead on the primary channels, e.g. the 1st 20 MHz and the 3rd 20 MHz as illustrated in FIG. 11, since the SIG-B content from the secondary channels is transmitted on the primary channels, in addition to the SIG-B content on the primary channel. As illustrated for the primary HE-SIG-B content channel for both the 1st 20 MHz and the 3rd 20 MHz, common portion 1110 is followed by dedicated portion 1120 followed by common portion 1105 followed by dedicated portion 1115. In another example, for the primary HE-SIG-B content channel for both the 1st 20 MHz and the 3rd 20 MHz, common portion 1110 is followed by common portion 1105 followed by dedicated portion 1120 followed by dedicated portion 1115. Whether the common portion of the primary channel SIG-B content is transmitted first, as illustrated in FIG. 11B, or the secondary channel common portion is transmitted first, or whether another order of the common and dedicated portions may be transmitted, may be predetermined so that upon receiving an indication in the SIG-A field the receiving station may know the order to decode the SIG-B field in the primary channel.

As described above, an indicator (e.g., a 1 bit indicator) in the SIG-A field may be used to indicate puncturing of a 20 MHz channel and the location of the SIG-B content channel (e.g., the HE-SIG-B content channel in a particular 20 MHz channel of the bandwidth for a PPDU). In some examples, the BW field of the SIG-A field may include the indication (e.g., the 1 bit indicator). In other examples, the BW field 410 described above with reference to FIG. 4, may be used to indicate a bandwidth used by a PPDU as well as a location of a SIG-B content channel. In some examples, various combinations of PPDU bandwidths and SIG-B content channel locations may be indicated by the BW field 410.

Table 1 below shows example values for a 3-bit BW field in a HE-SIG-A field of a HE MU PPDU. Where a BW field in a HE-SIG-A field has a value of 0 or 1, the BW field indicates a PPDU bandwidth of 20 MHz or 40 MHz, respectively. Where a BW field in a HE-SIG-A field has a value of 2, the BW field indicates that the bandwidth for the PPDU carrying the HE-SIG-A field has a bandwidth of 80 MHz, and that both a first (primary) 20 MHz HE-SIG-B content channel and a second (secondary) 20 MHz HE-SIG-B content channel are present in the primary 40 MHz. Where a BW field in a HE-SIG-A field has a value of 3, the BW field indicates that the bandwidth for the PPDU carrying the HE-SIG-A field has a bandwidth of 160 MHz or 80+80 MHz, and that both a first (primary) 20 MHz HE-SIG-B content channel and a second (secondary) 20 MHz HE-SIG-B content channel are in the primary 40 MHz, respectively. Where a BW field in a HE-SIG-A field has a value of 4, the BW field indicates that the bandwidth for the PPDU carrying the HE-SIG-A field has a bandwidth of 80 MHz, and that the secondary 20 MHz HE-SIG-B content channel is absent from the primary 40 MHz, and the counterpart secondary 20 MHz HE-SIG-B content channel is absent from the secondary 40 MHz. Where a BW field in a HE-SIG-A field has a value of 5, the BW field indicates that the bandwidth for the PPDU carrying the HE-SIG-A field has a bandwidth of 80 MHz, and that there is a secondary 20 MHz HE-SIG-B content channel absent from the primary 40 MHz, and the counterpart secondary 20 MHz HE-SIG-B content channel is present in the secondary 40 MHz. Where a BW field in a HE-SIG-A field has a value of 6, the BW field indicates that the bandwidth for the PPDU carrying the HE-SIG-A field has a bandwidth of 160 MHz or 80+80 MHz, and that the secondary 20 MHz HE-SIG-B content channel is absent from the primary 40 MHz, and the counterpart secondary 20 MHz HE-SIG-B content channel is absent from the secondary 40 MHz. Where a BW field in a HE-SIG-A field has a value of 7, the BW field indicates that the bandwidth for the PPDU carrying the HE-SIG-A field has a bandwidth of 160 MHz or 80+80 MHz, and that there is a secondary 20 MHz HE-SIG-B content channel absent from the primary 40 MHz, and the counterpart secondary 20 MHz HE-SIG-B content channel is present in the secondary 40 MHz.

TABLE 1

Value of BW (3 bit) in HE-SIG-A field of HE MU PPDU

| Value | Description |
|---|---|
| 0 | 20 MHz |
| 1 | 40 MHz |
| 2 | 80 MHz with both primary and secondary 20 MHz HE-SIG-B content channels present in the primary 40 MHz |
| 3 | 160/80 + 80 with both primary and secondary 20 MHz HE-SIG-B content channels present in the primary 40 MHz |
| 4 | 80 MHz with the secondary 20 MHz HE-SIG-B content channel absent from the primary 40 MHz, and its HE-SIG-B counterpart absent from the secondary 40 MHz |
| 5 | 80 MHz with the secondary 20 MHz HE-SIG-B content channel absent from the primary 40 MHz, and its HE-SIG-B counterpart present in the secondary 40 MHz |
| 6 | 160/80 + 80 MHz with the secondary 20 MHz HE-SIG-B content channel absent from the primary 40 MHz, and its HE-SIG-B counterpart absent from the secondary 40 MHz |
| 7 | 160/80 + 80 MHz with the secondary 20 MHz HE-SIG-B content channel absent from the primary 40 MHz, but its HE-SIG-B counterpart present in the secondary 40 MHz |

In some examples, a 2-bit BW field in a SIG-A (e.g., HE-SIG-A) field may be used to indicate a fewer number of combinations of bandwidth and SIG-B (e.g., HE-SIG-B) content channel, or a 4-bit (or more) BW field in a HE-SIG-A field may be used to indicate a greater number of combinations. In other examples, the BW field may be used to indicate different combinations of bandwidth and SIG-B content channel locations.

FIG. 11C illustrates an example of channels 1100-c for a contiguous channel bonding mode, in accordance with various aspects of the present disclosure. Channels 1100-c include a primary 20 MHz channel, a secondary 20 MHz channel, a secondary 40 MHz channel, and a secondary 80 MHz channel for a 160 MHz bandwidth. Channels 1100-c include a primary 20 MHz channel, a secondary 20 MHz channel, and a secondary 40 MHz channel for a 80 MHz bandwidth. Channels 1100-c include a primary 20 MHz channel and a secondary 20 MHz channel for a 40 MHz bandwidth. Channels 1100-c may be examples of the corresponding channels described with reference to Table 1.

FIG. 11D illustrates an example of channels 1100-d for a non-contiguous channel bonding mode, in accordance with various aspects of the present disclosure. Channels 1100-d include a primary 20 MHz channel, a secondary 20 MHz channel, a secondary 40 MHz channel, and a secondary 80 MHz channel for a 80+80 MHz bandwidth configuration, where the secondary 80 MHz channel is not contiguous with the primary 20 MHz channel, secondary 20 MHz channel, and secondary 40 MHz channel. Channels 1100-d may be examples of the corresponding channels described with reference to Table 1 for a non-contiguous 80+80 MHz bandwidth, for example specifically with reference to BW values 3, 6, and/or 7.

In a second example, for example for an 80 MHz bandwidth as illustrated in FIG. 11A, or a 160 MHz bandwidth containing duplicated SIG-B content, information and/or contents of the SIG-B filed that was found in the punctured secondary 20 MHz channel corresponding to the 2nd 20 MHz may be decoded from a 4th 20 MHz channel. In such case an indication of the SIG-B decoding may be signaled in the SIG-A field, for example by including an indicator in the SIG-A field. In this example, there may a limitation that the 4th 20 MHz is not also punctured.

In other examples for supporting preamble design aspects for HE WLANs in accordance with various aspects of the present disclosure, an HE-SIG-B design may be different when other 20 MHz channels are punctured. In such case, a common portion of a SIG-B field may be affected since one or more 20 MHz channels are absent.

In a first example, RU allocation for the punctured 20 MHz channels are not transmitted. A size of the common portion of the SIG-B field may be modified depending on the number and location of the punctured channels. In addition, a common portion size may be different between the two SIG-B content channels. An explicit indication of punctured channels may be indicated in the SIG-A field.

In a second example, a special or dedicated RU allocation bit sequence may be used to indicate that a 20 MHz channel is punctured. The indication may be made by adding an additional entry in a RU allocation table. A size of the common portion may be unchanged for either content channel. According to this example an explicit indication of the punctured 20 MHz channel may not be needed, though the additional RU allocation bit sequence may result in additional overhead in the common portion of the SIG-B field.

In these examples, the SIG-B dedicated portion, as opposed to the common portion, may be relatively unaffected. SIG-B duplicated structure may be maintained, while the dedicated content for punctured channels are not transmitted.

In other examples, other 20 MHz channels are punctured. For example, a data portion for a user may be punctured in a secondary channel corresponding to the 4th 20 MHz. SIG-B information for a 1st user and 2nd user may be transmitted in a primary channel, and SIG-B information for a 3rd user and 4th user may be transmitted in the secondary channel. If the channel carrying data for the 4th user is punctured, for example the 4th 20 MHz as shown in FIG. 11A, then the receiving station may expect data for the 4th user because of the presence of an RU allocation in the SIG-B field for the 4th user. Two examples to address this situation are described below.

In a first example, the RU allocation for the punctured 20 MHz channel may be not transmitted. The size of the common portion, e.g. common portion 1105, may then be changed depending on the number and location of the punctured channels. The common portion size may also be different between the two SIG-B content channels. An explicit indication of which channels are punctured may then be communicated in the SIG-A field. In this example a number of channels that may be punctured may be limited by the number of bits allocated in the SIG-A field to communicate which, if any, of the channels are punctured to the receiving station. For example, 2 bits in the SIG-A field may allow for the indication of 4 possible combinations of punctured channels.

In a second example, an RU allocation bit sequence may be used to indicate that a 20 MHz channel is punctured. An additional entry in an RU allocation table, for example using an otherwise reserved entry in the RU allocation table, may be used to indicate that a RU is not allocated, e.g. because the 20 MHz channel is punctured. By inserting an additional entry in the RU allocation table, the size of the common portion may be unchanged in the content channel. Furthermore, an explicit indication of the punctured 20 MHz channel may not be needed. According to this second example, the dedicated portion may remain unchanged, while the SIG-B duplicated structure is maintained.

Figure 9A:
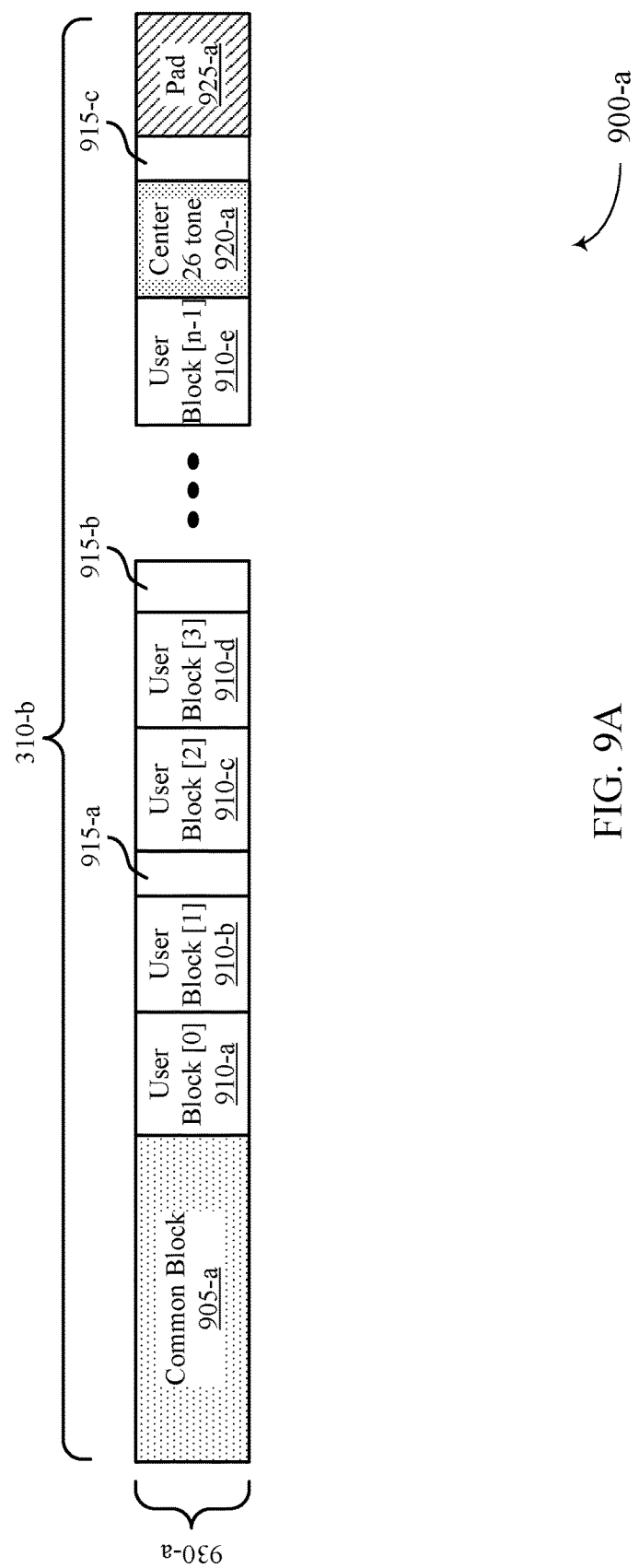
FIGS. 9A through 9C show block diagrams 900-*a* through 900-*c* of example preamble design aspects for HE WLANs in accordance with various aspects of the present disclosure.
Figure 9B:
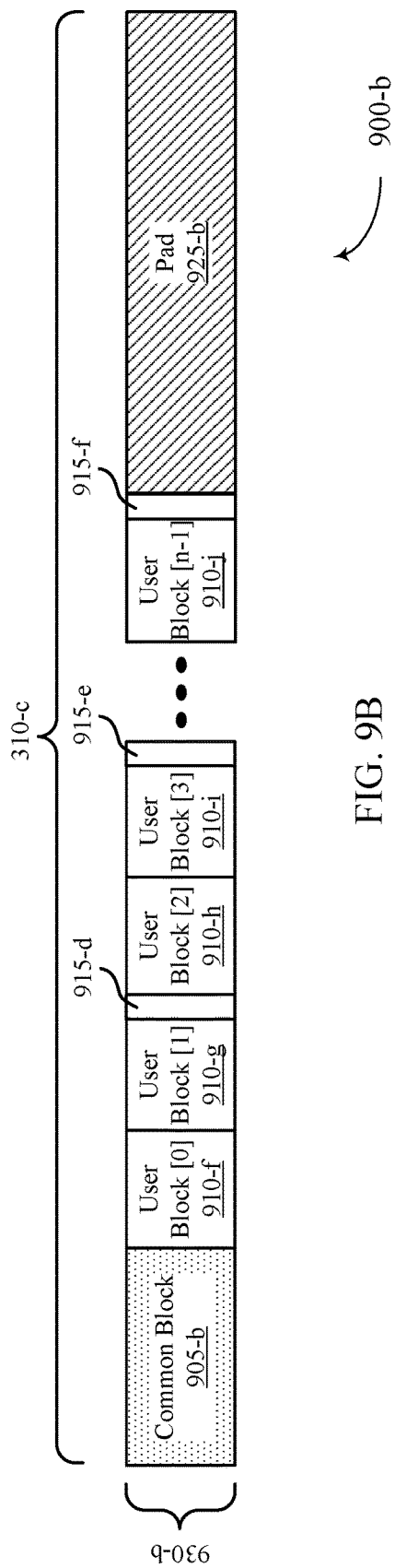
Figure 9C:
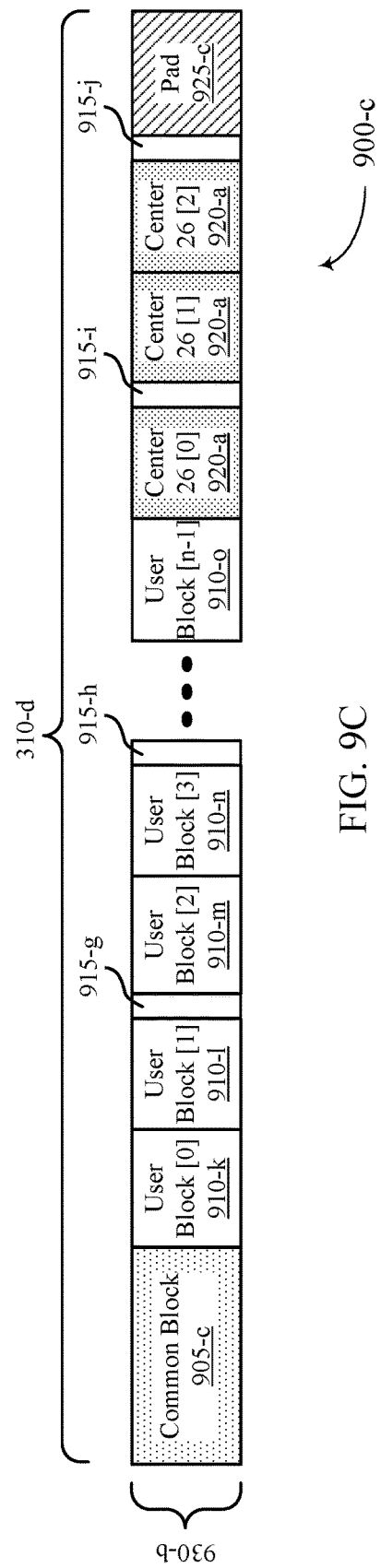

FIGS. 9A through 9C show block diagrams 900-*a* through 900-*c* of example preamble design aspects for HE WLANs in accordance with various aspects of the present disclosure.

RU allocation signaling, e.g. using an RU allocation table, may be used to indicate the allocation plan for each 20 MHz channel of a bandwidth. The size of each allocation and a number of users in each resource unit (RU) may be indicated in the RU allocation table. There may not be adequate numbers of entries available in an RU allocation table to indicate center tones (e.g. the above-described center 26 tones), for example, because the size of the RU allocation table is limited to minimize an amount of overhead. Such overhead may include the number or size of dedicated portions or blocks to be sent in the HE-SIG-B field 310-*b*.

An RU allocation table may provide for the allocation plan for channels. Such allocation plans may not provide a provision to account for all the tones in a bandwidth. In some examples, a tone plan may not provide the ability to allocate a 26 tone resource unit that falls in the center of the tone plan. For example, with reference to FIG. 4B, a 26 tone RU may fall between the 2 106 tone RUs in the allocation plan 430. Similarly, with reference to FIG. 4C, a 26 tone RU may fall between the 2 106 tone RUs in the allocation plan 445, and/or between the second and third 52 tone RUs in the allocation plan 440. In other allocation plans, the tones may not be indicated in the tone plan, but fall between 26 tone, 52 tone, or 106 tone RUs elsewhere within an allocation plan. Each such RU may be referred to herein as a center 26 tone RU.

According to some examples, that a center 26 RU is not allocated may be indicated in a station ID of a user block in the HE-SIG-B field. A certain sequence for the station ID may be used to indicate that center 26 tone RUs are not allocated, e.g. a station ID indicating an RU is unallocated, for example a sequence of 0's or a sequence of 1's for the station ID used to indicate that a corresponding center 26 tone RU is not allocated to any station.

In some examples, sending a station ID indicating that an RU is unallocated may require additional overhead. In some examples or implementations, certain of the RUs are more likely to be unallocated than other RUs. For example, the center 26 tone RUs may be the most likely to be unallocated. In some examples, the station ID indicating that an RU is unallocated may be transmitted if there is room in a pad field 925, but otherwise are not transmitted.

FIG. 9A illustrates the HE-SIG-B field 310-*b*, including a common block 905-*a*, user blocks for n users 910-*a* through 910-*e*, CRC+tail fields 915-*a* through 915-*c*, an RU allocation for the center 26 tone RU 920-*a*, and pad bits in a pad field 925-*a*. In this example, a single channel 930-*a* is shown. According to this example, that an RU is not allocated may be indicated in a station ID of a user block 910. A certain sequence for the station ID may be used to indicate that center 26 tone RUs are not allocated, for example a sequence of 0's or a sequence of 1's. The sequence of 0's or 1's may also be used to indicate for other of the RUs that they are unallocated in other examples. Thus, the station ID may be used to indicate that an RU is unallocated. For HE-SIG-B field 310-*b*, a center 26 tone RU is not allocated, and the indication is provided by block 920-*a*.

FIG. 9B illustrates the HE-SIG-B field 310-*c*, including a common block 905-*b*, user blocks for n users 910-*f* through 910-*j*, CRC+tail fields 915-*d* through 915-*f*, and pad bits in a pad field 925-*b*. In this example, a single channel 930-*a* is shown, where a center 26 tone RU is not allocated. In this example, there is not adequate space available in the pad field 925-*b*, and as a result, a block including the station ID (e.g. an AID) that indicates that the center 26 RU is unallocated is not transmitted in the HE-SIG-B field 310-*c*.

FIG. 9C illustrates the HE-SIG-B field 310-*d*, including a common block 905-*c*, user blocks for n users 910-*k* through 910-*o*, CRC+tail fields 915-*g* through 915-*j*, and pad bits in a pad field 925-*c*. In this example, the SIG-B field for a single channel 930-*b* is shown. In this example, there is adequate space available in the pad 925-*b*, and as a result, a blocks including the station ID that indicates that center 26 RUs are or are not allocated are transmitted in the HE-SIG-B field 310-*c*. In one example, the SIG-B field may relate to RU allocations for an 80 MHz or 160 MHz bandwidth, which there may be five center 26 RUs to be indicated. In this example, pad field 925 provide room for only three of the five center 26 RUs to be transmitted, center 26 RU [0] block 925-*a* for a first RU position, center 26 RU [1] block 925-*b* for a second RU position, and center 26 RU [2] block 925-*c* for a third RU position. Indications that the other two center 26 tone RUs are unallocated are not sent.

Upon receipt of the HE-SIG-B field 310-*d* by a station, the station may decode the center 26 RU blocks 925 and determine that the corresponding center 26 RUs are not allocated. The station may also determine that it has reached the end of the HE-SIG-B field 310-*d*, and thereby determine that the remaining two center 26 RUs are also not allocated.

In accordance with preamble design aspects described above, the order of dedicated (user) content of the user specific subfield of the SIG-B field may be ordered according to a number of possible combinations. In one example, the content may be ordered in the user specific subfield the same as the order used in the common portion of the SIG-B field. In some examples, the content of both the common portion and the user specific subfield (e.g. the dedicated portion) may be ordered in ascending or descending frequency allocated to the user. In other examples, the primary channel may be ordered first, followed by ascending frequency. In still other examples, the primary channel may be ordered first, followed by descending frequency.

Figure 10:
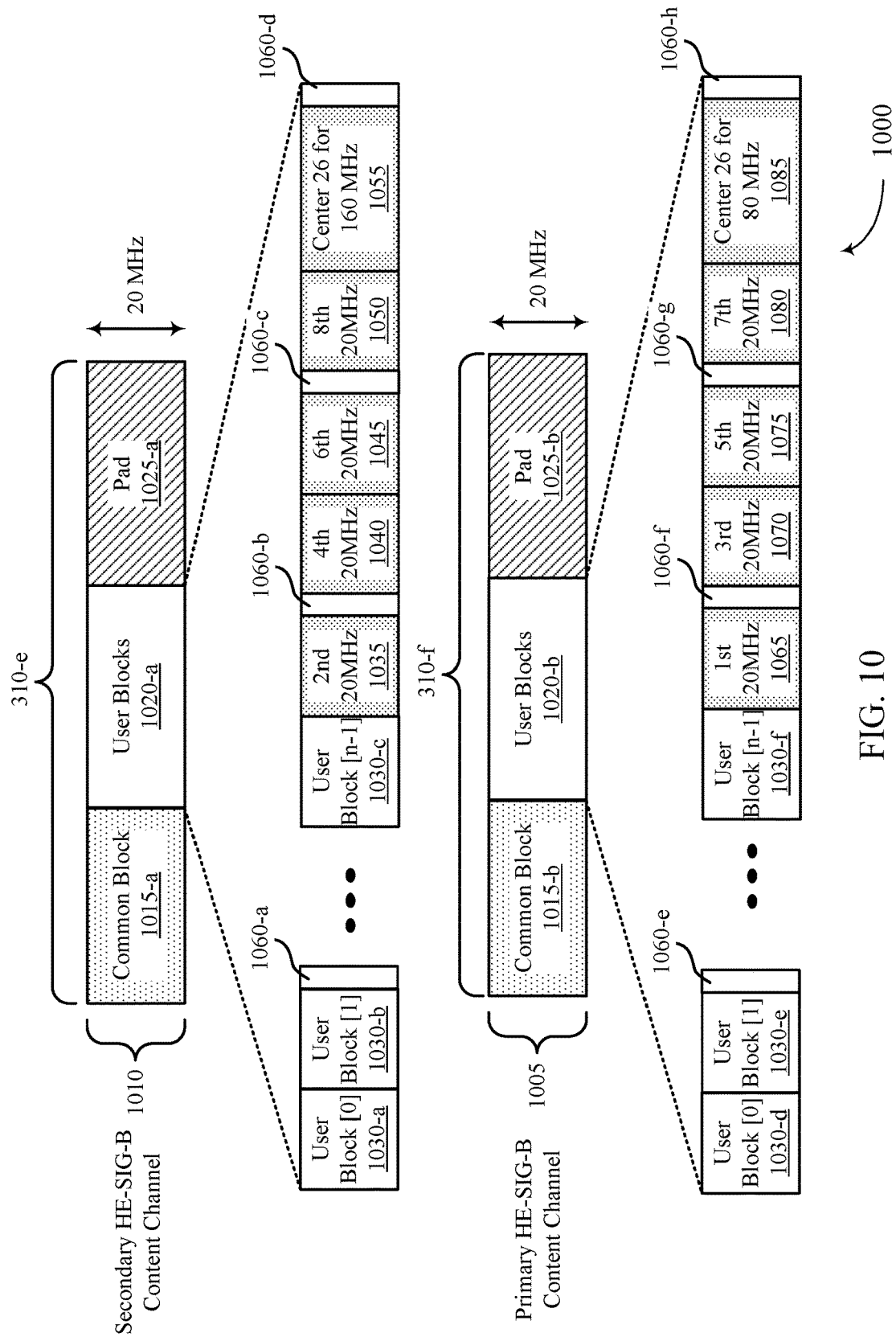
FIG. 10 illustrates a HE-SIG-B field for a primary HE-SIG-B content channel and an HE-SIG-B field for a secondary HE-SIG-B content channel in accordance with various aspects of the present disclosure.

FIG. 10 illustrates an HE-SIG-B field 310-*f* for a primary HE-SIG-B content channel and an HE-SIG-B field 310-*e* for a second HE-SIG-B content channel in accordance with various aspects of the present disclosure. In some examples, the location of the user specific field for the center 26 tone RUs may be at the end of the user block 1020 of the SIG-B field, despite the center 26 tone RUs themselves generally falling in the middle of a channel. The example shown in FIG. 10 includes user specific SIG-B content for the center 26 tone RU SIG-B content for the user specific portions of center 26 tone RUs. Specifically, the primary HE-SIG-B content channel 1005 includes center 26 tone RU content for the 1st 20 MHz at block 1065, for the 3rd 20 MHz at block 1070, for the 5th 20 MHz at block 1075, and for the 7th 20 MHz at block 1080, and also includes the center 26 tone RU content for the center 26 tones for the primary 80 MHz channel. Specifically, the primary HE-SIG-B content channel 1010 includes center 26 tone RU content for the 2nd 20 MHz at block 1035, for the 4th 20 MHz at block 1040, for the 6th 20 MHz at block 1045, and for the 8th 20 MHz at block 1050. For the example of 160 MHz bandwidth, the HE-SIG-B content channel 1010 also includes the center 26 tone RU content for the center 26 tones for the secondary 80 MHz channel in block 1055. For the example of 80 MHz bandwidth, the HE-SIG-B content channel 1010 may not include block 1055.

The center 26 tone RU content blocks of the HE-SIG-B field described above may indicate that the center 26 tone RUs are allocated. In other example fewer or none of the center 26 tone RUs may be allocated. In such example, the station ID (AID) described above with reference to FIGS. 9A-9C may be used to indicate that they are not allocated, or the user specific blocks for the center 26 tone RUs may not be transmitted due to a lack of padding, also as described with reference to FIGS. 9A-9C above.

In some example, overhead may be further reduced by reordering the transmission order of the center 26 tone RU blocks. For example, if only the 7th 20 MHz at block 1080 of the secondary HE-SIG-B content channel will indicate that a center 26 tone RU is allocated, and the remaining 26 tone RUs will be unallocated, then the scheduling that is done by the transmitting AP may performed such that, if any of the center 26 tone RUs are to be allocated, that they are allocated starting from the 1st 20 MHz, not starting with or for only the 7th 20 MHz. Thus, the transmitting AP may transmit user specific content in the SIG-B field for the allocated center 26 tone RU first, then cease transmitting, and not transmit additional center 26 tone RUs. Similarly, the station may cease decoding the SIG-B once it encounters an AID value indicating that a center 26 tone RU is not allocated.

In other examples, the order of the center 26 tone RUs may be reordered according to a predetermined order that may be known to both a transmitting AP and a receiving station.

FIGS. 14A through 14D show a first HE-SIG-A field contents 1401-1404 for a HE SU PPDU and HE extended range SU PPDU for supporting preamble design aspects for HE WLANs in accordance with various aspects of the present disclosure. The HE-SIG-A field contents 1401 and HE-SIG-A field contents 1402 together represent a first part of a HE-SIG-A field, HE-SIG-A1, and the HE-SIG-A field contents 1403 and HE-SIG-A field contents 1404 together represent a second part of a HE-SIG-A field, HE-SIG-A2. One or more of HE-SIG-A field contents 1401-1404 may be part of HE WLAN preamble 215 with reference to FIG. 2, and/or HE-SIG-A field 305 with reference to FIGS. 3 and 4A. Where HE-SIG-A field contents 1401-1404 are implemented for a HE SU PPDU, the HE-SIG-A field contents 1401-1404, in aggregate, may be 8 µs. Where HE-SIG-A field contents 1401-1404 are implemented for a HE extended range PPDU, the HE-SIG-A field contents 1401-1404, in aggregate, may be 16 µs. In some examples, the HE-SIG-A field contents 1401-1404 in the HE extended range PPDU may be 8 µs, but repeated twice making the total length 16 µs.

FIGS. 15A through 15C show a first HE-SIG-A field contents 1501-1503 for a HE MU PPDU for supporting preamble design aspects for HE WLANs in accordance with various aspects of the present disclosure. The HE-SIG-A field contents 1501 represents a first part of a HE-SIG-A field, HE-SIG-A1, and the HE-SIG-A field contents 1502 and HE-SIG-A field contents 1503 together represent a second part of a HE-SIG-A field, HE-SIG-A2. One or more of HE-SIG-A field contents 1501-1503 may be part of HE WLAN preamble 215 with reference to FIG. 2, and/or HE-SIG-A field 305 with reference to FIGS. 3 and 4A. Where HE-SIG-A field contents 1501-1503 are implemented for a HE MU PPDU, the HE-SIG-A field contents 1501-1503, in aggregate, may be 8 µs.

FIGS. 16A through 16B show a first HE-SIG-A field contents 1601-1602 for a HE trigger-based PPDU for supporting preamble design aspects for HE WLANs in accordance with various aspects of the present disclosure. The HE-SIG-A field contents 1601 represents a first part of a HE-SIG-A field, HE-SIG-A1, and the HE-SIG-A field contents 1602 represents a second part of a HE-SIG-A field, HE-SIG-A2. One or more of HE-SIG-A field contents 1601-1602 may be part of HE WLAN preamble 215 with reference to FIG. 2, and/or HE-SIG-A field 305 with reference to FIGS. 3 and 4A. Where HE-SIG-A field contents 1601-1602 are implemented for a HE trigger-based PPDU, the HE-SIG-A field contents 1601-1602, in aggregate, may be 8 µs.

FIGS. 17A through 17D show a second HE-SIG-A field contents 1701-1704 for a HE SU PPDU and HE extended range SU PPDU for supporting preamble design aspects for HE WLANs in accordance with various aspects of the present disclosure. The HE-SIG-A field contents 1701 and HE-SIG-A field contents 1702 together represent a first part of a HE-SIG-A field, HE-SIG-A1, and the HE-SIG-A field contents 1703 and HE-SIG-A field contents 1704 together represent a second part of a HE-SIG-A field, HE-SIG-A2. One or more of HE-SIG-A field contents 1701-1704 may be part of HE WLAN preamble 215 with reference to FIG. 2, and/or HE-SIG-A field 305 with reference to FIGS. 3 and 4A. Where HE-SIG-A field contents 1701-1704 are implemented for a HE SU PPDU, the HE-SIG-A field contents 1701-1704, in aggregate, may be 8 µs. Where HE-SIG-A field contents 1701-1704 are implemented for a HE extended range PPDU, the HE-SIG-A field contents 1701-1704, in aggregate, may be 16 µs. In some examples, the HE-SIG-A field contents 1701-1704 in the HE extended range PPDU may be 8 µs, but repeated twice making the total length 16 µs.

FIGS. 18A through 18C show a second HE-SIG-A field contents 1801-1803 for a HE MU PPDU for supporting preamble design aspects for HE WLANs in accordance with various aspects of the present disclosure. The HE-SIG-A field contents 1801 represents a first part of a HE-SIG-A field, HE-SIG-A1, and the HE-SIG-A field contents 1802 and HE-SIG-A field contents 1803 together represent a second part of a HE-SIG-A field, HE-SIG-A2. One or more of HE-SIG-A field contents 1801-1803 may be part of HE WLAN preamble 218 with reference to FIG. 2, and/or HE-SIG-A field 305 with reference to FIGS. 3 and 4A. Where HE-SIG-A field contents 1801-1803 are implemented for a HE MU PPDU, the HE-SIG-A field contents 1801-1803, in aggregate, may be 8 μs.

FIGS. 19A through 19B show a second HE-SIG-A field contents 1901-1902 for a HE trigger-based PPDU for supporting preamble design aspects for HE WLANs in accordance with various aspects of the present disclosure. The HE-SIG-A field contents 1901 represents a first part of a HE-SIG-A field, HE-SIG-A1, and the HE-SIG-A field contents 1902 represents a second part of a HE-SIG-A field, HE-SIG-A2. One or more of HE-SIG-A field contents 1901-1902 may be part of HE WLAN preamble 215 with reference to FIG. 2, and/or HE-SIG-A field 305 with reference to FIGS. 3 and 4A. Where HE-SIG-A field contents 1901-1902 are implemented for a HE trigger-based PPDU, the HE-SIG-A field contents 1901-1902, in aggregate, may be 8 μs.

FIGS. 20A through 20C show an example of a HE-SIG-A field contents 2001-2003 for a HE SU PPDU and HE Extended Range SU PPDU for supporting preamble design aspects for HE WLANs in accordance with various aspects of the present disclosure. The HE-SIG-A1 field contents 2001-2002 represent a first part of a HE-SIG-A field, HE-SIG-A1, and HE-SIG-A2 field contents 2003 represent a second part of the HE-SIG-A field. The HE-SIG-A field contents 2001-2003 represents aspects of a re-ordering of various HE-SIG-A fields. One or more of HE-SIG-A field contents 2001-2003 may be part of HE WLAN preamble 218 with reference to FIG. 2, and/or HE-SIG-A field 305 with reference to FIGS. 3 and 4A.

The HE-SIG-A field contents 2001-2003 provide improved PAPR performance for HE-SIG-A. In certain aspects, the HE-SIG-A field contents 2001-20003 moves the beam change, MCS, DCM, LTE+CP, and Nsts fields to HE-SIG-A1 and moves the Txop duration to HE-SIG-A2. For the BSS color description, "0" may indicate public action frames; "63" may indicate IBSS/MBSS/TDLS frames (e.g., when the AP does not provide a color); and "1:62" may indicate HE BSS color. For the Txop duration description, "127" may indicate that the Txop duration is not set. For the Doppler description, "1" may indicate that Doppler procedure is used, and "0" may indicate otherwise.

In certain aspects, the format field may differentiate between HE SU PPDU and HE Trigger-based PPDU. Having this field first (e.g., "B0") may support early detection and therefore may be beneficial. Having the Beam Change field as second field may be useful to determine better channel estimation, e.g., the receiver becomes aware of spatial mapping of pre-HE STF and HE LTF very early in reception. The MCS field in the beginning helps to determine MCS of the incoming data payload, e.g., early detect of 1024 QAM MCS enables receiver to enable special power save mode of reception. The DCM field follows MCS immediately, which may impacts the code rate used to calculate data rate for the MCS field.

In some aspects, the BSS Color field supports identifying to which BSS the packet belongs. The Spatial Reuse field conveys knowledge in conjunction with BSS Color field to help determine if STA can do spatial reuse transmission. In HE SU PPDU and HE Extended Range SU PPDU, the HE LTFs may follow the HE SIG-A2 format. Hence early knowledge of LTF+CP helps in HE SIG-A1 to prepare receiver better for channel estimation.

In some aspects, the benefits of HE-SIG-A field contents 2001-2003 studied by the PAPR performance of HE-SIG-A for various PPDU formats considering meaningful worst cases. For worst cases (e.g., all 0's and all 1's in HE SIG A) the sequence of the HE-SIG-A field contents 2001-2003 may support PAPR better than PAPR of MCS0 data.

FIGS. 21A through 21C show an example of a HE-SIG-A field contents 2101-2103 for a HE MU PPDU for supporting preamble design aspects for HE WLANs in accordance with various aspects of the present disclosure. The HE-SIG-A field contents 2101-2102 represent a first part of a HE-SIG-A field, HE-SIG-A1, and the HE-SIG-A field contents 2103 represent a second part of the HE-SIG-A field, HE-SIG-A2. The HE-SIG-A field contents 2101-2103 represents aspects of a re-ordering of various HE-SIG-A fields. One or more of HE-SIG-A field contents 2101-2103 may be part of HE WLAN preamble 218 with reference to FIG. 2, and/or HE-SIG-A field 305 with reference to FIGS. 3 and 4A.

In certain aspects, the HE-SIG-A field contents 2101-2103 moves the MCS, DCM, LTE+CP, and SIGB # of symbols fields to HE-SIG-A1 and moves the Txop duration to HE-SIG-A2. For the BSS color description, "0" may indicate public action frames; "63" may indicate IBSS/MBSS/TDLS frames (e.g., when the AP does not provide a Color); and "1:62" may indicate HE BSS color. For the Txop duration description, "127" may indicate that the Txop duration is not set. For the Doppler description, "1" may indicate that Doppler procedure is used, and "0" may indicate otherwise.

FIGS. 22A through 22B show an example of a HE-SIG-A field contents 2201-2202 for a HE Trigger-based PPDU for supporting preamble design aspects for HE WLANs in accordance with various aspects of the present disclosure. The HE-SIG-A field contents 2201 represents a first part of a HE-SIG-A field, HE-SIG-A1, and HE-SIG-A field contents 2202 represents a second part of the HE-SIG-A, HE-SIG-A2. The HE-SIG-A field contents 2201-2202 represents aspects of a re-ordering of various HE-SIG-A fields. One or more of HE-SIG-A field contents 2201-2202 may be part of HE WLAN preamble 218 with reference to FIG. 2, and/or HE-SIG-A field 305 with reference to FIGS. 3 and 4A.

With reference to FIGS. 14A through 22B, one or more the HE-SIG-A field contents 1401-2202 may include one or more reserved fields. In some examples, these reserved fields are each set to "1". Setting the reserved fields to "1", for example instead of some or all to "0", may ameliorate issues resulting from large peak-to-average-power (PAPR) ratios that may otherwise be present, and/or assist with binary convolutional code (BCC) encoder state setting.

In other examples, the reserved fields, for example bit B0 with reference to HE-SIG-A field contents 1401, 1501, and/or 1601, may be interpreted differently for a transmitter and a receiver. In one example, the reserved field may be set to "1" or "0" by the transmitter, and ignored by the receiver. In a second example, the reserved field may be set to "1" or "0" by the transmitter, and checked by the receiver for fidelity, such that the receiver may discard the associated PPDU if the field is set incorrectly. In a third example, the reserved field may be used to indicate a Wi-Fi version associated with the PPDU, such that the meaning of the HE-SIG-A bit fields may be different based on the indicated version of the field. For example, the reserved field, used as a version field, may be set to "0" to indicate IEEE 802.11ax is used, and may be set to "1" to indicate some future version of IEEE 802.11 is used.

In some examples, a bit associated with the "Format" field shown with reference to RE-SIG-A field contents 1401, 1601, 1701, 1901, 2001, 2101, and/or 2201 may be aligned to a B1 bit in a HE SU PPDU and HE trigger-based PPDU, and used to differentiate between a HE SU PPDU and HE trigger-based PPDU.

In some examples, the "BSS Color" field shown with reference to HE-SIG-A field contents 1401, 1601, 1701, 1901, 2001, 2101, and/or 2201 may contain six bits to identify a BSS. In some examples, the six bits of the BSS Color filed are each set to "1" to indicate no BSS color. Setting the "BSS Color" field to all "1" to indicate no BSS color rather than all "0" to indicate no BSS color can avoid providing a trail of "0" bits.

In other examples, combinations of bit fields for the one or more the HE-SIG-A field contents 1401-2202 may be disallowed. These disallowed combinations of bit fields may be used to indicate vendor-specific modes. For example, for a contention period (CP) of 0.4 μs that is indicated to a receiver, a DCM value set to "1" and MCS greater than 4 may be a disallowed combination (e.g., because in some circumstances DCM may be allowed to be applied only for HE-MCSs with indices of 0, 1, 3, or 4). This disallowed combination may still be indicated, but for the transmitter to indicate a vendor specific mode of operation to the receiver rather than for the receiver to operate in the otherwise disallowed combination.

In some examples, and with reference to FIGS. 14A through 22B, the bit fields may be arranged to avoid violating symbol boundaries. For example, each of the two reserved bits for a HE SU PPDU and HE extended range SU PPDU, "Reserved" field B25 shown in HE-SIG-A field contents 1702 and "LDPC extra symbol" field B3 shown in HE-SIG-A field contents 1703 may be arranged to be adjacent by swapping "Reserved" field B25 shown in HE-SIG-A field contents 1702 with "Coding" field B2 shown in HE-SIG-A field contents 1703. In still other examples, the HE trigger-based PPDU bit fields may be rearranged such that spatial reuse (SR) and transmit opportunity (TXOP) duration bit fields occur consecutively. For example, HE-SIG-A field contents 1901-1902 may be arranged as follows: "Format" field B0, "SR" field B1:B16, "TXOP" field B17:B23, and "Bandwidth" field B:24:B25 for the HE-SIG-A1 part of the HE-SIG-A field, followed by "BSS Color" field B0:B5, "Reserved" field B6:B15, CRC field B16:B19, and "Tail" field B20:B25 for the HE-SIG-A2 part of the HE-SIG-A field. Such arrangement may enable the extension of the TXOP duration bit field for improved resolution if SR is unused.

Figure 13A:
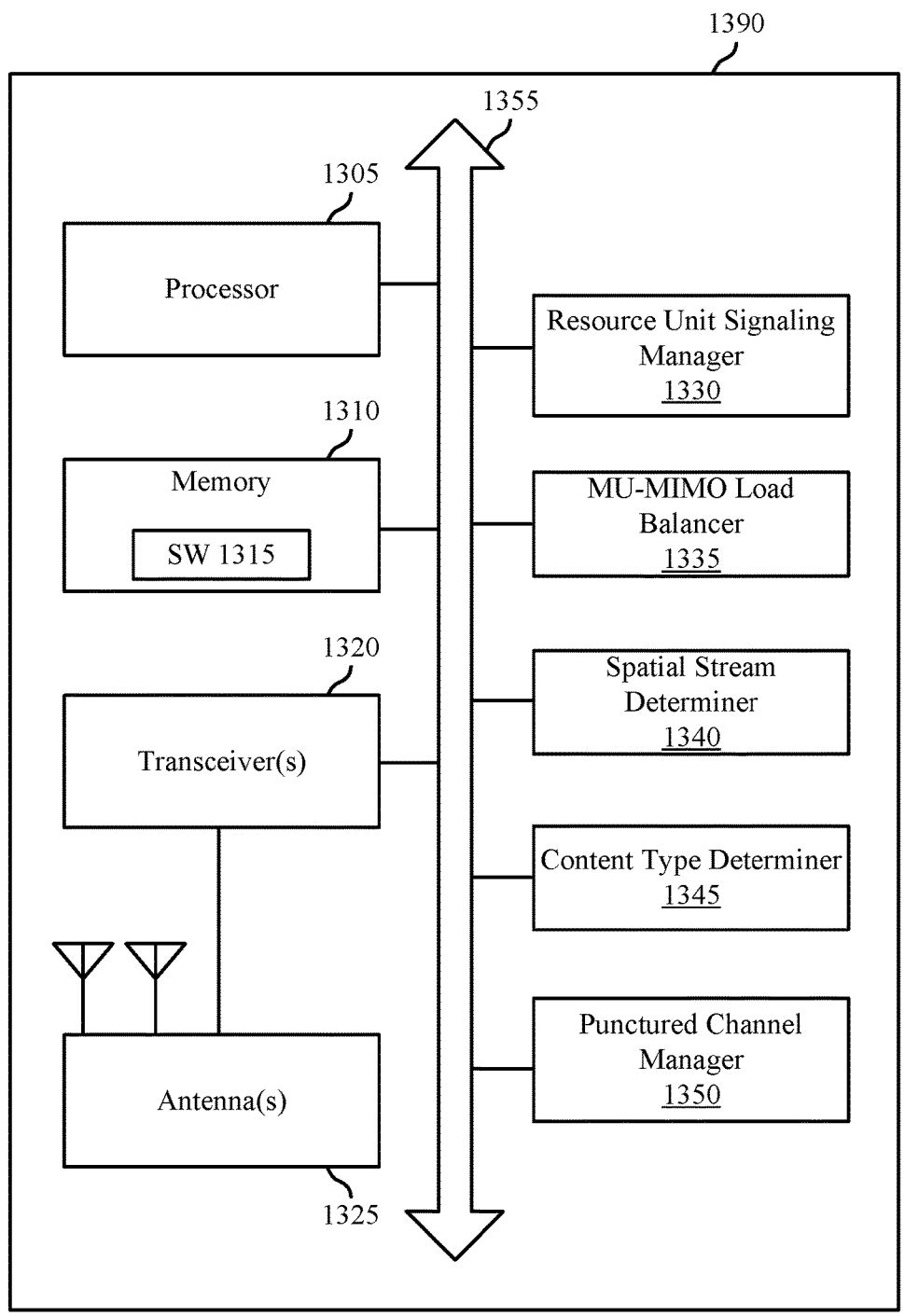
FIGS. 13A and 13B show block diagrams of an example device for supporting preamble design aspects for HE WLANs in accordance with various aspects of the present disclosure.
Figure 13B:
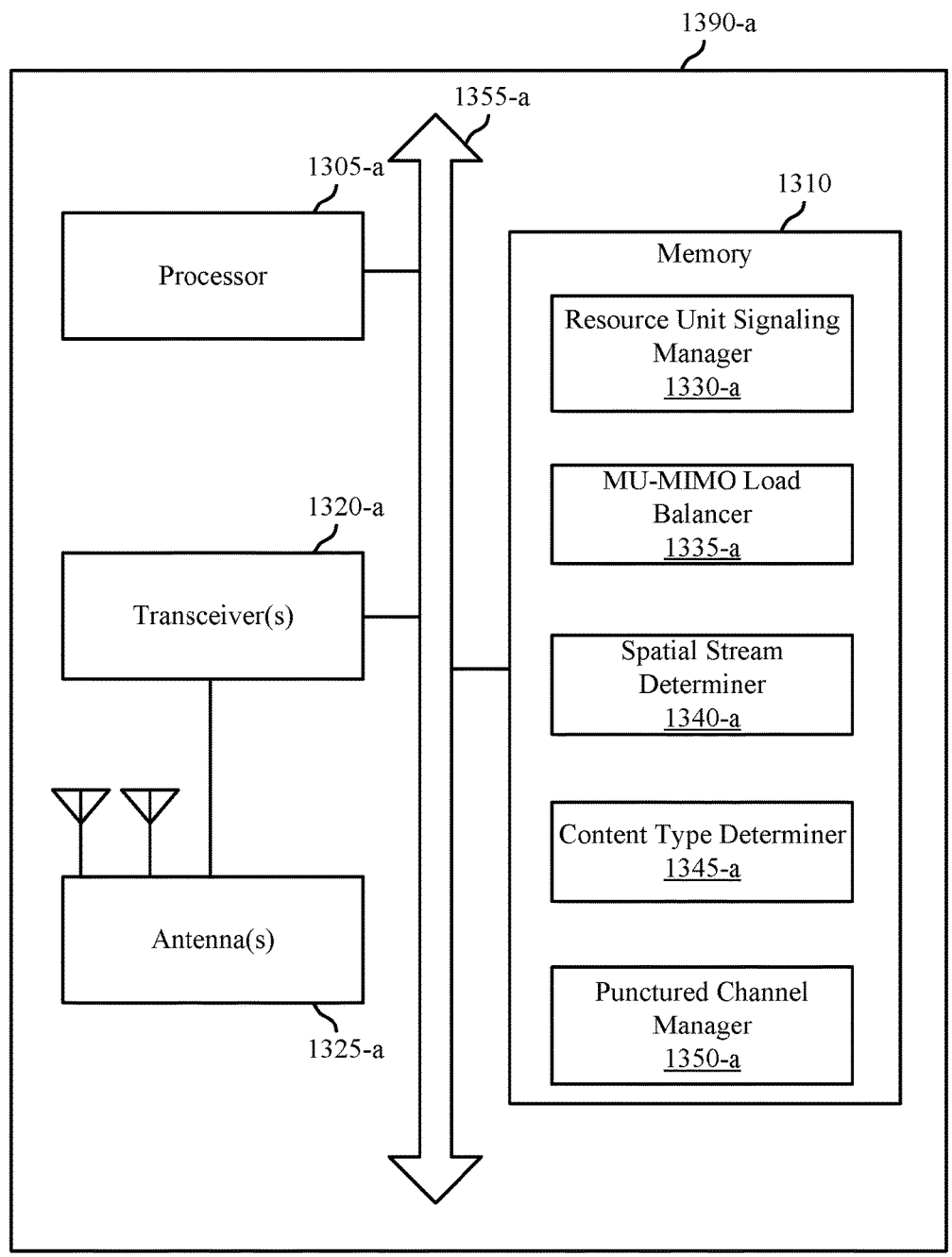

FIGS. 13A and 13B show block diagrams of an example device for supporting preamble design aspects for HE WLANs in accordance with various aspects of the present disclosure.

FIG. 13A shows a block diagram 1300-*a* of an example wireless device 1390 that supports preamble design aspects for HE WLANs in accordance with various aspects of the present disclosure, and with respect to FIGS. 1-12 and 14A-22B. The wireless device 1390, which may be an example of a STA 110 or an AP 105, includes a resource unit signaling manager 1330, a MU-MIMO load balancer 1335, a spatial stream determiner 1340, a content type determiner 1345, and a punctured channel manager 1350. The processor 1305, memory 1310, transceiver(s) 1320, the resource unit signaling manager 1330, MU-MIMO load balancer 1335, spatial stream determiner 1340, content type determiner 1345, and punctured channel manager 1350 are communicatively coupled with a bus 1355, which enables communication between these components. The antenna(s) 1325 are communicatively coupled with the transceiver(s) 1320.

The processor 1305 is an intelligent hardware device, such as a central processing unit (CPU), a microcontroller, an application-specific integrated circuit (ASIC), etc. The processor 1305 processes information received through the transceiver(s) 1320 and information to be sent to the transceiver(s) 1320 for transmission through the antenna(s) 1325.

The memory 1310 stores computer-readable, computer-executable software (SW) code 1315 containing instructions that, when executed, cause the processor 1305 or another one of the components of the wireless device 1390 to perform various functions described herein.

The transceiver(s) 1320 communicate bi-directionally with other wireless devices, such as APs 105, STAs 110, or other devices. The transceiver(s) 1320 include a modem to modulate packets and frames and provide the modulated packets to the antenna(s) 1325 for transmission. The modem is additionally used to demodulate packets received from the antenna(s) 1325.

The resource unit signaling manager 1330, MU-MIMO load balancer 1335, spatial stream determiner 1340, content type determiner 1345, and punctured channel manager 1350 implement the features described with reference to FIGS. 1-12 and 14A-22B, as further explained below.

The resource unit signaling manager 1330 can identify a resource unit (RU) configuration for a WLAN data field of a SU transmission frame that has a fixed bandwidth. The resource unit signaling manager 1330 can then generate a RU indicator in a WLAN signaling field of a preamble of the SU transmission frame, where the RU indicator identifies a RU size and a RU location within the WLAN data field. The resource unit signaling manager 1330 can, in some examples together with transceivers 1320 and/or antenna(s) 1325, transmit the SU transmission frame.

The MU-MIMO load balancer 1335 can identify a first indicator identifying a number of MU-MIMO stations associated with a first RU in a first content channel of a transmission frame. The MU-MIMO load balancer 1335 can also identify a second indicator identifying an absence of MU-MIMO stations associated with a second RU in a second content channel of the transmission frame. The MU-MIMO load balancer 1335 may then generate a first common portion of a WLAN signaling field in the first content channel of the transmission frame, wherein the first common portion includes the first indicator, and generate a second common portion of the WLAN signaling field in the second content channel of the transmission frame, wherein the second common portion includes the second indicator. The MU-MIMO load balancer 1335 can, in some examples together with transceivers 1320 and/or antenna(s) 1325, transmit the SU transmission frame that includes the WLAN signaling field.

The spatial stream determiner 1340 can receive a transmission frame that includes a WLAN signaling field decodable by a plurality of stations. In some examples the spatial stream determiner 1340 receives the transmission frame together with transceivers 1320 and/or antenna(s) 1325. The spatial stream determiner 1340 may identify, in a station-specific portion of the WLAN signaling field, an order for a plurality of station-specific information blocks associated with the plurality of stations. The spatial stream determiner 1340 may then determine a number of spatial streams allocated to the first station based at least in part on the identified order for the plurality of station-specific information blocks.

The content type determiner 1345 may receive a transmission frame associated with a plurality of channels, the transmission frame including a WLAN signaling field. In some examples the content type determiner 1345 receives the transmission frame together with transceivers 1320 and/or antenna(s) 1325. The content type determiner 1345 can identify a first number of stations associated with the WLAN signaling field for a first channel of the plurality of channels, and identify a second number of stations associated with the WLAN signaling field for a second channel of the plurality of channels. The content type determiner 1345 may then determine whether a data portion of the transmission frame contains MU-MIMO content based at least in part on the identified first number of stations and the identified second number of stations.

The punctured channel manager 1350 can generate an indication that a first channel of a plurality of channels associated with a transmission frame has been punctured, the transmission frame including a WLAN signaling field. The punctured channel manager 1350 can identify information associated with the WLAN signaling field corresponding to the punctured first channel, then transmit the indication that the first channel has been punctured and the information associated with the WLAN signaling field in a second channel of the plurality of channels. In some examples, the punctured channel manager 1350 operates together with transceivers 1320 and/or antenna(s) 1325 to transmit the indication and the information associated with the WLAN signaling field in the second channel.

Again, FIG. 13A shows only one possible implementation of a device executing the features of FIGS. 1-12 and 14A-22B. While the components of FIG. 13A are shown as discrete hardware blocks (e.g., ASICs, field programmable gate arrays (FPGAs), semi-custom integrated circuits, etc.) for purposes of clarity, it will be understood that each of the components may also be implemented by multiple hardware blocks adapted to execute some or all of the applicable features in hardware. Alternatively, features of two or more of the components of FIG. 13A may be implemented by a single, consolidated hardware block. For example, a single transceiver 1320 chip may implement the processor 1305, memory 1310, resource unit signaling manager 1330, MU-MIMO load balancer 1335, spatial stream determiner 1340, content type determiner 1345, and punctured channel manager 1350.

In still other examples, the features of each component may also be implemented, in whole or in part, with instructions embodied in a memory, formatted to be executed by one or more general or application-specific processors. For example, FIG. 13B shows a block diagram 1300-*b* of another example of a wireless device 1390-*a* in which the features of the resource unit signaling manager 1330-*a*, MU-MIMO load balancer 1335-*a*, spatial stream determiner 1340-*a*, content type determiner 1345-*a*, and punctured channel manager 1350-*a* are implemented as computer-readable code stored on memory 1310-*a* and executed by one or more processors 1305-*a*. Other combinations of hardware/software may be used to perform the features of one or more of the components of FIGS. 13A-13B.

Figure 23:
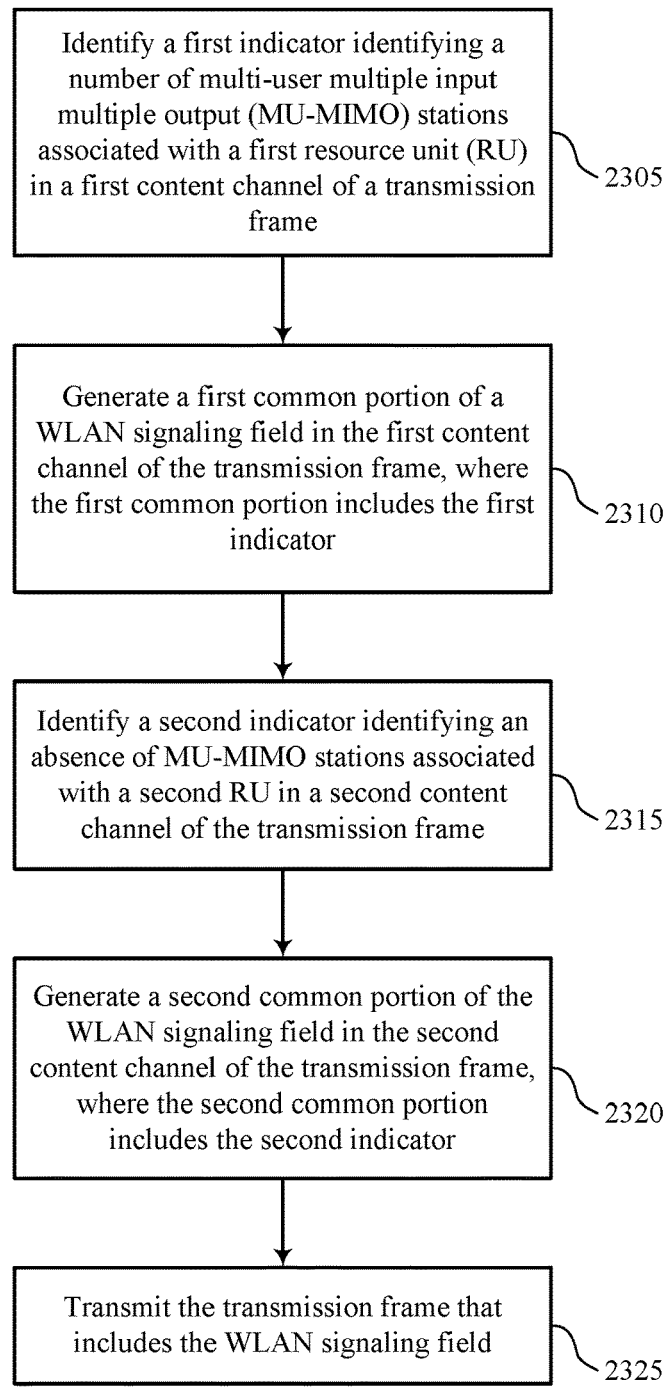
FIGS. 23 through 30 illustrate methods for preamble design aspects for HE WLANs in accordance with aspects of the present disclosure.

FIG. 23 shows a flowchart illustrating a method 2300 for preamble design aspects for HE WLANs in accordance with various aspects of the present disclosure. The operations of method 2300 may be implemented by a wireless device 1390 or its components as described herein, e.g., an AP 105 and/or a STA 110. In some examples, an wireless device 1390 may execute a set of codes to control the functional elements of the device to perform the functions described below. Additionally or alternatively, the wireless device may perform aspects of the functions described below using special-purpose hardware.

At block 2305 the wireless device 1310 may identify a first indicator identifying a number of MU-MIMO stations associated with a first RU in a first content channel of a transmission frame. The operations of block 2305 may be performed according to the methods described with reference to FIGS. 1 through 22. In certain examples, aspects of the operations of block 2305 may be performed by a component of the wireless device 1390 as described with reference to FIG. 13.

At block 2310 the wireless device 1390 may generate a first common portion of a WLAN signaling field in the first content channel of the transmission frame, wherein the first common portion includes the first indicator. The operations of block 2310 may be performed according to the methods described with reference to FIGS. 1 through 22. In certain examples, aspects of the operations of block 2310 may be performed by a component of the wireless device 1390 as described with reference to FIG. 13.

At block 2315 the wireless device 1390 may identify a second indicator identifying an absence of MU-MIMO stations associated with a second RU in a second content channel of the transmission frame. The operations of block 2315 may be performed according to the methods described with reference to FIGS. 1 through 22. In certain examples, aspects of the operations of block 2315 may be performed by a component of the wireless device 1390 as described with reference to FIG. 13.

At block 2320 the wireless device 1390 may generate a second common portion of the WLAN signaling field in the second content channel of the transmission frame, wherein the second common portion includes the second indicator. The operations of block 2320 may be performed according to the methods described with reference to FIGS. 1 through 22. In certain examples, aspects of the operations of block 2320 may be performed by a component of the wireless device 1390 as described with reference to FIG. 13.

At block 2325 the AP 105 may transmit the transmission frame that includes the WLAN signaling field. The operations of block 2325 may be performed according to the methods described with reference to FIGS. 1 through 22. In certain examples, aspects of the operations of block 2325 may be performed by a component of the wireless device 1390 as described with reference to FIG. 13.

Figure 24:
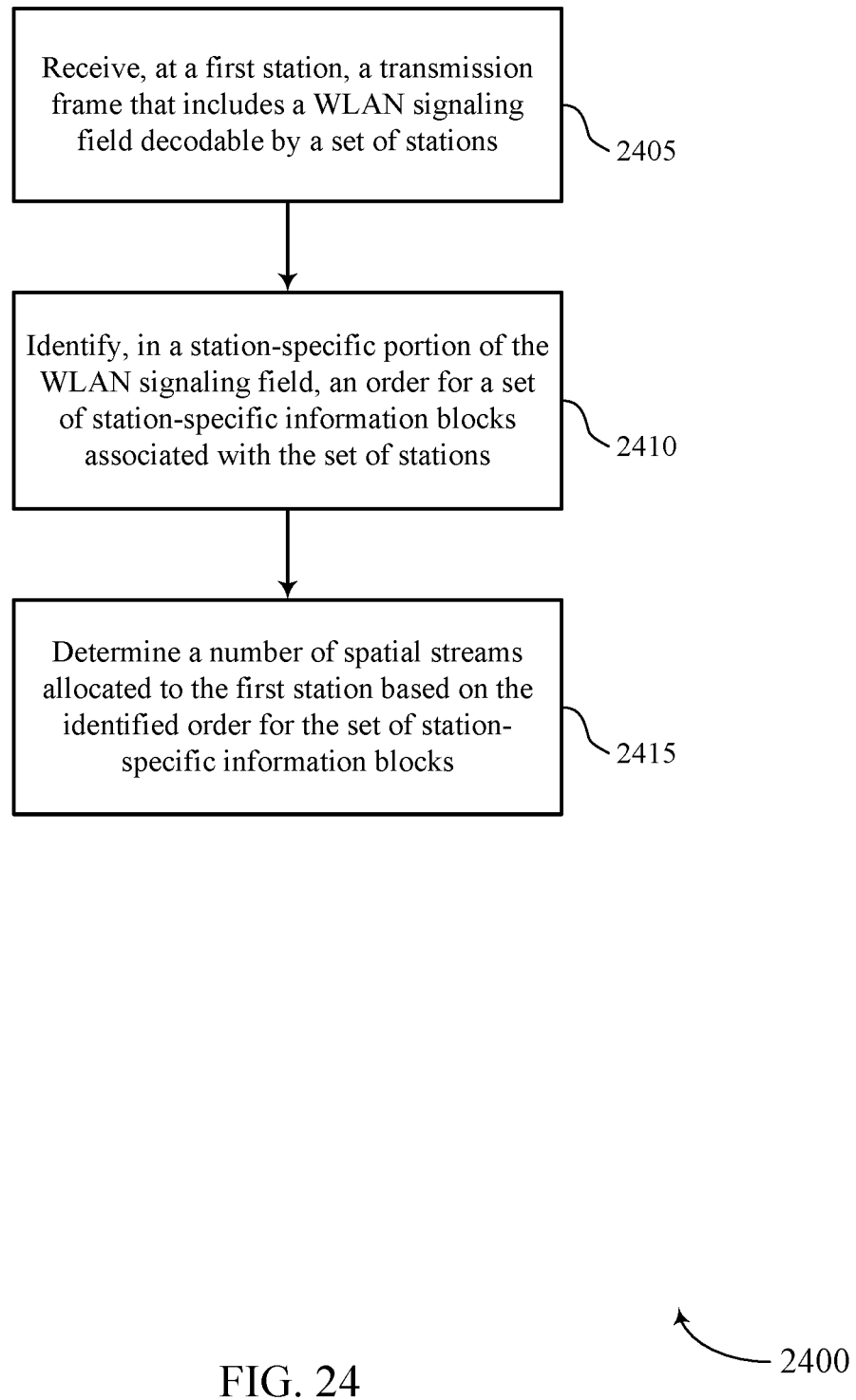

FIG. 24 shows a flowchart illustrating a method 2400 for preamble design aspects for HE WLANs in accordance with various aspects of the present disclosure. The operations of method 2400 may be implemented by a wireless device 1390 or its components as described herein, e.g., an AP 105 and/or a STA 110. In some examples, a wireless device 1390 may execute a set of codes to control the functional elements of the device to perform the functions described below. Additionally or alternatively, the wireless device 1390 may perform aspects of the functions described below using special-purpose hardware.

At block 2405 the wireless device 1390 may receive, at a first station, a transmission frame that includes a wireless local area network (WLAN) signaling field decodable by a plurality of stations. The operations of block 2405 may be performed according to the methods described with reference to FIGS. 1 through 22. In certain examples, aspects of the operations of block 2405 may be performed by a component of the wireless device 1390 as described with reference to FIG. 13.

At block 2410 the wireless device 1390 may identify, in a station-specific portion of the WLAN signaling field, an order for a plurality of station-specific information blocks associated with the plurality of stations. The operations of block 2410 may be performed according to the methods described with reference to FIGS. 1 through 22. In certain examples, aspects of the operations of block 2410 may be performed by a component of the wireless device 1390 as described with reference to FIG. 13.

At block 2415 the wireless device 1390 may determine a number of spatial streams allocated to the first station based at least in part on the identified order for the plurality of station-specific information blocks. The operations of block 2415 may be performed according to the methods described with reference to FIGS. 1 through 22. In certain examples, aspects of the operations of block 2415 may be performed by a component of the wireless device 1390 as described with reference to FIG. 13.

Figure 25:
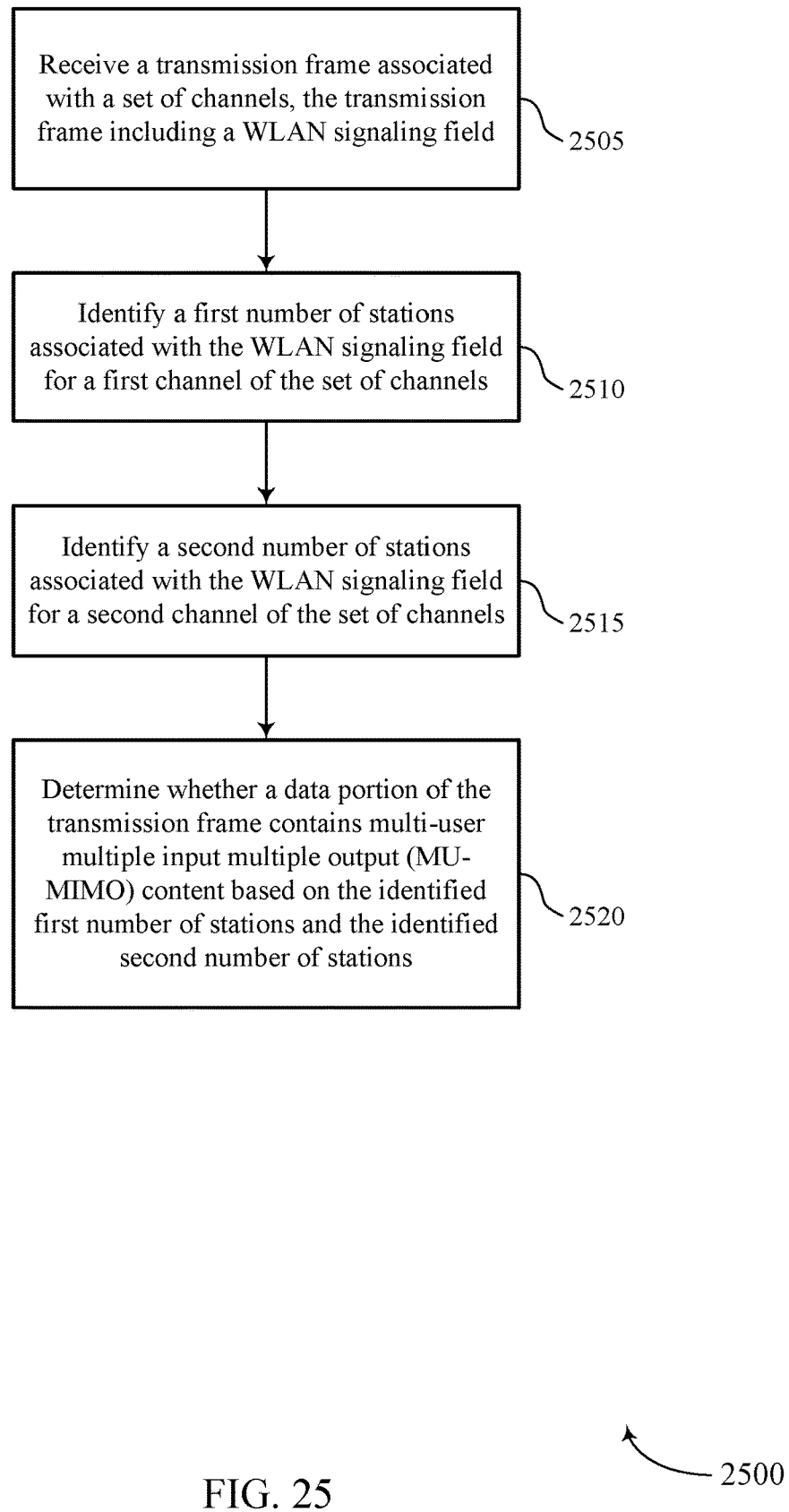

FIG. 25 shows a flowchart illustrating a method 2500 for Preamble Design Aspects For High Efficiency Wireless Local Area Networks in accordance with various aspects of the present disclosure. The operations of method 2500 may be implemented by a wireless device 1390 or its components as described herein, e.g., an AP 105 and/or a STA 115. In some examples, a wireless device 1390 may execute a set of codes to control the functional elements of the device to perform the functions described below. Additionally or alternatively, the wireless device 1390 may perform aspects of the functions described below using special-purpose hardware.

At block 2505 the wireless device 1390 may receive a transmission frame associated with a plurality of channels, the transmission frame including a wireless local area network (WLAN) signaling field. The operations of block 2505 may be performed according to the methods described with reference to FIGS. 1 through 22. In certain examples, aspects of the operations of block 2505 may be performed by a component of the wireless device 1390 as described with reference to FIG. 13.

At block 2510 the wireless device 1390 may identify a first number of stations associated with the WLAN signaling field for a first channel of the plurality of channels. The operations of block 2510 may be performed according to the methods described with reference to FIGS. 1 through 22. In certain examples, aspects of the operations of block 2510 may be performed by a component of the wireless device 1390 as described with reference to FIG. 13.

At block 2515 the wireless device 1390 may identify a second number of stations associated with the WLAN signaling field for a second channel of the plurality of channels. The operations of block 2515 may be performed according to the methods described with reference to FIGS. 1 through 22. In certain examples, aspects of the operations of block 2515 may be performed by a component of the wireless device 1390 as described with reference to FIG. 13.

At block 2520 the wireless device 1390 may determine whether a data portion of the transmission frame contains multi-user multiple input multiple output (MU-MIMO) content based at least in part on the identified first number of stations and the identified second number of stations. The operations of block 2520 may be performed according to the methods described with reference to FIG. 1 through 22. In certain examples, aspects of the operations of block 2520 may be performed by a component of the wireless device 1390 as described with reference to FIG. 13.

Figure 26:
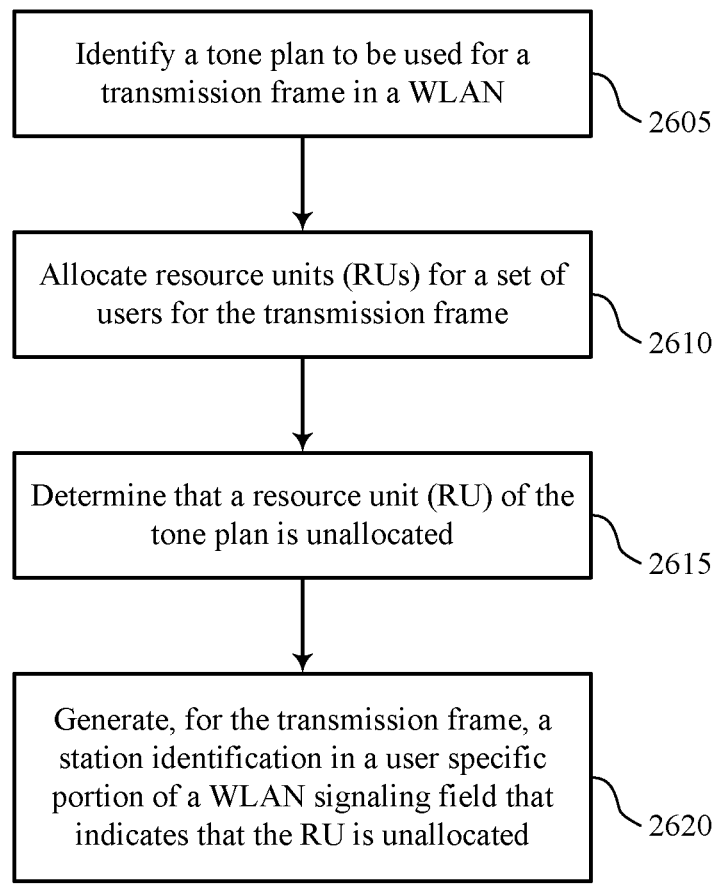

FIG. 26 shows a flowchart illustrating a method 2600 for preamble design aspects for HE WLANs in accordance with various aspects of the present disclosure. The operations of method 2600 may be implemented by a wireless device 1390 or its components as described herein, e.g., an AP 105 and/or a STA 110. In some examples, a wireless device 1390 may execute a set of codes to control the functional elements of the device to perform the functions described below. Additionally or alternatively, the wireless device 1390 may perform aspects of the functions described below using special-purpose hardware.

At block 2605 the wireless device 1390 may identify a tone plan to be used for a transmission frame in a wireless local area network (WLAN). The operations of block 2605 may be performed according to the methods described with reference to FIGS. 1 through 22. In certain examples, aspects of the operations of block 2605 may be performed by a component of the wireless device 1390 as described with reference to FIG. 13.

At block 2610 the wireless device 1390 may allocate resource units (RUs) for a plurality of users for the transmission frame. The operations of block 2610 may be performed according to the methods described with reference to FIGS. 1 through 22. In certain examples, aspects of the operations of block 2610 may be performed by a component of the wireless device 1390 as described with reference to FIG. 13.

At block 2615 the wireless device 1390 may determine that a resource unit (RU) of the tone plan is unallocated. The operations of block 2615 may be performed according to the methods described with reference to FIGS. 1 through 22. In certain examples, aspects of the operations of block 2615 may be performed by a component of the wireless device 1390 as described with reference to FIG. 13.

At block 2620 the wireless device 1390 may generate, for the transmission frame, a station identification in a user specific portion of a WLAN signaling field that indicates that the RU is unallocated. The operations of block 2620 may be performed according to the methods described with reference to FIGS. 1 through 22. In certain examples, aspects of the operations of block 2620 may be performed by a component of the wireless device 1390 as described with reference to FIG. 13.

Figure 27:
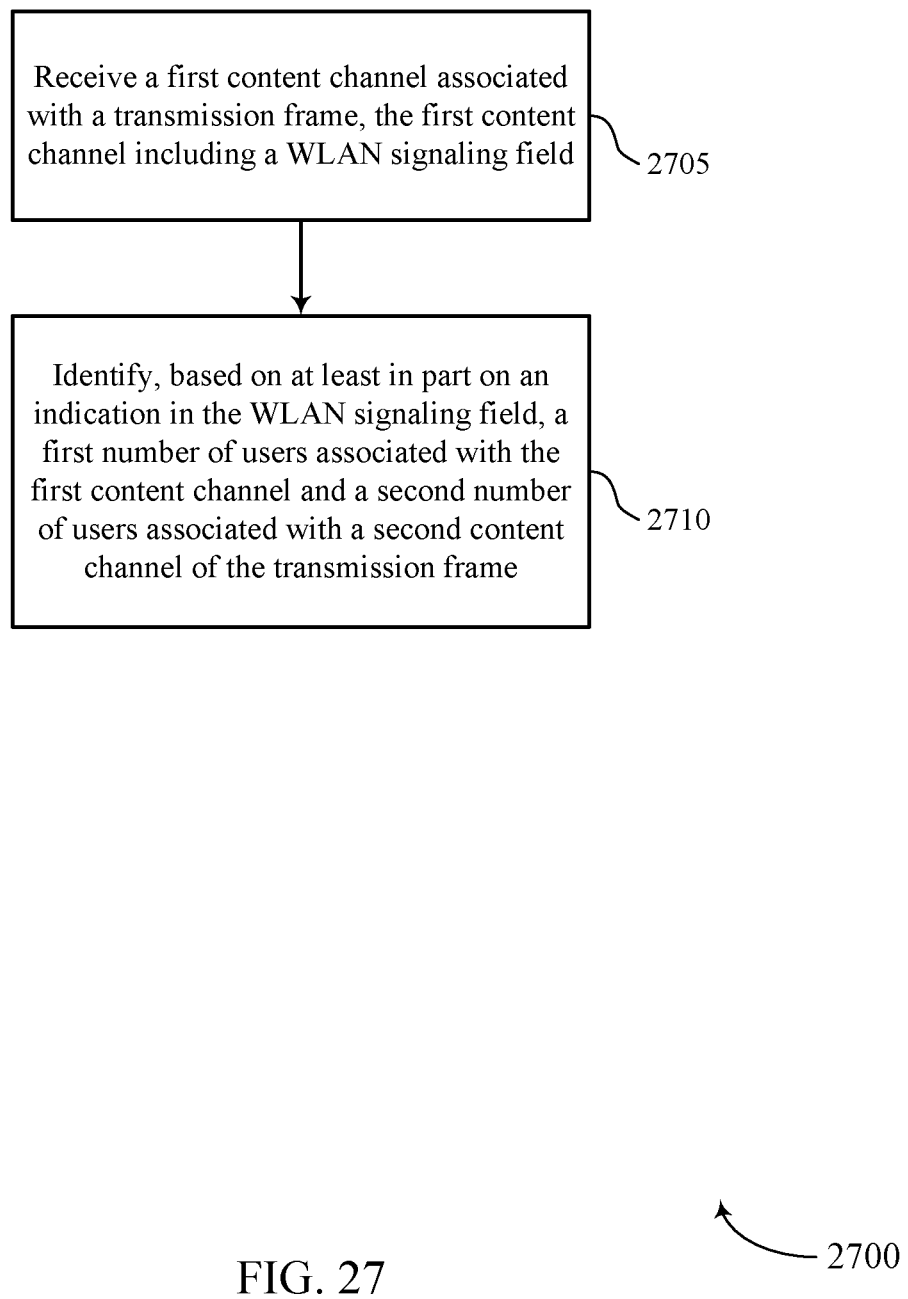

FIG. 27 shows a flowchart illustrating a method 2700 for preamble design aspects for HE WLANs in accordance with various aspects of the present disclosure. The operations of method 2700 may be implemented by a wireless device 1390 or its components as described herein, e.g., an AP 105 and/or a STA 110. In some examples, a wireless device 1390 may execute a set of codes to control the functional elements of the device to perform the functions described below. Additionally or alternatively, the wireless device 1390 may perform aspects of the functions described below using special-purpose hardware.

At block 2705 the wireless device 1390 may receive a first content channel associated with a transmission frame, the first content channel including a wireless local area network (WLAN) signaling field. The operations of block 2705 may be performed according to the methods described with reference to FIGS. 1 through 22. In certain examples, aspects of the operations of block 2705 may be performed by a component of the wireless device 1390 as described with reference to FIG. 13.

At block 2710 the wireless device 1390 may identify, based on at least in part on an indication in the WLAN signaling field, a first number of users associated with the first content channel and a second number of users associated with a second content channel of the transmission frame. The operations of block 2710 may be performed according to the methods described with reference to FIGS. 1 through 22. In certain examples, aspects of the operations of block 2710 may be performed by a component of the wireless device 1390 as described with reference to FIG. 13.

Figure 28:
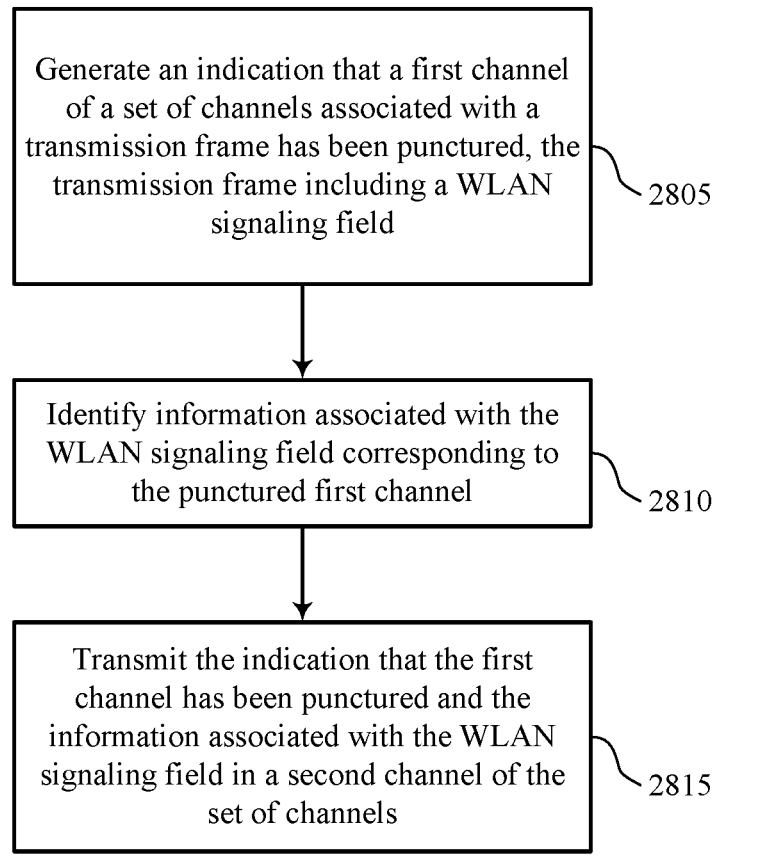

FIG. 28 shows a flowchart illustrating a method 2800 for preamble design aspects for HE WLANs in accordance with various aspects of the present disclosure. The operations of method 2800 may be implemented by a wireless device 1390 or its components as described herein, e.g., an AP 105 and/or a STA 110. In some examples, a wireless device 1390 may execute a set of codes to control the functional elements of the device to perform the functions described below. Additionally or alternatively, the wireless device 1390 may perform aspects of the functions described below using special-purpose hardware.

At block 2805 the wireless device 1390 may generate an indication that a first channel of a plurality of channels associated with a transmission frame has been punctured, the transmission frame including a wireless local area network (WLAN) signaling field. The operations of block 2805 may be performed according to the methods described with reference to FIGS. 1 through 22. In certain examples, aspects of the operations of block 2805 may be performed by a component of the wireless device 1390 as described with reference to FIG. 13.

At block 2810 the wireless device 1390 may identify information associated with the WLAN signaling field corresponding to the punctured first channel. The operations of block 2810 may be performed according to the methods described with reference to FIGS. 1 through 22. In certain examples, aspects of the operations of block 2810 may be performed by a component of the wireless device 1390 as described with reference to FIG. 13.

At block 2815 the wireless device 1390 may transmit the indication that the first channel has been punctured and the information associated with the WLAN signaling field in a second channel of the plurality of channels. The operations of block 2815 may be performed according to the methods described with reference to FIGS. 1 through 22. In certain examples, aspects of the operations of block 2815 may be performed by a component of the wireless device 1390 as described with reference to FIG. 13.

Figure 29:
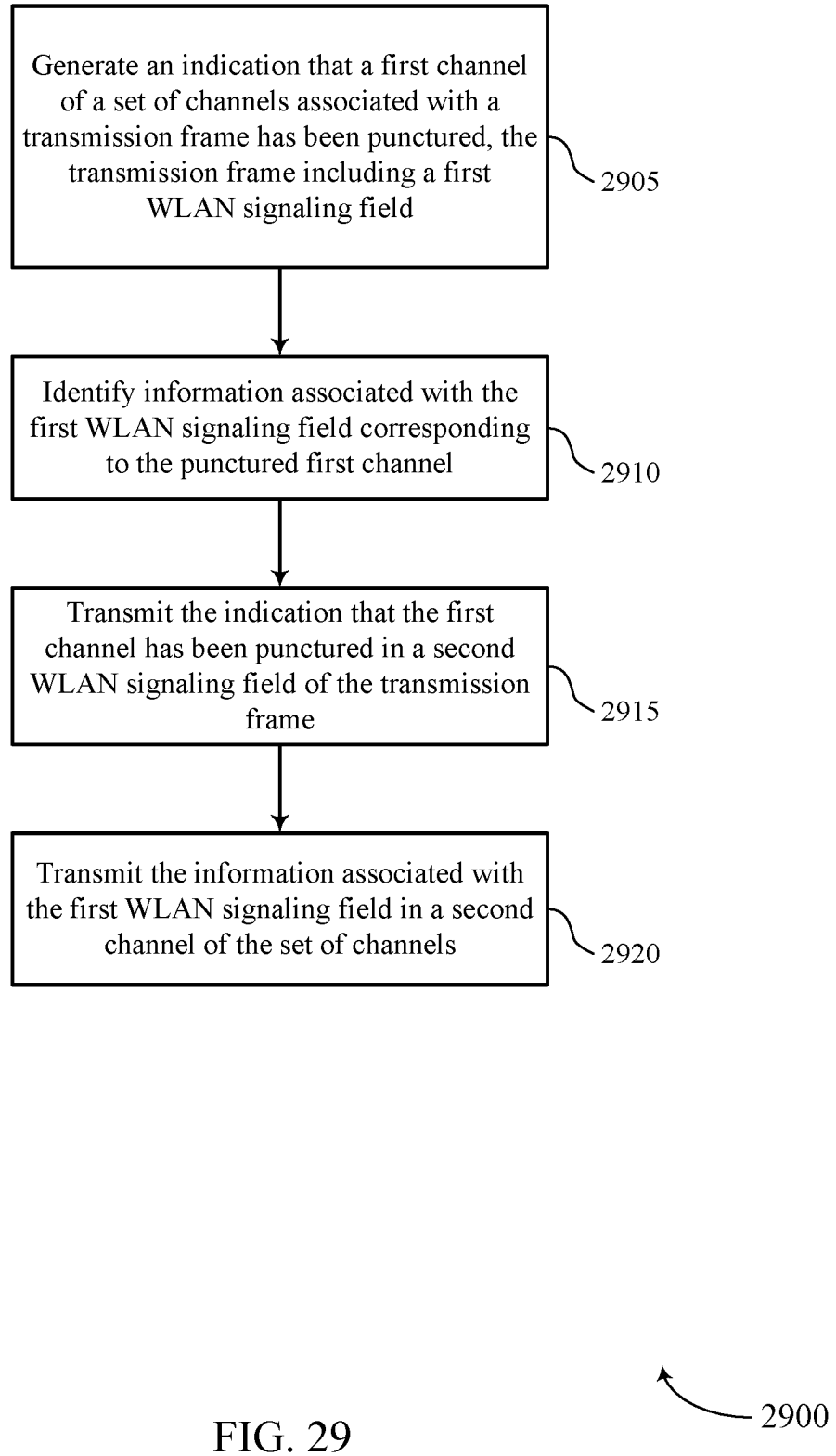

FIG. 29 shows a flowchart illustrating a method 2900 for preamble design aspects for HE WLANs in accordance with various aspects of the present disclosure. The operations of method 2900 may be implemented by a wireless device 1390 or its components as described herein, e.g., an AP 105 and/or STA 110. In some examples, a wireless device 1390 may execute a set of codes to control the functional elements of the device to perform the functions described below. Additionally or alternatively, the wireless device 1390 may perform aspects of the functions described below using special-purpose hardware.

At block 2905 the wireless device 1390 may generate an indication that a first channel of a plurality of channels associated with a transmission frame has been punctured, the transmission frame including a first wireless local area network (WLAN) signaling field. The operations of block 2905 may be performed according to the methods described with reference to FIGS. 1 through 22. In certain examples, aspects of the operations of block 2905 may be performed by a component of the wireless device 1390 as described with reference to FIG. 13.

At block 2910 the wireless device 1390 may identify information associated with the first WLAN signaling field corresponding to the punctured first channel. The operations of block 2910 may be performed according to the methods described with reference to FIGS. 1 through 22. In certain examples, aspects of the operations of block 2910 may be performed by a component of the wireless device 1390 as described with reference to FIG. 13.

At block 2915 the wireless device 1390 may transmit the indication that the first channel has been punctured in a second WLAN signaling field of the transmission frame. The operations of block 2915 may be performed according to the methods described with reference to FIGS. 1 through 22. In certain examples, aspects of the operations of block 2915 may be performed by a component of the wireless device 1390 as described with reference to FIG. 13.

At block 2920 the wireless device 1390 may transmit the information associated with the first WLAN signaling field in a second channel of the plurality of channels. The operations of block 2920 may be performed according to the methods described with reference to FIGS. 1 through 22. In certain examples, aspects of the operations of block 2920 may be performed by a component of the wireless device 1390 as described with reference to FIG. 13.

Figure 30:
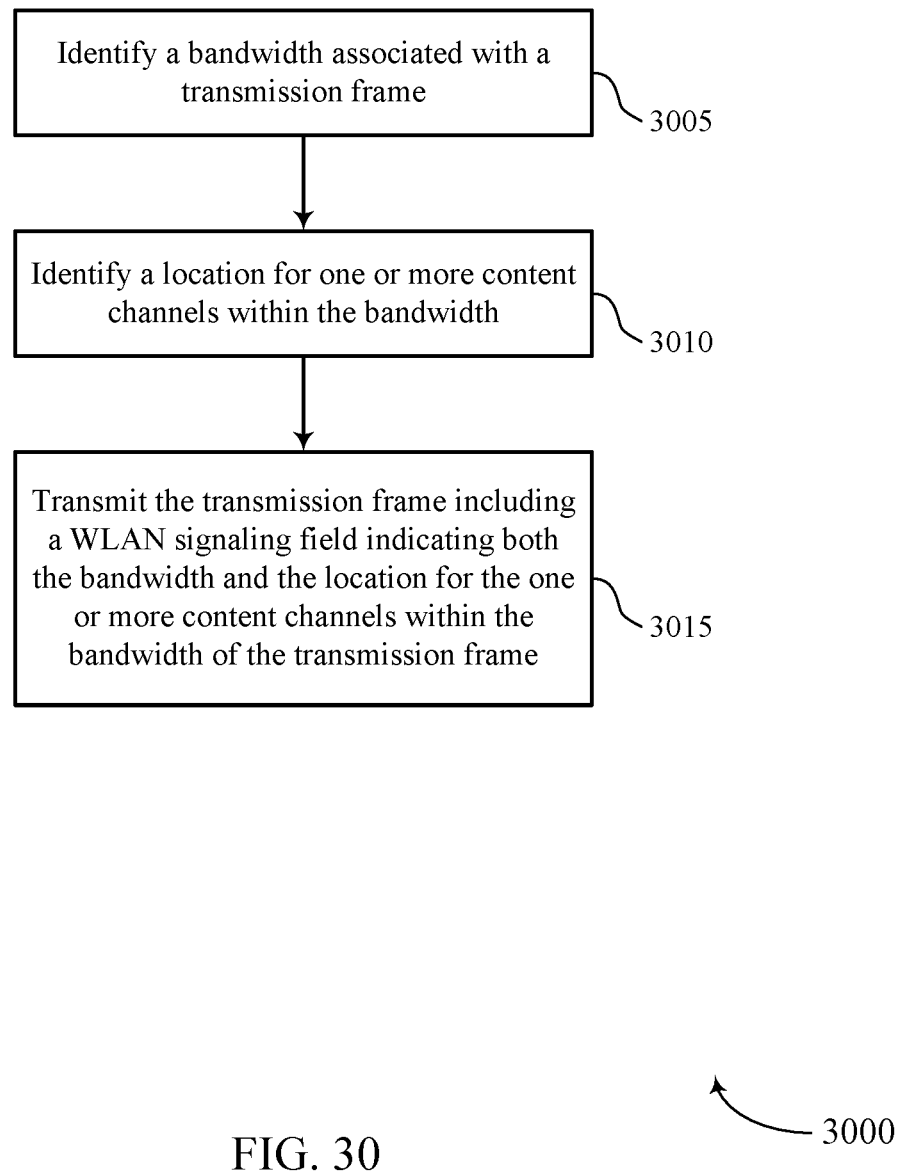

FIG. 30 shows a flowchart illustrating a method 3000 for preamble design aspects for HE WLANs in accordance with various aspects of the present disclosure. The operations of method 3000 may be implemented by a wireless device 1390 or its components as described herein, e.g., an AP 105 and/or STA 110. In some examples, a wireless device 1390 may execute a set of codes to control the functional elements of the device to perform the functions described below. Additionally or alternatively, the wireless device 1390 may perform aspects of the functions described below using special-purpose hardware.

At block 3005 the wireless device 1390 may identify a bandwidth associated with a transmission frame. The operations of block 3005 may be performed according to the methods described with reference to FIGS. 1 through 22. In certain examples, aspects of the operations of block 3005 may be performed by a component of the wireless device 1390 as described with reference to FIG. 13.

At block 3010 the wireless device 1390 may identify a location for one or more content channels within the bandwidth. The operations of block 3010 may be performed according to the methods described with reference to FIGS. 1 through 22. In certain examples, aspects of the operations of block 3010 may be performed by a component of the wireless device 1390 as described with reference to FIG. 13.

At block 3015 the wireless device 1390 may transmit the transmission frame including a WLAN signaling field indicating both the bandwidth and the location for the one or more content channels within the bandwidth of the transmission frame. The operations of block 3015 may be performed according to the methods described with reference to FIGS. 1 through 22. In certain examples, aspects of the operations of block 3015 may be performed by a component of the wireless device 1390 as described with reference to FIG. 13.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
   generating an indication that a first channel of a plurality of channels associated with a transmission frame has been punctured, the transmission frame including a wireless local area network (WLAN) signaling field;
   identifying information associated with the WLAN signaling field corresponding to the punctured first channel;
   selecting, based at least in part on the punctured first channel, a resource unit (RU) allocation bit sequence;
   transmitting the information associated with the WLAN signaling field in a second channel of the plurality of channels; and
   transmitting the indication that the first channel has been punctured in the second channel or in a second WLAN signaling field of the transmission frame.

2. The method of claim 1, wherein the second WLAN signaling field of the transmission frame comprises a bandwidth field indicating both a bandwidth associated with the transmission frame and a location of the second channel within the plurality of channels.

3. The method of claim 1, wherein the WLAN signaling field comprises a high efficiency signaling A (HE-SIG-A) field of the first channel or the second channel and the second WLAN signaling field comprises a high efficiency signaling B (HE-SIG-B) field of the second channel.

4. The method of claim 1, further comprising:
   transmitting the RU allocation bit sequence to convey the information associated with the WLAN signaling field corresponding to the punctured first channel.

5. The method of claim 4, wherein the RU allocation bit sequence is transmitted in a high efficiency (HE) signaling B (HE-SIG-B) field of the transmission frame.

6. The method of claim 1, wherein the first channel comprises a secondary 20 MHz channel of the transmission frame, the transmission frame having an 80 MHz bandwidth.

7. The method of claim 6, wherein the indication comprises a bandwidth subfield set to 4.

8. The method of claim 1, wherein the first channel comprises a 20 MHz sub-channel of a 40 MHz secondary channel of the transmission frame, the transmission frame having an 80 MHz bandwidth.

9. The method of claim 8, wherein the indication comprises a bandwidth subfield set to 5.

10. The method of claim 1, wherein the first channel comprises a 20 MHz sub-channel of an 80 MHz primary channel of the transmission frame, the transmission frame having a cumulative bandwidth of 160 MHz.

11. The method of claim 10, wherein the indication comprises a bandwidth subfield set to 6.

12. The method of claim 1, wherein the WLAN signaling field comprises a high efficiency (HE) signaling A (HE-SIG-A) field, and the indication is associated with a bandwidth subfield of the HE-SIG-A field.

13. The method of claim 1, wherein the WLAN signaling field is associated with a high efficiency multi-user (MU) physical layer convergence protocol data unit (PPDU).

14. The method of claim 1, further comprising:
identifying a bandwidth associated with the transmission frame;
identifying a location for one or more content channels within the bandwidth; and
transmitting the transmission frame including the WLAN signaling field indicating both the bandwidth and the location for the one or more content channels within the bandwidth of the transmission frame.

15. An apparatus for wireless communication, comprising:
means for generating an indication that a first channel of a plurality of channels associated with a transmission frame has been punctured, the transmission frame including a wireless local area network (WLAN) signaling field;
means for identifying information associated with the WLAN signaling field corresponding to the punctured first channel;
means for selecting, based at least in part on the punctured first channel, a resource unit (RU) allocation bit sequence;
means for transmitting the information associated with the WLAN signaling field in a second channel of the plurality of channels; and
means for transmitting the indication that the first channel has been punctured in the second channel or in a second WLAN signaling field of the transmission frame.

16. An apparatus for wireless communication, comprising:
a memory; and
a processor coupled with the memory and configured to:
generate an indication that a first channel of a plurality of channels associated with a transmission frame has been punctured, the transmission frame including a wireless local area network (WLAN) signaling field;
identify information associated with the WLAN signaling field corresponding to the punctured first channel;
select, based at least in part on the punctured first channel, a resource unit (RU) allocation bit sequence;
transmit the information associated with the WLAN signaling field in a second channel of the plurality of channels; and
transmit the indication that the first channel has been punctured in the second channel or in a second WLAN signaling field of the transmission frame.

17. The apparatus of claim 16, wherein:
the second WLAN signaling field of the transmission frame comprises a bandwidth field indicating both a bandwidth associated with the transmission frame and a location of the second channel within the plurality of channels.

18. The apparatus of claim 16, wherein:
the WLAN signaling field comprises a high efficiency signaling A (HE-SIG-A) field of the first channel or the second channel and the second WLAN signaling field comprises a high efficiency signaling B (HE-SIG-B) field of the second channel.

19. The apparatus of claim 16, wherein the processor and memory are further configured to:
transmit the RU allocation bit sequence to convey the information associated with the WLAN signaling field corresponding to the punctured first channel.

20. The apparatus of claim 19, wherein:
the RU allocation bit sequence is transmitted in a high efficiency (HE) signaling B (HE-SIG-B) field of the transmission frame.

21. The apparatus of claim 16, wherein:
the first channel comprises a secondary 20 MHz channel of the transmission frame, the transmission frame having an 80 MHz bandwidth.

22. The apparatus of claim 21, wherein:
the indication comprises a bandwidth subfield set to 4.

23. The apparatus of claim 16, wherein:
the first channel comprises a 20 MHz sub-channel of a 40 MHz secondary channel of the transmission frame, the transmission frame having an 80 MHz bandwidth.

24. The apparatus of claim 23, wherein:
the indication comprises a bandwidth subfield set to 5.

25. The apparatus of claim 16, wherein:
the first channel comprises a 20 MHz sub-channel of an 80 MHz primary channel of the transmission frame, the transmission frame having a cumulative bandwidth of 160 MHz.

26. The apparatus of claim 25, wherein:
the indication comprises a bandwidth subfield set to 6.

27. The apparatus of claim 25, wherein:
the WLAN signaling field comprises a high efficiency signaling A (HE-SIG-A) field, and the indication is associated with a bandwidth subfield of the HE-SIG-A field.

28. The apparatus of claim 16, wherein the processor and memory are further configured to:
identify a bandwidth associated with the transmission frame;
identify a location for one or more content channels within the bandwidth; and
transmit the transmission frame including a WLAN signaling field indicating both the bandwidth and the location for the one or more content channels within the bandwidth of the transmission frame.

29. A non-transitory computer readable medium storing code for wireless communication, the code comprising instructions executable by a processor to:
generate an indication that a first channel of a plurality of channels associated with a transmission frame has been punctured, the transmission frame including a wireless local area network (WLAN) signaling field;
identify information associated with the WLAN signaling field corresponding to the punctured first channel;
select, based at least in part on the punctured first channel, a resource unit (RU) allocation bit sequence;

transmit the information associated with the WLAN signaling field in a second channel of the plurality of channels; and transmit the indication that the first channel has been punctured in the second channel or in a second WLAN signaling field of the transmission frame.

\* \* \* \* \*